(12) United States Patent
Knee et al.

(10) Patent No.: US 7,814,218 B1
(45) Date of Patent: Oct. 12, 2010

(54) MULTI-PROTOCOL AND MULTI-FORMAT STATEFUL PROCESSING

(75) Inventors: Simon John Knee, Del Mar, CA (US);
Brian D. Petry, San Diego, CA (US);
Fazil Ismet Osman, Escondido, CA (US)

(73) Assignee: Astute Networks, Inc., San Diego, CA (US)

( * ) Notice: Subject to any disclaimer, the term of this patent is extended or adjusted under 35 U.S.C. 154(b) by 840 days.

(21) Appl. No.: 10/660,055

(22) Filed: Sep. 10, 2003

Related U.S. Application Data

(60) Provisional application No. 60/419,710, filed on Oct. 17, 2002.

(51) Int. Cl.
*G06F 15/16* (2006.01)
(52) U.S. Cl. .................................... 709/230
(58) Field of Classification Search ................ 709/223, 709/225, 230, 217, 232, 246, 203, 231, 234
See application file for complete search history.

(56) References Cited

U.S. PATENT DOCUMENTS

| | | | |
|---|---|---|---|
| 4,130,865 A | 12/1978 | Heart et al. | |
| 4,447,874 A | 5/1984 | Bradley et al. | |
| 5,251,125 A | 10/1993 | Karnowski et al. | |
| 5,303,344 A * | 4/1994 | Yokoyama et al. | 709/230 |
| 5,321,844 A | 6/1994 | Schwagmann | |
| 5,590,328 A | 12/1996 | Seno et al. | |
| 5,640,394 A | 6/1997 | Schrier et al. | |
| 5,706,429 A | 1/1998 | Lai et al. | |
| 5,748,636 A | 5/1998 | Gradischnig | |
| 5,812,781 A | 9/1998 | Fahlman et al. | |
| 5,818,852 A | 10/1998 | Kapoor | |

(Continued)

FOREIGN PATENT DOCUMENTS

WO  WO 00/41365 A1  7/2000

(Continued)

OTHER PUBLICATIONS

Camarillo et al., "Mapping of Media Streams to Resource Reservation Flows," In: Network Working Group, Request for Comments No. 3524, Category: Standards Track, Apr. 2003, p. 1-6.

(Continued)

*Primary Examiner*—Ramy M Osman
*Assistant Examiner*—Sargon N Nano
(74) *Attorney, Agent, or Firm*—Cooley LLP

(57) ABSTRACT

A system and method of processing data in a stateful protocol processing system ("SPPS") configured to process a multiplicity of flows of messages is disclosed herein. The method includes receiving a first plurality of messages belonging to a first of the flows comporting with a first stateful protocol. In addition, a second plurality of messages belonging to a second of the flows comporting with a second stateful protocol are also received. Various events of at least first and second types associated with the first flow are then derived from the first plurality of received messages. The method further includes assigning a first protocol processing core to process the events of the first type in accordance with the first stateful protocol. A second protocol processing core is also assigned to process the events of the second type in accordance with the first stateful protocol.

18 Claims, 28 Drawing Sheets

U.S. PATENT DOCUMENTS

| | | | |
|---|---|---|---|
| 5,892,922 | A | 4/1999 | Lorenz |
| 6,070,199 | A | 5/2000 | Axtman et al. |
| 6,076,115 | A | 6/2000 | Sambamurthy et al. |
| 6,084,855 | A | 7/2000 | Soirinsuo et al. |
| 6,133,846 | A | 10/2000 | Birkedahl et al. |
| 6,167,027 | A | 12/2000 | Aubert et al. |
| 6,172,980 | B1 | 1/2001 | Flanders et al. |
| 6,219,697 | B1 | 4/2001 | Lawande et al. |
| 6,226,680 | B1 | 5/2001 | Boucher et al. |
| 6,233,242 | B1 | 5/2001 | Mayer et al. |
| 6,237,021 | B1 * | 5/2001 | Drummond ................. 709/201 |
| 6,247,060 | B1 | 6/2001 | Boucher et al. |
| 6,252,851 | B1 | 6/2001 | Siu et al. |
| 6,275,861 | B1 | 8/2001 | Chaudri et al. |
| 6,300,964 | B1 | 10/2001 | Intihar |
| 6,321,263 | B1 | 11/2001 | Walker |
| 6,334,153 | B2 | 12/2001 | Boucher et al. |
| 6,338,078 | B1 | 1/2002 | Chang et al. |
| 6,393,458 | B1 | 5/2002 | Gigliotti et al. |
| 6,453,360 | B1 | 9/2002 | Muller et al. |
| 6,460,080 | B1 | 10/2002 | Shah et al. |
| 6,480,489 | B1 | 11/2002 | Muller et al. |
| 6,532,079 | B1 | 3/2003 | Serex et al. |
| 6,532,501 | B1 | 3/2003 | McCracken |
| 6,546,428 | B2 | 4/2003 | Baber et al. |
| 6,587,884 | B1 | 7/2003 | Papadopoulos et al. |
| 6,594,712 | B1 | 7/2003 | Pettey et al. |
| 6,621,799 | B1 | 9/2003 | Kemp et al. |
| 6,629,697 | B1 | 10/2003 | Asai et al. |
| 6,662,213 | B1 | 12/2003 | Xie et al. |
| 6,665,725 | B1 * | 12/2003 | Dietz et al. ................. 709/230 |
| 6,667,920 | B2 | 12/2003 | Wolrich et al. |
| 6,668,317 | B1 | 12/2003 | Bernstein et al. |
| 6,680,946 | B1 * | 1/2004 | Isoyama et al. ........ 370/395.61 |
| 6,681,253 | B1 | 1/2004 | Suvanen et al. |
| 6,714,961 | B1 | 3/2004 | Holmberg et al. |
| 6,735,717 | B1 | 5/2004 | Rostowfske et al. |
| 6,768,992 | B1 | 7/2004 | Jolitz |
| 6,775,706 | B1 | 8/2004 | Fukumoto et al. |
| 6,829,697 | B1 | 12/2004 | Davis et al. |
| 6,842,809 | B2 | 1/2005 | Browning et al. |
| 6,883,064 | B2 * | 4/2005 | Yoshida et al. ............... 711/114 |
| 6,907,005 | B1 | 6/2005 | Dahlman et al. |
| 6,909,713 | B2 * | 6/2005 | Magnussen et al. ......... 370/389 |
| 6,920,485 | B2 | 7/2005 | Russell |
| 6,937,606 | B2 | 8/2005 | Basso et al. |
| 6,944,670 | B2 * | 9/2005 | Krichevski et al. .......... 709/230 |
| 6,947,963 | B1 | 9/2005 | Agarwal et al. |
| 6,970,913 | B1 * | 11/2005 | Albert et al. ................. 709/217 |
| 6,977,932 | B1 * | 12/2005 | Hauck ........................ 370/392 |
| 6,981,027 | B1 | 12/2005 | Gallo et al. |
| 6,981,051 | B2 | 12/2005 | Eydelman et al. |
| 6,985,431 | B1 | 1/2006 | Bass et al. |
| 6,996,117 | B2 * | 2/2006 | Lee et al. ..................... 370/429 |
| 7,013,394 | B1 | 3/2006 | Lingafelt et al. |
| 7,028,092 | B2 * | 4/2006 | MeLampy et al. .......... 709/230 |
| 7,031,311 | B2 * | 4/2006 | MeLampy et al. .......... 370/392 |
| 7,039,037 | B2 | 5/2006 | Wang et al. |
| 7,042,877 | B2 | 5/2006 | Foster et al. |
| 7,046,676 | B2 * | 5/2006 | Goetzinger et al. ....... 370/395.4 |
| 7,051,112 | B2 * | 5/2006 | Dawson ....................... 709/232 |
| 7,072,970 | B2 * | 7/2006 | Georgiou et al. ............ 709/230 |
| 7,076,555 | B1 | 7/2006 | Orman et al. |
| 7,085,286 | B2 * | 8/2006 | Dias et al. ................... 370/466 |
| 7,085,896 | B2 | 8/2006 | Acharya et al. |
| 7,089,282 | B2 | 8/2006 | Rajamony et al. |
| 7,102,998 | B1 | 9/2006 | Golestani |
| 7,106,756 | B1 * | 9/2006 | Donovan et al. ............ 370/468 |
| 7,114,008 | B2 | 9/2006 | Jungck et al. |
| 7,120,158 | B2 * | 10/2006 | Kyusojin ..................... 370/412 |
| 7,137,040 | B2 | 11/2006 | Bae et al. |
| 7,143,131 | B1 | 11/2006 | Soles et al. |
| 7,191,321 | B2 | 3/2007 | Bernstein et al. |
| 7,257,817 | B2 * | 8/2007 | Cabrera et al. ............... 719/310 |
| 7,274,706 | B1 | 9/2007 | Nguyen et al. |
| 7,287,649 | B2 | 10/2007 | HAYTER et al. |
| 7,289,480 | B2 * | 10/2007 | Lundstrom et al. .......... 370/338 |
| 7,293,100 | B2 | 11/2007 | Jayam et al. |
| 7,313,140 | B2 | 12/2007 | Lakshmanamurthy et al. |
| 7,328,270 | B1 | 2/2008 | Reents et al. |
| 7,346,707 | B1 | 3/2008 | Erimli |
| 7,360,217 | B2 | 4/2008 | Melvin et al. |
| 7,596,621 | B1 * | 9/2009 | Knee et al. ................... 709/230 |
| 2001/0003834 | A1 | 6/2001 | Shimonishi |
| 2002/0007420 | A1 | 1/2002 | Eydelman et al. |
| 2002/0016843 | A1 * | 2/2002 | Schweitzer et al. ......... 709/227 |
| 2002/0073232 | A1 | 6/2002 | Hong et al. |
| 2002/0099854 | A1 | 7/2002 | Jorgensen |
| 2002/0099855 | A1 | 7/2002 | Bass et al. |
| 2002/0122386 | A1 | 9/2002 | Calvignac et al. |
| 2002/0143845 | A1 | 10/2002 | Kardach |
| 2002/0174218 | A1 | 11/2002 | Dick et al. |
| 2003/0014662 | A1 | 1/2003 | Gupta et al. |
| 2003/0033379 | A1 | 2/2003 | Civanlar et al. |
| 2003/0037154 | A1 * | 2/2003 | Poggio et al. ............... 709/230 |
| 2003/0041163 | A1 | 2/2003 | Rhoades et al. |
| 2003/0074473 | A1 | 4/2003 | Pham et al. |
| 2003/0079033 | A1 | 4/2003 | Craft et al. |
| 2003/0158906 | A1 | 8/2003 | Hayes |
| 2003/0163589 | A1 | 8/2003 | Bunce et al. |
| 2003/0172169 | A1 * | 9/2003 | Cheng ......................... 709/230 |
| 2003/0177252 | A1 * | 9/2003 | Krichevski et al. .......... 709/230 |
| 2003/0231660 | A1 | 12/2003 | Vinnakota et al. |
| 2004/0004948 | A1 | 1/2004 | Fletcher et al. |
| 2004/0010583 | A1 | 1/2004 | Yu et al. |
| 2004/0024873 | A1 | 2/2004 | DiMambro |
| 2004/0024894 | A1 * | 2/2004 | Osman et al. ................ 709/230 |
| 2004/0030873 | A1 | 2/2004 | Park et al. |
| 2004/0042475 | A1 | 3/2004 | Vinnakota et al. |
| 2004/0049596 | A1 * | 3/2004 | Schuehler et al. ........... 709/238 |
| 2004/0148472 | A1 | 7/2004 | Barroso et al. |
| 2004/0210320 | A1 | 10/2004 | Pandya |
| 2004/0210795 | A1 | 10/2004 | Anderson |
| 2004/0268062 | A1 | 12/2004 | Ofer |
| 2005/0160097 | A1 | 7/2005 | Gschwind et al. |
| 2006/0168283 | A1 | 7/2006 | Georgiou et al. |
| 2006/0292292 | A1 | 12/2006 | Brightman et al. |
| 2007/0025380 | A1 | 2/2007 | Amagai et al. |
| 2008/0062927 | A1 | 3/2008 | Zhu et al. |

FOREIGN PATENT DOCUMENTS

| | | |
|---|---|---|
| WO | WO0101272 A2 | 1/2001 |
| WO | 0215027 A | 2/2002 |

OTHER PUBLICATIONS

EP Application 3766851.4 Office Action dated Jun. 17, 2009.
EP Application 3766851.4 Supplemental European Search Report mailed Dec. 15, 2008.
Murali Rangarajan et al., tcp Servers: Offloading TCP Processing in Internet Servers Design, Implementation, and Performance, Internet Citation, [Online] Mar. 2002 (2002-03), XP002286342 Retrieved from the Internet: URL: URL: discolab.rutgers.edu/split-os/dcs-tr-481.pdf> [retrieved on Jun. 29, 2004].
PCT/US03/21583 International Preliminary Examination Report mailed Mar. 10, 2004.
PCT/US03/21583 International Search Report mailed Mar. 10, 2004.
RFC 793, TCP, Obtained at www.ietf.org.
U.S. Appl. No. 10/649,112 Non-Final Rejection mailed Oct. 3, 2007.
U.S. Appl. No. 10/649,112 Non-Final Rejection mailed Mar. 31, 2009.
U.S. Appl. No. 10/649,112 Final Rejection mailed Nov. 13, 2009.
U.S. Appl. No. 10/649,364 Non-Final Rejection mailed Mar. 12, 2007.

U.S. Appl. No. 10/649,364 Non-Final Rejection mailed Oct. 5, 2007.
U.S. Appl. No. 10/649,364 Final Rejection mailed Jul. 21, 2008.
U.S. Appl. No. 10/649,364 Final Rejection mailed May 21, 2009.
U.S. Appl. No. 10/649,373 Non-Final Rejection mailed Jul. 3, 2007.
U.S. Appl. No. 10/649,373 Final Rejection mailed Jun. 11, 2008.
U.S. Appl. No. 10/649,373 Non-Final Rejection mailed Mar. 3, 2009.
U.S. Appl. No. 10/649,373 Final Rejection mailed Nov. 24, 2009.
U.S. Appl. No. 10/660,456 Non-Final Rejection mailed Jul. 9, 2008.
U.S. Appl. No. 10/660,456 Final Rejection mailed Mar. 10, 2009.
U.S. Appl. No. 10/660,456 Non-Final Rejection mailed Aug. 4, 2009.
U.S. Appl. No. 10/660,456 Non-Final Rejection mailed Mar. 16, 2010.
U.S. Appl. No. 10/661,096 Non-Final Rejection mailed Mar. 2, 2007.
U.S. Appl. No. 10/661,096 Final Rejection mailed Aug. 6, 2007.
U.S. Appl. No. 10/661,096 Non-Final Rejection mailed Dec. 5, 2007.
U.S. Appl. No. 10/661,096 Final Rejection mailed Aug. 21, 2008.
U.S. Appl. No. 10/661,096 Notice of Allowance mailed Apr. 9, 2009.
U.S. Appl. No. 10/661,084 Non-Final Rejection mailed Jul. 16, 2008.
U.S. Appl. No. 10/661,084 Final Rejection mailed Jan. 29, 2009.
U.S. Appl. No. 10/661,084 Non-Final Rejection mailed Dec. 7, 2009.
U.S. Appl. No. 10/211,434 Non-Final Rejection mailed Jun. 25, 2004.
U.S. Appl. No. 10/211,434 Final Rejection mailed Apr. 6, 2005.
U.S. Appl. No. 10/211,434 Non-Final Rejection mailed Sep. 21, 2005.
U.S. Appl. No. 10/211,434 Final Rejection mailed Apr. 18, 2006.
U.S. Appl. No. 10/211,434 Non-Final Rejection mailed Jul. 3, 2008.
U.S. Appl. No. 10/211,434 Non-Final Rejection mailed Nov. 10, 2009.
Werner Bux et al., Technologies and Building Blocks for Fast Packet Forwarding IEEE Communications Magazine, IEEE Service Center, Pascataway, US, vol. 39, No. 1, Jan. 1, 2001, pp. 70-77, ISSN: 0163-6804.

* cited by examiner

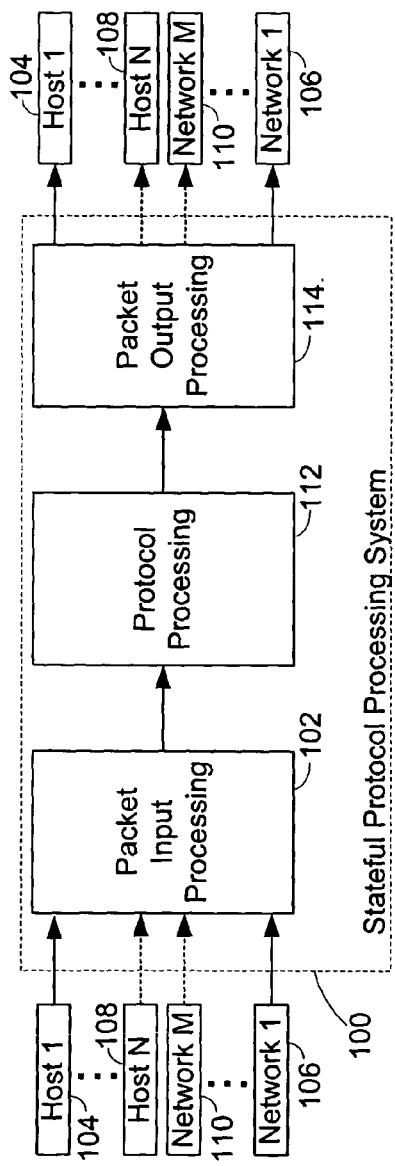
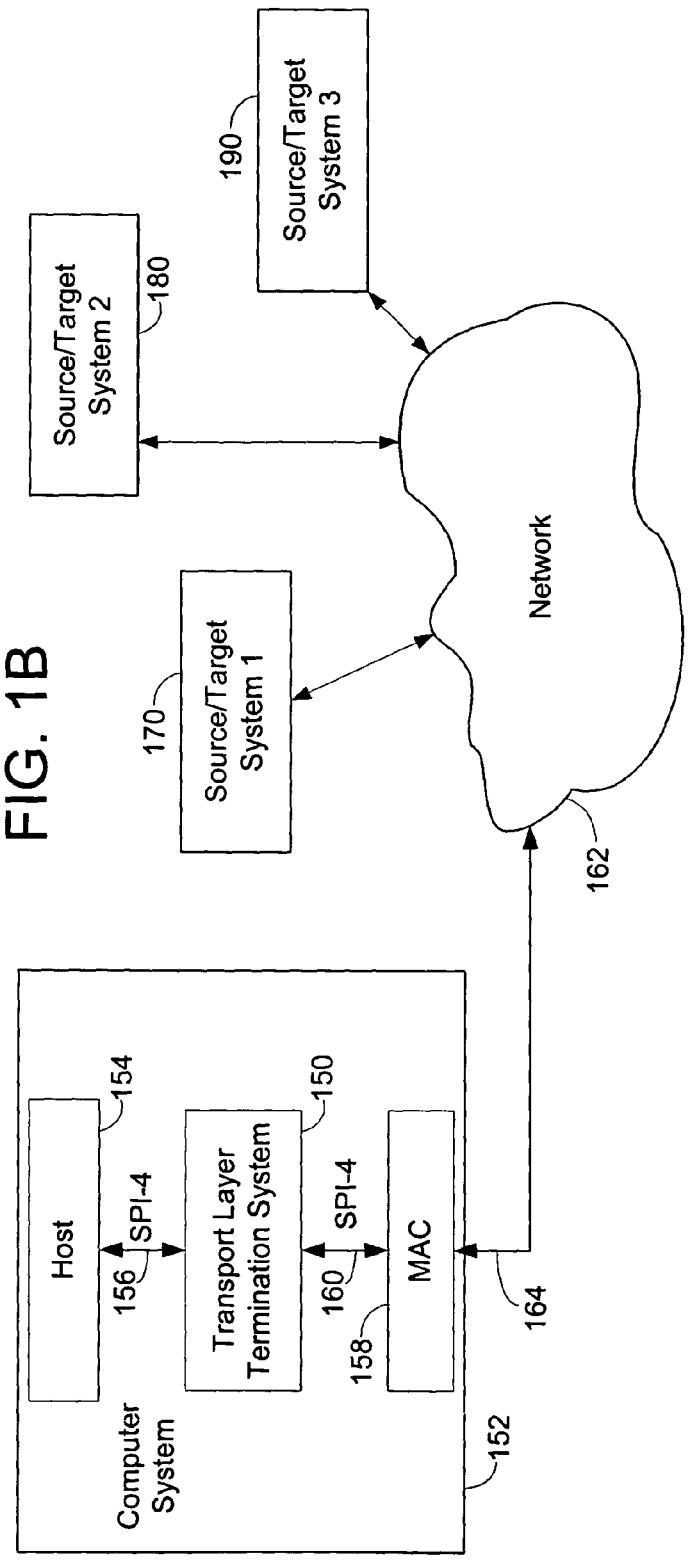
FIG. 1A
FIG. 1B

| 127 | Delayed ACK$_0$ | Retransmission Timer$_0$ | Connection Est. Timer$_0$ Keepalive Timer$_0$ | Fast Application Timer$_0$ |
|---|---|---|---|---|
| | FIN_WAIT_2 Timer$_0$ 2MSL Timer$_0$ | Persist Timer$_0$ | Medium Application Timer$_0$ | Long Application Timer$_0$ |
| | Delayed ACK$_1$ | Retransmission Timer$_1$ | Connection Est. Timer$_1$ Keepalive Timer$_1$ | Fast Application Timer$_1$ |
| | FIN_WAIT_2 Timer$_1$ 2MSL Timer$_1$ | Persist Timer$_1$ | Medium Application Timer$_1$ | Long Application Timer$_1$ |
| 127 | Delayed ACK$_2$ | Retransmission Timer$_2$ | Connection Est. Timer$_2$ Keepalive Timer$_2$ | Fast Application Timer$_2$ |
| | FIN_WAIT_2 Timer$_2$ 2MSL Timer$_2$ | Persist Timer$_2$ | Medium Application Timer$_2$ | Long Application Timer$_2$ |
| | Delayed ACK$_3$ | Retransmission Timer$_3$ | Connection Est. Timer$_3$ Keepalive Timer$_3$ | Fast Application Timer$_3$ |
| | FIN_WAIT_2 Timer$_3$ 2MSL Timer$_3$ | Persist Timer$_3$ | Medium Application Timer$_3$ | Long Application Timer$_3$ |

FIGURE 18

MULTI-PROTOCOL AND MULTI-FORMAT STATEFUL PROCESSING

CROSS-REFERENCE TO RELATED APPLICATIONS

This application claims priority under 35 U.S.C. §119(e) to U.S. Provisional Application No. 60/419,710 filed Oct. 17, 2002, entitled MULTI-PROTOCOL AND MULTI-FORMAT STATEFUL PROCESSING, and is related to U.S. patent application Ser. No. 10/211,434, entitled HIGH DATA RATE STATEFUL PROTOCOL PROCESSING.

BACKGROUND OF THE INVENTION

1. Field of the Invention

This invention relates to data transfer processing systems and, more particularly, to a system and method for multi-protocol and multi-format stateful processing.

2. Background and Benefits of the Invention

Data transfer systems typically convey data through a variety of layers, each performing different types of processing. The number of different layers, and their attributes, vary according to the conceptual model followed by a given communication system. Examples include a model having seven layers that is defined by the International Standards Organization (ISO) for Open Systems Interconnection (OSI), and a five-layer model defined by the American National Standards Institute (ANSI) that may be referred to as the "Fibre Channel" model. Many other models have been proposed that have varying numbers of layers, which perform somewhat different functions. In most data communication systems, layers range from a physical layer, via which signals containing data are transmitted and received, to an application layer, via which high-level programs and processes share information. In most of the conceptual layer models, a Transport Layer exists between these extremes. Within such transport layers, functions are performed that are needed to coordinate the transfer of data, which may have been sent over diverse physical links, for distribution to higher-level processes.

Within the transport layer, a communication system coordinates numerous messages (such as packets) that each belong to a particular "flow" or grouping of such messages. Each message may be identified by its association with a particular flow identification key (flow key), which in turn is typically defined by information about the endpoints of the communication. Transport layer processing is generally performed by processing modules which will be referred to as transport layer terminations (TLTs), which manage data received from remote TLTs (or being transmitted to the remote TLTs) according to a set of rules defined by the transport layer protocol (TLP) selected for each particular flow. A TLT examines each message that it processes for information relevant to a flowstate that defines the status of the flow to which the message belongs, updates the flowstate accordingly, and reconstitutes raw received data on the basis of the flowstate into proper form for the message destination, which is typically either a remote TLT or a local host. Flows are typically bidirectional communications, so a TLT receiving messages belonging to a particular flow from a remote TLT will generally also send messages belonging to the same flow to the remote TLT. Management of entire flows according to selected TLPs by maintaining corresponding flowstates distinguishes transport layer processing from link level processing, which is generally concerned only with individual messages.

There are many well-known TLPs, such as Fibre Channel, SCTP, UDP and TCP, and more will likely be developed in the future. TLPs typically function to ensure comprehensible and accurate communication of information to a target, such as by detecting and requesting retransmission of lost or damaged messages, reorganizing various messages of a flow into an intended order, and/or providing pertinent facts about the communication to the target. Transmission Control Protocol (TCP) is probably the best-known example of a TLP, and is extensively used in networks such as the Internet and Ethernet applications. TCP is a connection-oriented protocol, and information about the state of the connection must be maintained at the connection endpoints (terminations) while the connection is active. The connection state information includes, for example, congestion control information, timers to determine whether packets should be resent, acknowledgement information, and connection identification information including source and destination identification and open/closed status. Each active TCP connection thus has a unique connection ID and a connection state. A TCP "connection" is an example of the more general TLP concept that is termed "flow" herein, while TCP "connection ID" and "connection state" are examples of the more general TLP concepts referred to herein as "flow key" and "flowstate," respectively. The flow key may be uniquely specified by a combination of the remote link (destination) address (typically an Internet Protocol or "IP" address), the remote (destination) TCP port number, the local link (source) address (also typically an IP address), the local (source) TCP port number, and in some cases a receiver interface ID. It may also be useful to include a protocol indication as part of the general flow key, in order to distinguish flows that have otherwise identical addressing but use different TLPs.

Data communications can also occur in many layers other than the classic transport layer. For example, iSCSI communications occur at layers above the transport layer, yet the communications include stateful messages belonging to a flow and are thus analogous, in some ways, to transport layer communications.

There is a constant demand for higher data rates for data communications systems, as computers are increasingly linked both locally (e.g., over local area networks) and over wide areas (e.g., over the Internet). In order to achieve higher data rates, commensurately faster processing is needed for stateful protocols in transport layers and elsewhere. Faster hardware, of course, may be able to proportionally increase processing speeds. However, hardware speed increases alone will not cost-effectively increase protocol processing speeds as quickly as desired, and thus there is a need for protocol processing systems that enable faster processing, for a given hardware speed, by virtue of their architecture and methods.

SUMMARY OF THE INVENTION

In summary, the present invention is directed to a system and method for multi-protocol and multi-format stateful protocol processing. In this regard stateful protocol processing entails maintaining a "state" to track the condition of a "flow" of data. The state of a particular flow is often updated to reflect the processing of individual data "messages" that belong to the flow, and the flow itself is identified by a flow key that is associated, explicitly or implicitly, with each message belonging to the flow. The protocol that is indicated for each message defines the processing steps to be performed on each message, in view of the present state of the flow.

In one aspect, the present invention relates to a method of processing data in a stateful protocol processing system ("SPPS") configured to process a multiplicity of flows of messages. The method includes receiving a first plurality of messages belonging to a first of the flows comporting with a first stateful protocol. In addition, a second plurality of messages belonging to a second of the flows comporting with a second stateful protocol are also received. Various events of at least first and second types associated with the first flow are then derived from the first plurality of received messages. The method further includes assigning a first protocol processing core to process the events of the first type in accordance with the first stateful protocol. A second protocol processing core is also assigned to process the events of the second type in accordance with the first stateful protocol.

The inventive SPPS described herein may be implemented in many ways, and details of some exemplary embodiments are described below. In one embodiment the above method may additionally include receiving a second plurality of messages belonging to a second of the flows comporting with a second stateful protocol. Various events of at least third and fourth types associated with the second flow are then derived from the second plurality of received messages. The method may then further include assigning a third protocol processing core to process the events of the third type in accordance with said second stateful protocol, and assigning a fourth protocol processing core to process the events of the fourth type in accordance with the second stateful protocol.

In another embodiment, the above method may also contemplate extracting a first flow identification key from the first plurality of messages. A first local flow identification proxy is then generated based upon the first flow identification key, and a first flow state characterizing the first flow is retrieved using the first local flow identification proxy. A second flow identification key may also be extracted from the second plurality of messages. In this case a second local flow identification proxy is generated based upon the second flow identification key, and a second flow state characterizing the second flow is retrieved using the second local flow identification proxy.

In another aspect, the present invention relates to a stateful protocol processing apparatus configured to process multiple flows of messages. The apparatus comprises an input processing unit disposed to receive a first plurality of messages of a first of the flows. The input processing unit operates to derive events of at least a first type and a second type from said first plurality of messages. The apparatus further includes a first protocol processing core and a second protocol processing core. A dispatcher is operative to assign the first protocol processing core to process events of the first type in accordance with a first stateful protocol, and to assign the second protocol processing core to process the events of the second type in accordance with the first stateful protocol.

In a particular embodiment the input processing unit is further operative to receive a second plurality of messages of a second of the flows, which adheres to a second stateful protocol. In this embodiment the input processing unit derives events of at least a third type and a fourth type from the second plurality of messages. The dispatcher may further assign a third protocol processing core to process events of the third type in accordance with the second stateful protocol, and may also assign a fourth protocol processing core to process the events of the fourth type in accordance with the second stateful protocol. In addition, the dispatcher may be further operative to generate a first local flow identification proxy based upon a first flow identification key extracted from the first plurality of messages. This embodiment may further include a lookup controller disposed to cooperate with the dispatcher in retrieving a first flow state characterizing the first of the flows using the first local flow identification proxy.

Embodiment details and some alternatives are set forth in the accompanying drawings and the description below. Because all embodiments of the invention cannot reasonably be described herein, the described embodiments must be understood as illustrating, rather than limiting, the invention.

BRIEF DESCRIPTION OF THE DRAWINGS

For a better understanding of the nature of the features of the invention, reference should be made to the following detailed description taken in conjunction with the accompanying drawings, in which:

FIG. 1A is a block diagram showing general interface connections to a stateful protocol processing system.

FIG. 1B is a block diagram of a transport layer termination system within a typical computer system.

FIG. 18 provides an exemplary entry within a timer table maintained by the lookup controller.

DETAILED DESCRIPTION OF THE INVENTION

I. Overview of Stateful Protocol Processing

Figure 2:
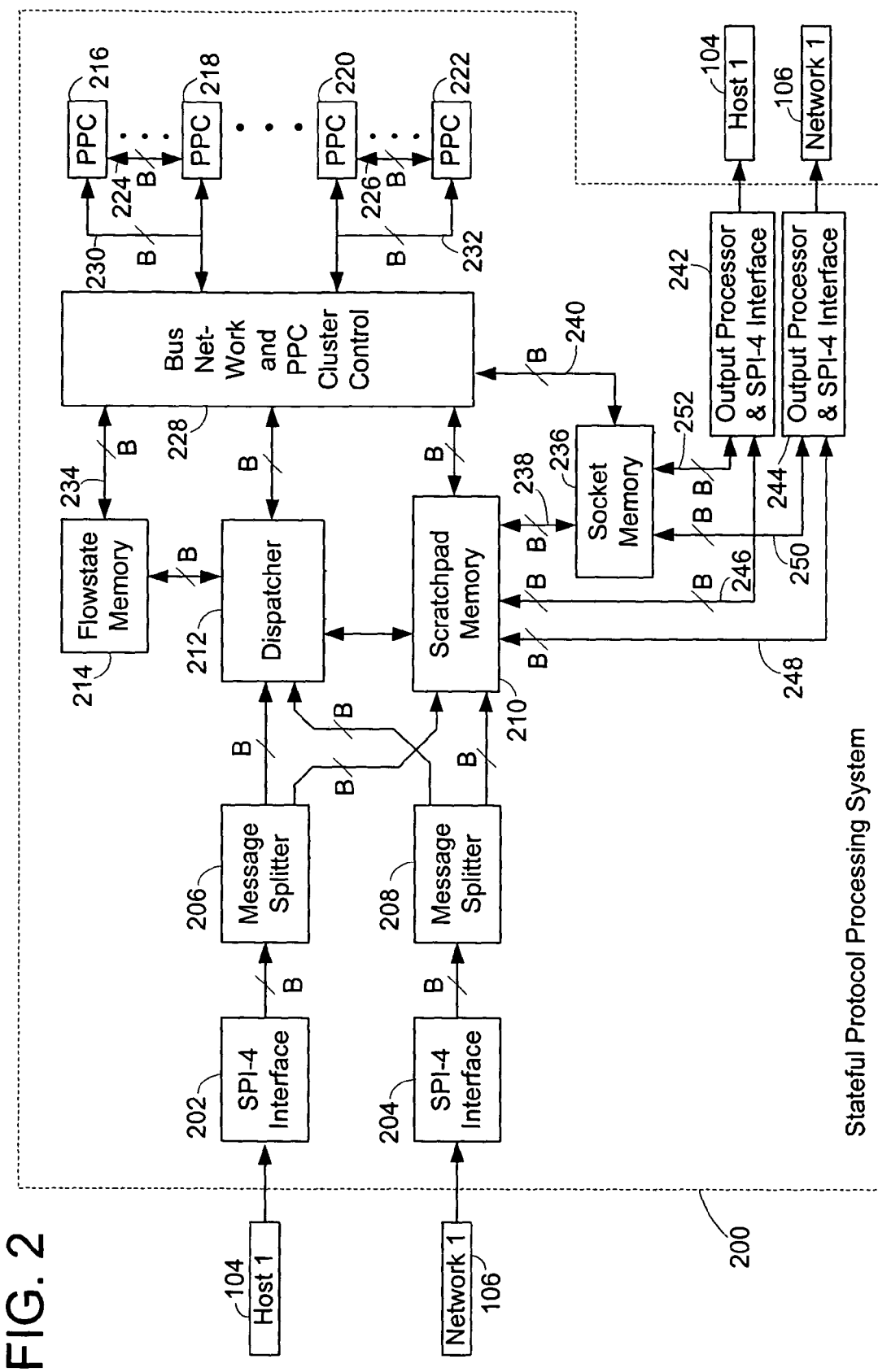
FIG. 2 is a more detailed block diagram of a stateful protocol processing system such as that of FIG. 1.

Stateful protocol processing entails processing data that arrives in identifiable and distinguishable units that will be referred to herein as "messages." A multiplicity of messages will belong to a "flow," which is a group of messages that are each associated with a "flow key" that uniquely identifies the flow. The methods and apparatus described herein for stateful protocol processing are most useful when a multiplicity of different flows is concurrently active. A flow is "active" whether or not a message of the flow is presently being processed, as long as further messages are expected, and becomes inactive when no further processing of messages belonging to the particular flow are expected.

A "stateful protocol" defines a protocol for treating messages belonging to a flow in accordance with a "state" that is maintained to reflect the condition of the flow. At least some (and typically many) of the messages belonging to a flow will affect the state of the flow, and stateful protocol processing therefore includes checking incoming messages for their effect on the flow to which they belong, updating the state of the flow (or "flowstate") accordingly, and processing the messages as dictated by the applicable protocol in view of the current state of the flow to which the messages belong.

Processing data communications in accordance with TCP (Transmission Control Protocol) is one example of stateful protocol processing. A TCP flow is typically called a "connection," while messages are packets. The flow key associated with each packet consists primarily of endpoint addresses (e.g., source and destination "socket addresses"). A flowstate is maintained for each active connection (or flow) that is updated to reflect each packet of the flow that is processed. The actual treatment of the data is performed in accordance with the flowstate and the TCP processing rules.

TCP is a protocol that is commonly used in TLT (transport layer termination) systems. A typical TLT accepts messages in packets, and identifies a flow to which the message belongs, and a protocol by which the message is to be processed, from information contained within the header of the packet. However, the information that is required to associate a message with a flow to which it belongs and a protocol by which it is to be processed may be provided in other ways, such as indirectly or by implication from another message with which it is associated, or by a particular source from which it is derived (for example, if a particular host is known to have only one flow active at a time, then by implication each message from that host belongs to the flow that is active with respect to that host).

Moreover, stateful protocol processing as described herein may be utilized in places other than TLT systems, in which case the information about flow and protocol may well be provided elsewhere than in an incoming packet header. For example, an incoming TCP packet may encapsulate data that is to be processed according to an entirely different protocol, in a different "layer" of processing. Accordingly, the stateful protocol processing effected within the context of a TLT system described herein provides a specific example of a general stateful protocol processing system ("SPPS"). Messages belonging to one stateful protocol flow may, for example, be encapsulated within messages belonging to a distinct stateful protocol. The well-known communication protocol referred to as "SCSI" provides examples of data communication at layers other than a transport layer. A common use of SCSI is between a host and a peripheral device such as a disk drive. SCSI communications may take place over a special purpose connection dedicated to SCSI communications, or they may be encapsulated and conveyed via a different layer. SCSI may be encapsulated within messages of some transport layer protocols, such as Fibre Channel and TCP. "FCP" is a protocol by which SCSI messages are encapsulated in Fibre Channel protocol messages, while "iSCSI" is a protocol by which SCSI messages are encapsulated in TCP messages. FCP and iSCSI are each stateful protocols.

One example of such encapsulation involves information belonging to a first stateful flow, such as an iSCSI flow, that is communicated over a local network within messages belonging to a distinct second stateful flow, such as a TCP connection. A first SPPS may keep track of the state of the encapsulating TCP connection (flow). The same SPPS, or a different second one, may determine that some of the messages conveyed by the encapsulating flow form higher-level messages that belong to an encapsulated iSCSI flow. The flow key of the encapsulated iSCSI flow may be contained within each encapsulated message, or it may be determined by implication from the flow key of the encapsulating TCP/IP packets that are conveying the information. Given knowledge of the flow key of the encapsulated flow, and of the protocol (iSCSI) by which the encapsulated flow is to be processed, the SPPS may maintain a state for the iSCSI flow, and may identify and process the messages associated with the flow in accordance with the specified protocol (iSCSI, in this example).

Thus, a transport layer termination system may provide a good example of a SPPS (stateful protocol processing system). Indeed, a TLT is likely to include at least some stateful processing, thus qualifying as a SPPS. However, a SPPS can be utilized for other data communication layers, and for other types of processing, as long as the processing includes updating the flowstate of a flow to which a multiplicity of messages belong, in accordance with a stateful protocol that is defined for the messages. Therefore, although the invention is illustrated primarily with respect to a TLT system, care should be taken not to improperly infer that the invention is limited to TLT systems.

FIG. 1A illustrates interface connections to a SPPS 100. A SPPS packet input processing block 102 may accept data in packets from any number of sources. The sources typically include a host connection, such as "Host 1" 104, and a network connection, such as "Network 1" 106, but any number of other host connections and/or network connections may be used with a single system, as represented by "Host N" 108 and "Network M" 110. A protocol processing block 112 processes incoming data in accordance with the appropriate rules for each flow of data (i.e., stateful protocol rules such as are defined by the well-known TCP, for stateful messages specified for processing according to such stateful protocol).

Flows generally involve bidirectional communications, so data is typically conveyed both to and from each host connection and/or network connection. Consequently, a packet output processing block 114 delivers data to typically the same set of connections ("Host 1" 104 to "Host N" 108 and "Network 1" 106 to "Network M" 110) from which the packet input processing block 102 receives data.

FIG. 1B provides an overview of connections to a TLTS 150 that provides an example of a simple SPPS as implemented within a computing system 152. A single host system 154 is connected to the TLTS 150 via a connection 156 that uses a well-known SPI-4 protocol. The host 154 behaves as any of the hosts 104-108 shown in FIG. 1A, sending messages to, and receiving messages from, the TLTS 150. The TLTS 150 is connected to a Media Access Control ("MAC") device 158 via another SPI-4 protocol connection 160. The MAC 158 is connected to a network 162 via a suitable connection 164. The MAC converts between data for the TLTS (here, in SPI-4 format), and the physical signal used by the connection 164 for the network 162. The network 162 may have internal connections and branches, and communicates data to and from remote communications sources and/or targets, exemplified by as "source/target system 1" 170, "source/target system 2"180, and "source/target system 3" 190. Any number of communication source/targets may be accessed through a particular network. Source/target systems may be similar to the computing system 152. More complicated source/target systems may have a plurality of host and network connections, such as is illustrated in FIG. 1A. Thus, some source/target systems may effectively connect together a variety of different networks.

FIG. 2 is a block diagram showing modules of an exemplary SPPS 200. In one embodiment, two SPI-4 Rx interface units 202 and 204 receive data over standard SPI-4 16-bit buses that accord with "System Packet Interface Level 4 (SPI-4) Phase 2: OC-192 System Interface for Physical and Link Layer Devices. Implementation Agreement OIF-SPI4-02.0," Optical Internetworking Forum, Fremont, Calif., January 2001 (or latest version). The number of connections is important only insofar as it affects the overall processing capability needed for the system, and from one to a large number of interfaces may be connected. Each individual interface may process communications to any number of network and/or host sources; separate physical host and network connections are not necessary, but may be conceptually and physically convenient. Moreover, while SPI-4 is used for convenience in one embodiment, any other techniques for interface to a physical layer (e.g., PCI-X) may be used alternatively or additionally (with processing in the corresponding input blocks, e.g., 202, 204, conformed) in other embodiments.

II. Message Splitting

Still referring to FIG. 2, data received by the interfaces 202 and 204 is conveyed for processing to message splitter modules 206 and 208, respectively. The transfer typically takes place on a bus of size "B." "B" is used throughout this document to indicate a bus size that may be selected for engineering convenience to satisfy speed and layout constraints, and does not represent a single value but typically ranges from 16 to 128 bits. The message splitter modules 206 and 208 may perform a combination of services. For example, they may reorganize incoming messages (typically packets) that are received piece-wise in bursts, and may identify a type of the packet from its source and content and add some data to the message to simplify type identification for later stages of processing. They may also split incoming messages into "payload" data and "protocol event" (hereafter simply "event") data.

As the data arrives from the SPI-4 interface, a message splitter module such as 206 or 208 may move all of the data into known locations in a scratchpad memory 210 via a bus of convenient width B. Alternatively, it may send only payload data to the scratchpad, or other subset of the entire message. The scratchpad 210 may be configured in various ways; for example, it may function as a well-known first-in, first-out (FIFO) buffer. In a more elaborate example, the scratchpad 210 may be organized into a limited but useful number of pages. Each page may have a relatively short scratchpad reference ID by which a payload (or message) that is stored in the scratchpad beginning on such page can be located. When the payload overruns a page, an indication may be provided at the end of the page such that the next page is recognized as concatenated, and in this manner any length of payload (or message) may be accommodated in a block of one or more pages that can be identified by the reference ID of the first page. A payload length is normally part of the received header information of a message. The scratchpad reference ID may provide a base address, and the payload may be disposed in memory referenced to the base address in a predetermined manner. The payload terminates implicitly at the end of the payload length, and it may be useful to track the number of bytes received by the scratchpad independently, in order to compare to the payload length that is indicated in the header for validation. If the scratchpad also receives the header of a message, that header may be similarly accessed by reference to the scratchpad reference ID. Of course, in this case the payload length validation may be readily performed within the scratchpad memory module 210, but such validation can in general be performed many other places, such as within the source message splitter (206, 208), within the dispatcher 212, or within a PPC 216-222, as may be convenient from a data processing standpoint.

A. Event Derivation

A typical function of a message splitter 206, 208 is to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified. (Note that systems that perform stateful protocol processing may also process stateless messages. TLPs, for example, typically also process packets, such as Address Request Protocol or ARP packets, which are not associated with an established flow and thus do not affect a flowstate. Such "stateless" packets may be processed by any technique that is compatible with the presently described embodiments. However, these techniques are not discussed further herein because the focus is on the processing of stateful messages that do affect a flowstate for a message flow.)

The event that is derived from an incoming message by a message splitter module such as 206 or 208 may take a wide range of forms. In the simplest example, in some embodiments it may be the entire message. More typically, the event may exclude some information that is not necessary to make the decisions needed for TLP processing. For example, the payload may often be excluded, and handled separately, and the event may then be simply the header of a message, as received. However, in some embodiments information may be added or removed from the header, and the result may be reformatted, to produce a derived event that is convenient for processing in the SPPS.

B. Event Typing

Received messages may, for example, be examined to some extent by the interface (202, 204) or message splitter (206, 208) modules, and the results of such examination may be used to derive a "type" for the event. For example, if a packet has no error-checking irregularities according to the protocol called for in the flow to which the packet belongs, then the event derived from such package may be identified with an event "type" field that reflects the protocol and apparent validity of the message. Each different protocol that is processed by the SPPS may thus have a particular "type," and this information may be included in the event to simplify decisions about subsequent processing. Another type may be defined that is a message fragment; such fragments must generally be held without processing until the remainder of the message arrives. Message fragments may have subtypes according to the protocol of the event, but need not. A further event type may be defined as a message having an error. Since the "type" of the event may be useful to direct the subsequent processing of the event, messages having errors that should be handled differently may be identified as a subtype of a general error. As one example, error type events may be identified with a subtype that reflects a TLP of the event.

Any feature of a message (or of a derived event) that will affect the subsequent processing may be a candidate for event typing. Thus, event typing may be very simple, or may be complex, as suits the SPPS embodiment from an engineering perspective. Event typing is one example of augmentation that may be made to received message information in deriving an event. Other augmentation may include revising or adding a checksum, or providing an indication of success or failure of various checks made upon the validity of the received message. Relevant locations may also be added, such as a scratchpad location indicating where the message information may be found within the scratchpad memory 210. Note that if a message source that uses the SPPS, such as a host, is designed to provide some or all of such "augmenting" information within the message (e.g., the header) that it conveys to the SPPS, then the message splitter may not need to actually add the information in order to obtain an "augmented" event.

In addition to augmenting message information, event derivation may include reformatting the event information to permit more convenient manipulation of the event by the SPPS. For example, processing may be optimized for certain types of events (such as TCP events, in some systems), and deriving events of other types may include reformatting to accommodate such optimized processing. In general, then, events may be derived by doing nothing to a received message, or by augmenting and/or reformatting information of the message, particularly state-relevant information, to aid later processing steps. For TCP, for example, the resulting event may consist primarily of the first 256 bytes of the packet, with unnecessary information removed and information added to reflect a scratchpad location in which it is copied, the results of error checking, and the event typing. If a host is configured to prepare data in a form that is convenient, a resulting host event issued from the message splitter may be the first bytes of the message (e.g., the first 256 bytes), with few or no changes.

It may be convenient to implement the message splitter functions using an embedded processor running microcode, which lends itself to reprogramming without a need to change the device design. However, the message splitter function may alternatively be implemented via software executed in a general-purpose processor, or in an application specific integrated circuit (ASIC), or in any other appropriate manner.

Many alternatives are possible for the particular set of processing steps performed by message splitter modules such as 206 and 208. For example, a "local proxy" of the flow ID (i.e., a number representing the flow ID of the message that suffices to identify the flow within the SPPS and is more useful for local processing) could be determined and added to the event at the message splitter—a step that is performed during a later processing block in the illustrated embodiments. Also, it is not necessary that incoming messages be split at all. Instead, incoming messages may be kept together: for example, they may be stored intact in the scratchpad memory so as to be available to many parts of the system, or they may be forwarded in their entirety directly to the event dispatcher 212 and thence to the protocol processing cores (PPCs) 216-222 that are described below in more detail. If incoming messages are not split, then these modules 206, 208 might, for example, be renamed "packet preprocessors" to reduce confusion. The skilled person will understand that, in many cases, design convenience primarily determines which module performs any particular acts within a complex system.

III. Event Dispatcher

As shown in FIG. 2, the events prepared by the message splitters 206, 208 are forwarded to an event dispatcher module 212, where they may be entered into a queue. The event dispatcher module 212 (or simply dispatcher) may begin processing the incoming event by initiating a search for a local flow ID proxy, based on the flow identification "key" that arrives with the message.

A. Local Flow ID Proxy

The flow identification key (or simply "flow key") uniquely identifies the flow to which the message belongs in accordance with the TLP used by the flow. The flow key can be very large (typically 116-bits for TCP) and as such it may not be in a format that is convenient for locating information maintained by the SPPS that relates to the particular flow. A local flow ID proxy may be used instead for this purpose. A local flow ID proxy (or simply "local proxy ID," "local flow ID," or "proxy ID") generally includes enough information to uniquely identify the particular flow within the SPPS, and may be made more useful for locating information within the SPPS that relates to the particular flow. For example, a local flow ID proxy may be selected to serve as an index into a flowstate memory 214 to locate information about a particular flow (such as a flowstate) that is maintained within the SPPS. Not only may a local flow ID proxy be a more convenient representative of the flow for purposes of the SPPS, it will typically be smaller as well.

A local flow ID proxy may be determined within the dispatcher module or elsewhere, such as within the message splitter modules 206, 208 as described previously. Given the very large number of local flow ID proxies that must be maintained, for example, in large TLTSs (transport layer termination systems), determining the proxy ID may be a non-trivial task. If so, it may be convenient from an engineering perspective to make such determination by means of a separate "lookup" module, as described below. In some embodiments, such a lookup module may be a submodule of the message splitter modules 206, 208, or it may be a submodule of the dispatcher module, or it may be best designed as independent and accessible to various other modules.

A search for the local flow ID proxy may be simplified, or even eliminated, for events received from a host that is configured to include the local flow ID proxy rather than (or in addition to) the usual TLP flow key that will accompany flow messages on a network. Such a host configuration can reduce the workload of whatever module would otherwise determine the local flow ID proxy, e.g., the dispatcher. Another way to reduce the local flow ID proxy lookup effort may be to maintain a "quick list" of the most recently used flow IDs, and their associated proxies, and to check this list first for each arriving message or event.

If a message arrives that belongs to a flow for which no local flow ID proxy or flowstate is known, the dispatcher 212 may create a new local flow proxy ID. In many cases the dispatcher (or a lookup submodule) may then initialize a flowstate for such new flow. It may be useful to select such proxy ID as a value that will serve as a table entry into memory that may be used to store a flowstate for such new flow in a convenient memory, such as flowstate memory 214. Such memory may be quite large in large systems, requiring special management.

B. Memories

Each distinct "memory" described herein, such as the scratchpad memory 210 and the flowstate memory 214, typically includes not only raw memory but also appropriate memory controller facilities. However, the function of the memory controller is generally not central to the present description, which merely requires that the memory either store or return specified blocks of data in response to requests. Because SPPSs as described herein may be made capable of concurrently processing millions of active flows (or may be limited to processing a few thousand, or even fewer, active flows), and because a typical flowstate may be approximately 512 bytes, multiple GB of memory may be needed to implement the SPPS of FIG. 2. Techniques for implementing such large memories are known and constantly evolving, and any such known or subsequently developed technique may be used with any type of memory to form the SPPS of FIG. 2, so long as adequate performance is achieved with such memory. Memories are distinguished from each other as distinct memories if they function in a substantially independent manner. For example, distinct memories may be independently addressable, such that addressing a data item stored in one memory does not preclude simultaneously addressing an unrelated item in a distinct memory. Distinct memories may also be independently accessible, such that accessing an item in one memory does not preclude simultaneously accessing an unrelated item in a distinct memory. Due to such independence, distinct memories may in some cases avoid data access bottlenecks that may plague common (or shared) memories.

C. Lookup Submodule

The dispatcher module 212 illustrated in FIG. 2 may include submodules that perform particular subsets of the dispatcher tasks. For example, it may be useful to incorporate a separate "lookup" module to perform the function of looking up a local flow ID proxy based on the flow key that is included in the arriving event. Another function of the dispatcher 212 may be to establish and maintain flow timers for active flows, as may be required by the particular TLP associated with each flow. When it is convenient to maintain such flow timers in memory that is indexed by the local flow ID proxy, the lookup module may also conveniently perform the function of monitoring the flow timers. Also, the dispatcher 212 may provide the flowstate to a PPC when assigning it to process events of a flow. If the flowstate is similarly maintained in memory at a location indexed by the local flow ID proxy, then this may be another function that may conveniently be performed by the lookup module. Such a lookup module may be independent, or it may be essentially a submodule of the dispatcher. The lookup module could also be associated primarily with other sections of the system. For example, it could be primarily associated with (or even a submodule of) a message splitter module 206, 208, if that is where the lookup tasks are performed, or it could be primarily associated with the PPCs 216-222 if the lookup tasks were performed primarily there.

The lookup process may require extensive processing, such as a hash lookup procedure, in order to select or determine a local flow ID proxy based on raw flow identification or "flow key." As such, a lookup module (or submodule) may be implemented with its own microprocessor system and supporting hardware. When flow ID proxy determination is performed by a lookup module (or submodule), the dispatcher may assign and transfer an event to a PPC without waiting for the determination to be completed, and the lookup module can later transfer flow information (obtained by use of the local flow ID proxy) to the assigned PPC without further interaction with the dispatcher.

Once a "lookup" or other submodule is established as a distinct entity, it may as a matter of design convenience be configured to perform any of the tasks attributed to the dispatcher (or other module in which it is located or with which it is associated, and indeed in many cases may perform tasks that are attributed, in the present description, to other modules, such as the message splitter modules. The ability to move functionality between different functional modules is a common feature of complex processing systems, and the skilled person will understand that moving functionality between modules does not, in general, make a system significantly different.

Many other functions may be performed by the dispatcher 212, or by its submodules. For example, the dispatcher may request a checksum from the scratchpad memory 210 reflecting the payload of the message, combine it with a checksum included with the event that covers that portion of the message converted into the event, and incorporate the combined checksum into the event. A bus of modest size is shown between the dispatcher 212 and the other processing blocks that is sufficient for this purpose. As with many dispatcher functions, this function could be performed elsewhere, such as in the message splitter blocks 206, 208, or during later processing.

D. Director Submodule

Another module, or dispatcher submodule, may be created to perform some or all of the decision making for the dispatcher. Such submodule, which will be referred to as a "Director," may perform the steps involved in selecting a particular PPC to handle a particular event of a flow, and keeping track, for the overall SPPS (stateful protocol processing system), of the status of active flow processing in the various PPCs.

The "flow processing status" maintained by the Director submodule may indicate, for example, that other events of the flow are presently being processed by a PPC, or that a new flowstate generated after PPC processing of a previous event (of the flow) is presently being written to the flow state memory. It may also indicate if the flow is being torn down, or that a timer event is pending for that flow. Such flow processing status information may be used, for example, to cause the Director submodule to delay the forwarding of an event to a PPC when appropriate, such as to avoid overwriting a flowstate while the flow processing status of a flow says that its flowstate is being written from a PPC to the flowstate memory. Once the update of the flowstate memory is complete, as reflected by the flow processing status, the new event may be forwarded to a PPC.

The Director submodule's flow processing status information may also be used, for example, to prevent timer expirations from being improperly issued while a flow is being processed by a PPC. Such timer events should not be issued if the very act of processing an event may cause such a timer expiration to be cancelled. The Director submodule may refer to the flow processing status information before allowing timer events to be issued to PPCs, so that such timer events are issued only when no other events are active for that flow. As with the lookup submodule, organization of the Director as a distinct module may permit the dispatcher to simply hand off an incoming event to the Director.

E. Protocol Processing Cores and Buses—Structural Introduction

Having established a local flow ID proxy for a message, the dispatcher 212 determines where the message event (or entire message, if messages and events are not split) should be processed in accordance with the TLP associated with the flow. In some embodiments, the bulk of such TLP processing is performed by a Protocol Processing Core ("PPC"). A cluster having a number of PPCs is represented by the PPCs 216 through 218, while PPCs 220 and 222 represent another cluster of PPCs. Two PPC clusters are shown, but any number of such PPC clusters may be used. For example, one TLTS embodiment may comprise only a single cluster of PPCs, while a complex SPPS embodiment may include hundreds of clusters. Two of the PPCs in a cluster are shown in FIG. 2, but two or more PPCs may be used in any given cluster, with five PPCs per cluster being typical. Though it may be convenient for design symmetry, the number of PPCs in each cluster need not be identical. The particular organization of PPCs into clusters is selected, in part, to facilitate the transfer of data by reducing bus congestion. Each cluster may utilize an intracluster intercore bus 224 (or 226) interconnecting PPCs of each cluster, and each cluster will typically be connected to a bus network and control block 228 by a bus 230 or 232. Data between the dispatcher 212 and the PPCs may be organized by a bus network and control block 228. The bus network and control block 228 functions primarily as a "crossbar" switch that facilitates communication between a variety of modules, as described in more detail below.

PPCs (e.g., 216-222) typically include a processor core and microcode (i.e., some form of sequential instructions for the processor core) that enables the PPC to process events that are submitted to it. They also typically include local memory, which the PPC can access without interfering with other PPCs, sufficient to hold the relevant flowstate data of a flow that the PPC is processing. It will typically be convenient to maintain much or all of the flowstate of a particular flow in the local memory of the PPC processing a message event for that flow. The PPC local memory may be organized into a number of blocks or "workspaces" that are each capable of holding a flowstate. PPCs will typically have a queue for incoming events, and workspaces for several different flows having events in the queue that are concurrently being processed by the PPC.

The buses represented herein are described as being bidirectional in nature. However, if convenient, the buses may be implemented as two one-way buses that in some cases will not be of equal bit-width in both directions. Thus, a bus indicated as having a width B bits represents a bus width that may be selected for convenience in a particular implementation, and may be directionally asymmetrical. The typical considerations for bus size apply, including space and driver constraints of the physical layout, and the required traffic needed to achieve a particular performance target. The buses are not shown exhaustively; for example, a message bus may usefully be connected (for example by daisy-chaining) between all of the physical pieces of the TPTS, even though such a bus is not explicitly shown in FIG. 2. Moreover, if the SPPS is implemented as program modules in software or firmware running on a general processing system, rather than in a typical implementation that employs ASICs having embedded microprocessors, the buses represented in FIG. 2 may represent data transfer between software modules, rather than hardware signals.

F. Assigning Events to a PPC

In some embodiments of the present invention, the dispatcher 212 selects a particular PPC to process events associated with a particular flow. There are a number of considerations for such assignment. First, the PPC must be one of the PPCs that are compatible with, or configured to process, events of the type in question. Such compatibility may be determined in the dispatcher, or in a flow processing status subsystem of the dispatcher, by means of a table of PPCs that indicates the event types or protocols the PPC is compatible with, which may in turn be compared with the protocol or event type requirements of the incoming event. In some embodiments the event is marked with an indication of its "type" at another stage of processing, for example in the message splitter module. The dispatcher then needs only select a PPC that is compatible based on the predetermined "type" of the event. Typically, the event types will be so defined that all messages having state-relevant information for a particular flow will also have the same event type, and can be processed by the same PPC. Thus, a PPC will be selected from the constellation of PPCs that can process the indicated event type.

A PPC is selected from this constellation of compatible PPCs according to an algorithm that may, for example, compare PPC loading to find a least-loaded PPC, or it may select a PPC in a round-robin manner, or it may select PPCs randomly. Typically, events of each flow are specifically directed to a PPC, rather than being directed to a PPC as a member of a class of flows. Such individualized processing of each flow permits load balancing irrespective of the attributes of a class of flows. When flows are assigned as members of a class, such as one that shares certain features of a flow ID (or flow key), it may happen that a large number of such a class needs to be processed concurrently, overwhelming the capacity of a PPC, while another PPC is unloaded. This effect may be accentuated when flows are assigned to PPC in classes that have a large number of members. While many embodiments assign each flow uniquely (in a class size of one), it may be effective in some embodiments to assign flows in classes, particularly small classes or classes whose membership can be changed to balance loading.

Similar effects for load balancing may be achieved, even if flows have been assigned in a large class, if a mechanism is provided for releasing specific flows from assignment to particular PPCs. In many embodiments, both assignment and release of flows to PPCs is done for individual or specific flows. Finally, even if both assignment of flows to a PPC, and release of flows from a PPC, is performed for classes of flows, an equivalent effect may be achieved by making the classes flexibly reassignable to balance loading. That is, if the class that is assigned to a PPC can be changed at the level of specific flows, then loading can be balanced with great flexibility. In each case it is possible to change the flows assigned to a PPC in singular units, such that a flow is ultimately assigned to a PPC essentially irrespective of any fixed class attributes, such as characteristics that hash a flow ID to a particular value, and similarly irrespective of other flows that may be assigned to that PPC (or to another PPC).

After selecting a PPC, the dispatcher 212 forwards the event to the PPC together with instructions regarding a flow-state "workspace." As mentioned above, the decisions for selecting a PPC may be performed in the Director submodule of the dispatcher. In a typical embodiment, the dispatcher 212 first determines if an incoming event belongs to a flow that already has events assigned to a particular PPC. A submodule, such as a Core Activity Manager that tracks the activity of PPCs, may perform this determination in some embodiments, while in others embodiments the Director submodule may perform these functions. In the case that a PPC is already assigned for events of the flow of the incoming event, the incoming event is typically forwarded to the same PPC, which may already have the flowstate present within its local memory.

However, if no PPC is presently assigned to the flow, then the dispatcher selects a particular PPC, for example the PPC 216, to process the incoming event (or assigns the flow to the particular PPC). Selection may be based upon information of the Core Activity Manager, which maintains activity status that can be used to balance loading on the various (compatible) PPCs. The Director submodule may perform the actual assignment and balancing decisions, and in some embodiments the Director and the Core Activity Manager are substantially a single submodule having a dedicated processor and program code to perform these tasks. The assignment may be simply "round robin" to the compatible PPC that has least recently received an event, or on the basis of PPC queue fullness, or otherwise.

After a PPC 216 is assigned to process the incoming event, a workspace is selected in the local memory of the PPC 216 and the current flowstate of the flow of the incoming event is established in the selected workspace. Selection of the workspace may be done by the dispatcher module (for example, by its Director submodule), or otherwise, such as by the PPC on a next-available basis. The flowstate may be established in the selected workspace in any convenient manner. For example, the dispatcher may send the flowstate to the PPC via the dispatcher (e.g., as an action of the lookup submodule), or the PPC itself may request the flowstate from a memory (e.g., the flowstate memory 214). The event is typically delivered from the dispatcher 212 to an input queue of the PPC 216, and is associated with the selected workspace. Also, separately or as part of the event, the size and location of the data payload in scratchpad memory (if any) is typically conveyed to the PPC 216. Having this information, the PPC 216 will be able to process the event when it is reached in the queue, as described subsequently in more detail. When the PPC 216 finishes processing a particular event, it will, in some embodiments, transmit a "done" message to the dispatcher 212, so that the dispatcher can track the activity of the PPC. A submodule such as the Core Activity Module or the Director may, of course, perform such tracking.

G. Counting Events to Track Active Flow Processing

Having transmitted an event to a selected PPC (216), the dispatcher 212 increments an event counter in a location associated with the flow (and thus with the PPC 216). The event counter may be maintained in a local memory block, associated with the local flow ID proxy, that is reserved for such information about current PPC processing (e.g., in the core activity manager within the dispatcher), or in another convenient location. The event counter is incremented each time an event is sent to the PPC, and is decremented each time the PPC returns a "done" message for that flow. As long as the event counter is non-zero, a PPC is currently processing an event for the associated flow. When the event counter reaches zero for a particular flow, the PPC (216) no longer has an event to process for the particular flow, and those of its resources that were allocated for processing the particular flow may be released to process other flows. Note that the PPC 216 may be processing events of other flows, and that its release from processing the particular flow may be made irrespective of such other flows.

If the event counter associated with the flow of an event arriving at the dispatcher 212 is not zero, then it may be preferable to assign and transfer the arriving event to the same PPC. In some embodiments, if a PPC is already processing an event, the global (i.e., flowstate memory 214) version of the flowstate is no longer valid. Rather, only the flowstate in the PPC workspace is valid. In such embodiments, the valid flowstate in the present PPC workspace should be made available to a subsequently selected PPC, which in turn should be done only after the present PPC is finished processing the event. Accordingly, at least in such embodiments, it will generally be more convenient to assign the same PPC to process arriving events belonging to a selected flow until that PPC completes all pending events for the selected flow.

An event arriving at the dispatcher 212 for a specified flow that is already assigned to a PPC may sometimes need to be transferred, or assigned to a different PPC. In such a case it may be convenient to retain the event in the dispatcher 212 until the current PPC completes processing all events it has been assigned. Holding the event in the dispatcher 212 avoids the need to coordinate two PPCs that are simultaneously updating a flowstate for the particular flow. Before such handover occurs, it may also be convenient to allow the PPC to "check-in" its workspace (memory reflecting the present flowstate) to the Flow Memory before assigning the new PPC. Alternatively, the workspace may be transferred from the current PPC directly to the new PPC after all events of the current PPC queue have been processed.

If an event arrives at the dispatcher for a flow that is active, but the related event counter is zero when an event arrives at the dispatcher 212 (indicating that no PPC is presently assigned to the flow), then the dispatcher (or its Director submodule) will select a PPC that is available to process that event type. The selection is typically independent of previous processing, and may be based on various factors such as load sharing and event-type processing capability. As such, the PPC selected next will likely differ from the PPC that previously processed events belonging to the flow. However, in some embodiments consideration may be given to previous processing of a particular flow by a particular PPC, such as when the PPC in fact retains useful state information. Once the PPC selection is made, processing continues as described previously, with the event conveyed to the new PPC, and the flowstate disposed in a local workplace selected within the PPC. The dispatcher 212 either transfers the current flowstate to the new PPC or indicates where in the flowstate memory 214 the present flowstate is to be found.

An event counter is just one means that may be used to determine whether a particular PPC is presently processing a previous event of the same flow. Alternatively, for example, the PPC presently processing an event of a flow might flag the dispatcher 212 when it finds no events in its input queue associated with an active workspace. Any other appropriate procedure may also be used to determine whether a PPC is presently assigned to processing a particular flow.

H. Updating Flowstate and Releasing a PPC

A PPC may be released from responsibility for processing events of a particular flow after the associated event counter reaches zero. Such a release means that the PPC may be assigned to process events of a different flow, since it will generally therefore have a workspace free. In general, the PPC may be processing other flows at the same time, and the release does not affect the responsibilities of the PPC for such other flows. In the typical circumstance that the event counter (or other indication) shows that events of a particular flow may be reassigned to another PPC for processing, the SPPS is enabled to balance PPC processing loads by shifting specific individual flows between different PPCs (of those able to handle the event types of the flow) independently of other flows that may be handled by the PPCs. As compared with techniques that cause PPCs to handle events for a class of flows (such as a class of flows whose flow keys have certain characteristics), such independent flow assignment may reduce the statistical probability that one or more PPCs are idle while another PPC is processing events continuously.

Before a PPC is released, the flow memory that has been updated by the PPC (216) is stored where it will be available to a different PPC that may be selected at a later time to process the same flow. This may be accomplished in any appropriate manner, for example by transferring the contents of the relevant PPC workspace to the dispatcher 212 and thence to the flowstate memory 214. Alternatively, the PPC (216) may convey the flowstate information to a known location in the flowstate memory 214 in cooperation with the dispatcher 212, so that the dispatcher is aware that the flowstate has been updated and is ready for future access. The flowstate may be conveyed more directly from the PPC (216) to the flowstate memory 214, such as via a bus 234 from the bus network and control block 228. The bus 234 may be used for either "checkout" of a flowstate from the flowstate memory 214 to a PPC, or for "check-in" of an updated flowstate from a PPC to the flowstate memory 214. When the event counter reaches zero, and the flowstate has been checked-in to the flowstate memory 214, the present PPC may be released and the flow will revert to a condition reflecting that no PPC is currently assigned to it. Within the PPC, the flowstate workspace may be indicated as free.

An alternative to storing flowstates in the flowstate memory 214 may be used in some embodiments. For a SPPS that is provided with sufficient memory local to the PPCs, the flowstate may be maintained in a workspace of the last PPC that processed it until such time as it is needed elsewhere, such as in another PPC. In such embodiments, the flowstate may be transferred to the appropriate workspace in the new PPC via an intra-cluster bus such as 224 or 226. This is more likely to be a practical alternative for small SPPSs that handle a limited number of concurrent flows.

IV. Socket Memory and Output Processing

In TLP applications that guarantee message delivery, for example TCP, one requirement is the confirmation that a sent message was correctly received. In these TLPs, if the message is not correctly received, the message should be retransmitted. Because it may be some time before a request for retransmission arrives, transmitted messages need to be maintained in memory (e.g., in a "send buffer") for some period of time. Send buffering may be required even before first transmission, for example when the output target (e.g., Host 1 104 or Network 1 106 in FIG. 2) is not ready to accept data. Similarly, a "receive buffer" is frequently required. For example, messages may be received out of order, or as fragments, and these must be saved for a period of time to comply with TCP rules that require completing the messages and putting them in the correct order. While messages could simply be stored in the scratchpad memory 210, for large systems entailing large send and receive buffers, it may be more convenient to establish a separate "socket memory" 236 to store large quantities of data for somewhat extended times. Such a socket memory 236 may interface with the scratchpad memory 210 via a bus 238 as shown in FIG. 2, and with the bus network and PPC cluster control 228 via another bus 240. (Due to substantial traffic, in some embodiments, the bus 240 may actually comprise several individual bus structures.)

The socket memory 236 may provide data intended for output to an output processor and SPI-4 Interfaces 242, 244 via buses 246 and 248. However, when data to be output is still present in the scratchpad memory 210, in some instances it may be quicker to provide the data to the output processors 242, 244 directly via buses 250, 252. The output processing may include tasks such as the preparation of message headers, primarily from the event data, calculation of checksums, and assembly of completed output messages ("reassembly"). The event typically retains some type of TLP or event type identification, and the output processors may use this information to determine the proper format for headers, cyclic redundancy checks (CRCs) and other TLP bookkeeping information. After a message is reassembled by the output processor, the SPI-4 portion of the output units 242 and 244 formats the message according to the SPI-4 (or other selected) interface protocol, so that the data may be output to the same connections (for example "Host 1" 104 and "Network 1" 106), from which data is received at the input to the SPPS.

V. Protocol Processing Core Functions

Once a PPC has received an event of an appropriate type, and has information reflecting the size and location of any payload, it may direct treatment of the entire message in accordance with the TLP being used. The PPC may direct actions regarding the flow to which the event belongs, e.g. requesting retransmission, resending previously transmitted messages, and so on, and may update the flowstate for the flow as is appropriate. In some embodiments, traffic congestion can be reduced if the PPCs do not physically transfer messages directly to the output processors (242, 244), but instead simply direct other circuits to transfer the messages for reassembly at the output processors 242, 244.

Some outgoing messages contain very little information (e.g., little or nothing more than a header), such as acknowledgements or requests for retransmission. In these cases, the PPC that is processing the event (e.g., PPC 216) may form a header based upon the event information and pass it to the socket memory 236. The socket memory 236 may, in turn, do little or nothing to the header information before passing it on to one of the output processors 242, 244. Other outgoing messages will include a substantial payload, which may, for example, have been received with an incoming message and stored in the scratchpad memory 210. The PPC may direct such payloads to be moved from the scratchpad memory 210 to the socket memory 236, and may separately direct one of such payloads to be concatenated, for example in one of the output processors 242, 244, with an appropriate header formed by the PPC. The skilled person in the computer architecture arts will recognize that the PPC can control the output message and flowstate information in many ways.

PPCs may be implemented in any manner consistent with their function. For example, a microprogrammable processor provides one level of flexibility in processing varying communication needs. Some or all PPCs could alternatively be implemented as fixed state machines, in hardware, possibly reducing circuit size and/or increasing processing speed. Yet again, some or all PPCs may comprise embedded microprocessors that are operable out of program memory that can be modified "on the fly," even while the SPPS is active. Such an implementation permits adjusting the number of PPCs able to process particular types of events, adding further load-balancing flexibility. PPCs may be configured to process some stateful protocols, and not others, and the configuration may be fixed or alterable. For example, in a PPC based on a microprogrammable processor, the microprogram (or software) typically determines which event types, or protocols, the PPC is configured to process. A PPC is "compatible" with a particular event type, or protocol, when it is configured to process such event types, or to process messages (events) according to such a protocol.

VI. Bus Network and PPC Cluster Control

Figure 3:
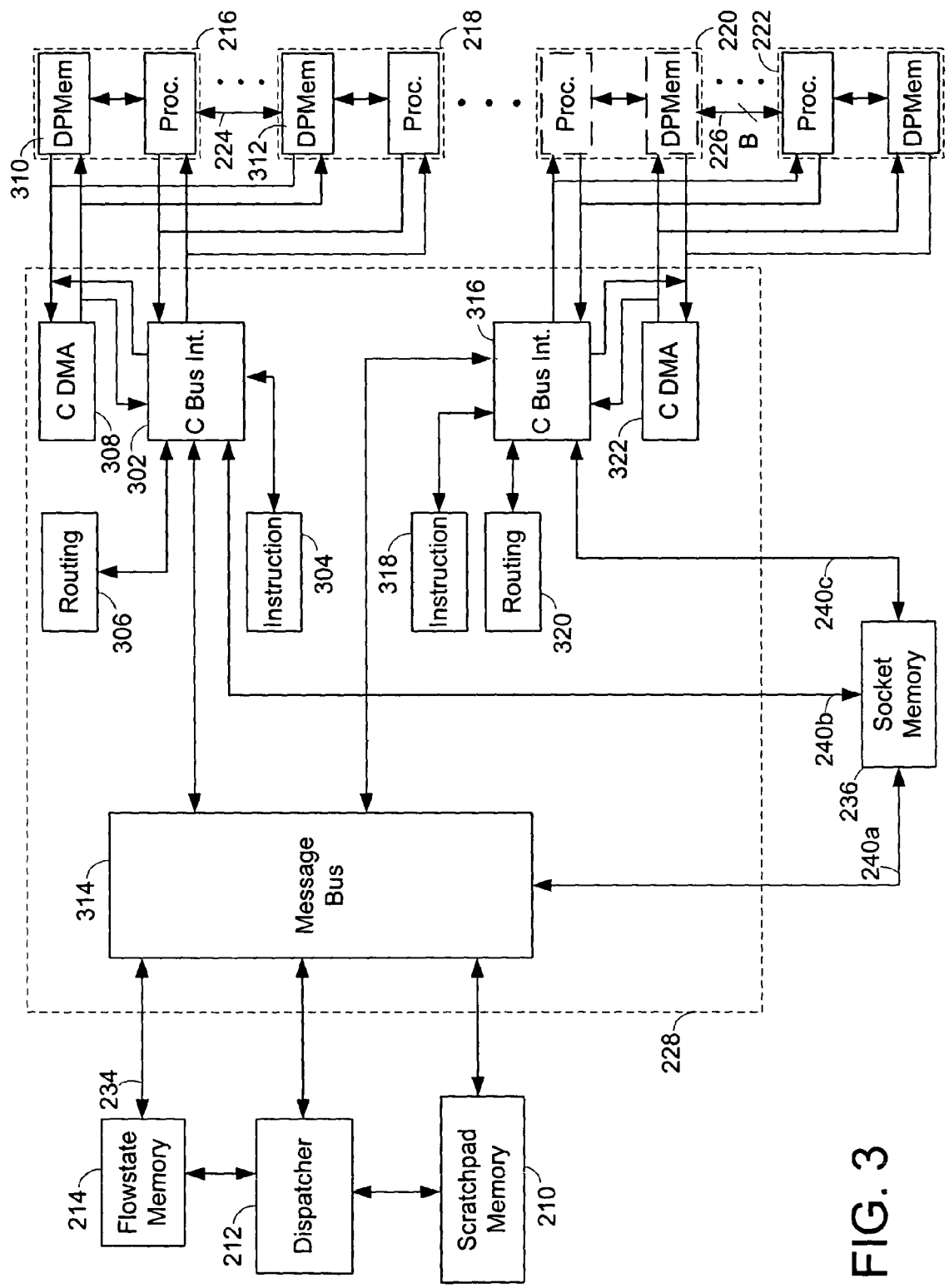
FIG. 3 is a block diagram showing further details of some of the features of the stateful protocol processing system of FIG. 2.

FIG. 3 illustrates an exemplary architecture for the bus network and PPC cluster controller 228 of FIG. 2. In this embodiment, the cluster of PPCs (from 216-218) is controlled in part via a cluster bus interface 302. Through the cluster bus interface 302, instructions are available for all of the PPCs (216-218) in the cluster from an instruction memory 304, typically implemented using RAM. The cluster bus interface 302 may also provide access to a routing control table 306 for all of the PPCs in the cluster. A cluster DMA controller 308 ("C DMA") may be provided, and may have an egress bus that delivers data from a FIFO of the DMA controller 308 to the cluster bus interface 302, as well as to one side of a dual port memory (e.g., the DPMEM 310, 312) of each of the PPCs 216-218 of the cluster. The DPMEM 310, 312 is accessible on the other side from the DMA controller to the corresponding processor with which it is associated as part of a PPC 216, 218. As shown in FIG. 3, the cluster DMA controller 308 may have a separate ingress bus by which the FIFO receives data from the dual port memory (e.g., the DPMEM 310, 312) and from the cluster bus interface 302. The DMA controller 308 may be used, for example, to transfer flowstates between the PPC local memory and the flowstate memory 214. As shown in FIG. 3, the cluster bus controller 302 also provides bidirectional bus connections to a message bus 314, and a further bidirectional bus connection 240b to the socket memory 236. Some or substantially all of the local memory of a PPC may be DPMEM such as the DPMEM 310, but any suitable local memory may be used instead, as may be convenient for design and fabrication.

The bus 240 interconnecting the socket memory 236 and the bus network and PPC cluster control 228 is shown in FIG. 3 as being implemented by three distinct bidirectional buses: the bus 240a interconnecting the socket memory 236 and the message bus 314; the bus 240b as mentioned above; and the bus 240c to a further cluster bus interface 316. The cluster bus interface 316 operates with respect to the cluster of PPCs 220-222 analogously to the cluster bus interface 302, as a crossbar switch to facilitate communication between the PPCs and the message bus 314, the socket memory 236, and to provide access to common instruction memory 318 and a routing table 320. A further cluster DMA 322 similarly manages data flow between the dual port memory of the PPCs 220-222 and the cluster bus interface 316. Further sets of similar modules (routing, instruction, cluster bus interface and cluster DMA) may, of course, be provided and similarly interconnected.

The skilled person in the computer architecture arts will appreciate that any suitable bus control may be used to implement the connections shown for the bus network and PPC cluster control 228. For example, the routing and instruction information may be maintained within individual PPCs. In addition, the PPC memory need not be dual-port, nor is a DMA controller such as 308 or 322 necessary. In somewhat less complex embodiments, the cluster bus interfaces 302, 316 may simply be part of the message bus 314, or the interfaces may be omitted entirely. Conversely, even more elaborate bus architectures may be employed to increase the speed and power of some embodiments.

VII. Flow Processing With Alternate Protocol Cores

Figure 4:
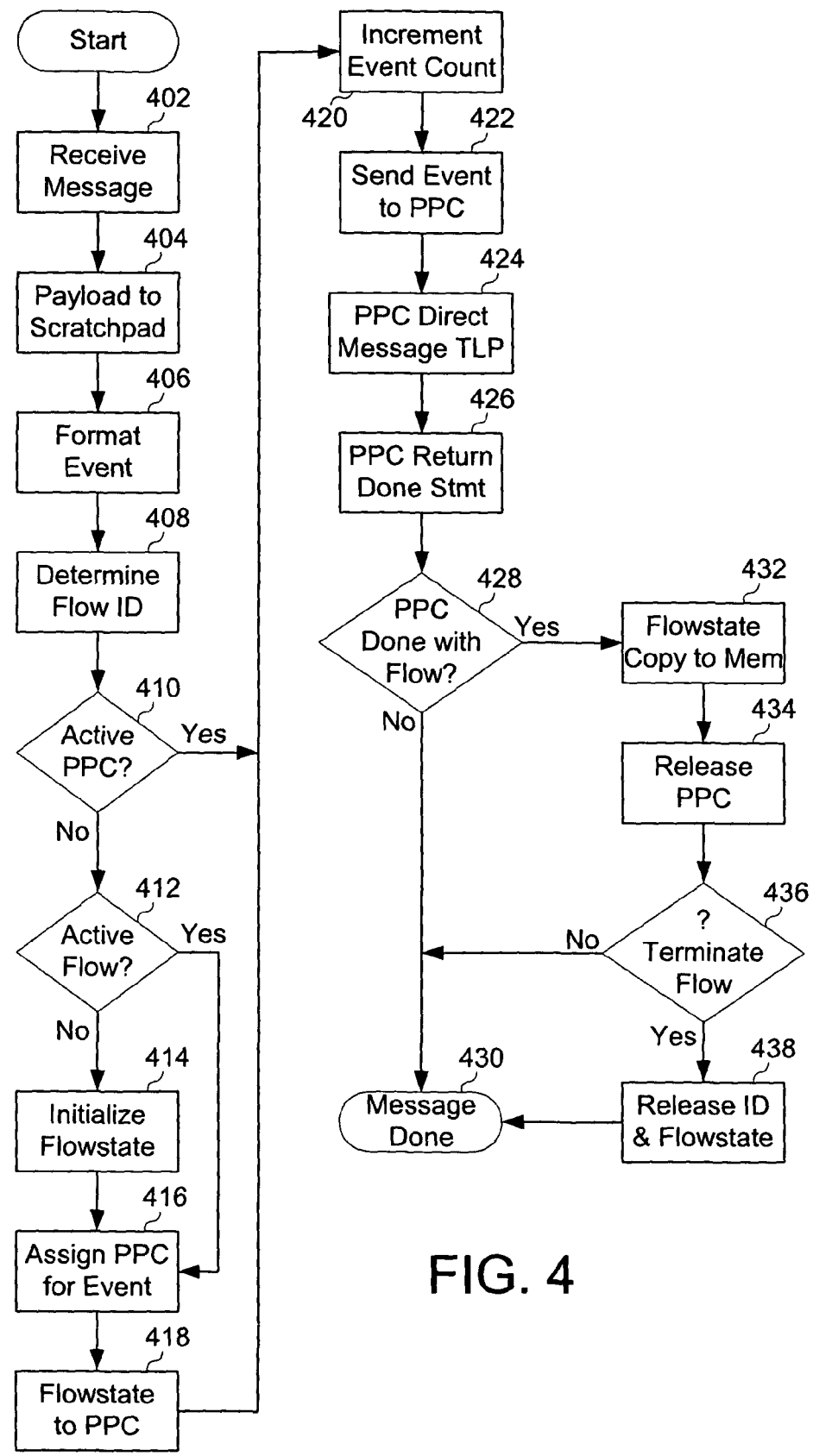
FIG. 4 is a flowchart of acts used in varying the protocol core that is selected to process a flow.

FIG. 4 is a flowchart showing acts that may be performed by an exemplary SPPS to perform stateful protocol processing of messages belonging to a flow, generally alternating PPCs (protocol processing cores), that is, using different PPCs at different times. As shown in FIG. 4, at a step 402 a message is received. This step may include various substeps, such as reconstructing complete messages from packet fragments, performing validity checks, and/or establishing checksums. Next, at a step 404, the payload of the message may be moved to a scratchpad memory. The step 404 is optional, insofar as it indicates splitting the message and storing part of the message in a temporary memory location that is especially available to both input and output processing facilities. Alternatively, for example, the message may be kept together, and/or it may be moved directly to a more permanent memory location.

Proceeding to a step 406, an event portion of the message may be defined. Event definition typically includes the state-relevant portion of the message, and may entail reformatting a header of the message and adding information, such as checksums and event type indication, to facilitate further processing of the event, as discussed in more detail hereinabove. If the message is not split, the "event" may include the payload information, and may even be an incoming message substantially as received. Processing of the event proceeds at a step 408 where data contained within the event that uniquely identifies the flow (the "flow key") is examined to begin a process of determining a location of flowstate information and a local flow ID proxy. A decision step 410 checks whether a PPC is actively processing an event of the same flow. This check may be effected by searching for the flow key in a local "active flow" table. If the flow key is found in the "active flow" table, then a PPC is presently processing another event belonging to the same flow, and the process exits the decision step 410 on the "yes" branch. If the flow is not active (e.g., if the flow key of the flow is not found in the "active flow" table), then processing continues at a decision step 412. Other techniques may be used in the step 410 to determine if events associated with the flow key are presently being processed by any PPC, such as searching an area of memory reserved for the status of message flows that are presently being processed by a PPC (e.g., within a dispatcher's Core Activity Management submodule). Alternatively, for example, a single flowstate location may be examined for an indication (e.g., a flag) that processing is in progress at a PPC. Further techniques and criteria for determining whether a PPC is actively processing the flow are described below with reference to a decision step 428.

At the decision step 412 a check is made as to whether the flow associated with the flow key is active at the SPPS. This may be performed by checking for a valid flow location in a flow memory that maintains flowstates for active flows when no PPC is presently processing events of the flow. (Since the number of active flows can be very large, the flow memory is typically distinct, separately accessible, and much larger, than the local flow table used for flows presently being processed by a PPC.) This step typically includes a "lookup" task of determining a local flow ID proxy related to the flow key, a task which may involve processing the flow key information according to hash algorithms. Once the local flow ID proxy is determined, it can generally be used to locate an existing flowstate for the flow corresponding to the flow key. The mere existence of a valid flowstate may cause an affirmative result at the decision step 412.

If the flow is not active at all, so that no valid flowstate exists in either general flowstate memory or in a PPC actively processing a flow, then the process proceeds to an initialization step 414 to create and initialize a valid flowstate area within flowstate memory. Note that some stateless "events" exist that do not require a flowstate, such are Address Resolution Protocol (ARP) events which do not belong to a flow, and for which no flow need be created. ARP, and other such "stateless" events, may be processed independently of the processing steps of FIG. 4, which are primarily relevant to "stateful" events.

Once an active flow is established (whether located at the decision step 412, or initialized at the initialization step 414), the method may proceed to assign a PPC to process the event at an assignment step 416. This step may involve several substeps, such as determining and identifying which PPCs are compatible (i.e., capable of processing events of the present type) and available (e.g., have room in their queues) to process the event. A PPC may be selected from those satisfying both of these criteria in many ways, such as in a round-robin fashion, or by selecting the least full PPC local queue, or randomly, or by other load balancing algorithms. Because the PPC has just been newly assigned to process the event, the flowstate is made available to the PPC at a step 418. The flowstate may be delivered by the dispatcher (or submodule) as described above; or, if a global flowstate memory is shared with the assigned PPC, then this step may comprise identifying the flowstate memory location to the PPC. The step 418 also typically includes identifying the location of a "workspace" where the PPC can access the flowstate during processing. Such workspace is typically maintained locally at the PPC, but in some embodiments may be maintained more globally, or split to be both local and global.

Once a PPC has been assigned and has a valid flowstate, which occurs after the step 418 (or after an affirmative step 410), processing proceeds at the steps 420 and 422. Step 420 tracks the activity of a PPC processing a flow. In one embodiment of the present invention, step 420 includes incrementing an event counter associated with the assignment of the PPC to process the flow, but alternatives are described below with regard to the decision step 428.

At a step 422 the contents of the event are provided to the assigned PPC. This may be accomplished by physically copying the event contents to a queue in the local memory of the PPC, or, as an alternative example, by identifying a location of the event data to the PPC. Such queue may contain events from different flows, for example from as many different flows as workspace storage is available for corresponding flowstates. If either event queue or flowstate workspace is not available in (or for) a compatible PPC, then the dispatcher may temporarily withhold effecting part or all of the event/workspace transfer to the PPC.

Once transfer is completed, the assigned PPC has access to the flowstate of the flow, and to the event data, which typically includes information regarding the size and location of the payload associated with the event. At a step 424, the PPC may perform much of the transport layer protocol processing for the message that is associated with the event. The protocol defines the net effect that such processing must achieve, but of course the effect may be accomplished in any manner either presently practiced or later developed for such transport layer processing. Actions by the PPC may include, as examples, updating the flowstate, creating a header for a message to be output, directing that a previously transmitted message be retransmitted, or sending a request for retransmission of a message that was received with an error. Actions by the PPC may also include directing the reassembly of a header it constructs to a received payload, and transmission to a different TLTS connected to the network at another end of the flow, or to a local host. Upon completing the event, a done statement is asserted at a step 426. In one embodiment, the done statement is returned to a global dispatcher used to track PPC activity.

A. Releasing an Active PPC

After the PPC completes processing the present event, a determination is made at a decision step 428 whether the PPC has completed all processing for the flow to which the event belongs. In one embodiment, such determination may be made by a dispatcher module decrementing an event counter associated with a PPC in response to a "done" statement, and determining that the event counter has reached zero. However, many alternatives for establishing that a PPC is done with the flow will be appropriate in different embodiments. For example, a PPC may be considered "done" with a flow when it completes processing the last event of that flow that exists in its queue. As another example, the PPC may be considered done with a flow when the flowstate in its local memory is overwritten or invalidated by processing in another PPC. These, or other definitions of "done," may be tracked in one (or more) of various places, such as within the PPC itself, or at a more global module such as a dispatcher (e.g., within a core activity manager submodule).

If, at the decision step 428, the PPC is determined to be actively processing the flow, the method may proceed to a conclusion step 430 with no further processing, since the flowstate local to the PPC has been updated and the global flowstate need not necessarily be updated. However, upon determining that the PPC is done with processing the flow, the local flowstate that has been updated at the PPC is transferred to a more global flowstate location at a step 432, so that the PPC workspace becomes available for processing events of a different flow. The global flowstate can then be subsequently accessed when further events arrive that belong to the flow. The PPC may be deemed "done" based on event processing completion for the flow as determined by the dispatcher, by a submodule or other module, or by the PPC itself. The "done" designation may also be postponed after the processing of all events from the flow is completed, for example until the PPC has no other room for new flows and events. Once the PPC is deemed "done" at a step 434, the PPC may be released from "assignment" to processing the flow, which may, for example, include setting a flag that indicates that the flowstate memory in the PPC is no longer valid, or is available for further storage of a different flowstate. After the step 434, the PPC will be treated as free of the event, and of the flow to which the event belongs.

A decision step 436 will typically occur at some point to determine whether the last event processed by the PPC permits the flow to be completely closed. This decision step 436 may be made even before the occurrence of the decision step 428, or before the steps 432 and/or 434, because such a decision to terminate the flow may obviate a need to write the flowstate to memory. Such a decision may also subsume the decision that the PPC is "done" with the flow. However, for processing convenience, the termination decision may be considered as occurring in the sequence shown in FIG. 4. The PPC itself will typically determine, as part of its TLP processing duties, whether the last event completed the flow (e.g., whether the flowstate is advanced to the "connection closed" condition). However, a decision to actually close the flow may be made more globally, such as at the dispatcher (or a submodule). If it is determined at the decision step 436 not to terminate the flow, the system is generally done processing the message and proceeds to the done step 430. However, if it is determined at the step 436 to terminate the flow, the local flow ID proxy and flowstate memory location may thereupon be released for other uses. Since PPCs are generally assigned to, and released from processing events belonging to a flow at the level of a specific flow, largely irrespective of where other flows are assigned (at least within the universe of compatible PPCs), it is possible, indeed highly probable, that a PPC is assigned to process events (or messages) belonging to a flow that was previously processed by another PPC. Such flow-PPC reassignments may be rather frequent, and under some circumstances may even occur for each event of a flow.

VIII. Dispatcher Processing

Figure 5:
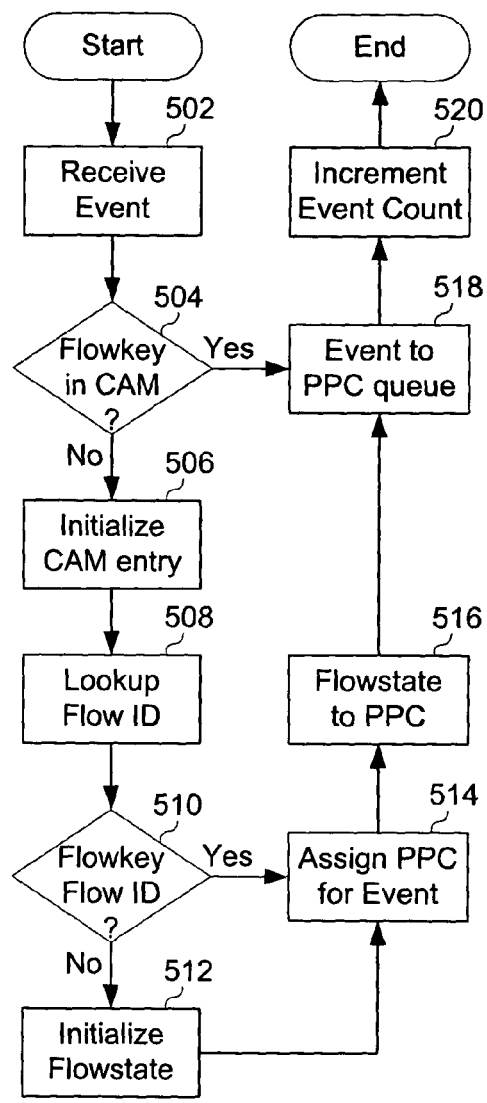
FIG. 5 is a flowchart of acts performed by a dispatcher module in response to receiving an event belonging to a flow.

FIG. 5 is a flowchart showing acts that may be taken by a "dispatcher" module within an exemplary SPPS to dispatch events belonging to a flow to different PPCs at different times. FIG. 5 is focused on acts, which may be generally attributed to a dispatcher module (and submodules), to effect distribution of incoming events. Thus, FIG. 5 steps may substantially be a subset of steps of the overall SPPS, such as are illustrated in FIG. 4, although FIG. 5 steps are from the dispatcher module perspective and may also include different details than are shown in FIG. 4. The dispatcher module is conceptually separate from the PPCs to which it dispatches events, and from input processing from which it receives events, and may be connected within a SPPS like the dispatcher 212 in FIG. 2, or may be otherwise connected. The dispatcher module may also be conceptually or even physically subdivided; for example, reference is made to a local flow ID proxy (and/or flowstate) "lookup" module, and to a Director Core Activity Manager, each of which may either conceptually or physically be a submodule of the dispatcher module, or an ancillary module associated with the dispatcher.

As shown in FIG. 5, at a step 502 an event is received from an input source. The event will typically contain only a "state-relevant" part of a message being processed by the SPPS. That is, the event will typically contain only the information necessary for a PPC (protocol processing core) to control the maintenance of the flowstate of the flow associated with the message, and not the payload of the message. However, in some embodiments the payload, or parts of it, may be kept with the state-relevant data. The dispatcher examines a "flow key" contained within the event that uniquely identifies the flow to which the event belongs. At a step 504, the dispatcher searches for a match to the flow key in a Core Activity Manager (or "CAM"), which would indicate that a PPC was actively processing an event related to that flow. If a match is not found in the CAM (which may be physically or conceptually separate from the dispatcher), then in this exemplary embodiment it is presumed that no PPC is actively processing an event of the flow, and at a step 506 a CAM entry will be initialized to track the activity of the PPC assigned to process the event.

At a step 508, the dispatcher searches for a local flow ID proxy that corresponds to the flow key. For SPPSs that handle a large number of flows, this search may be performed by a distinct lookup module which may, for example, perform a hash lookup to locate a local flow ID proxy as quickly as possible. A decision step 510 depends on whether a local flow ID proxy matching the flow key was found. If not, then the SPPS may not yet be processing any data from the flow, and accordingly at a step 512 a flowstate ID may be selected to be associated with the flow that is uniquely identified by the flow key of the event. Thereafter (or if a local flow ID proxy was found and the decision at the step 510 was "yes"), processing may proceed at a step 514.

A PPC is selected to handle the event at the step 514. This step may include a substep of determining the type of event being processed, though in some embodiments this substep is performed by earlier processing modules (e.g., a message splitter such as 206 or 208 of FIG. 2). An "event-type mask" maintained in the dispatcher for each PPC may be compared to bits indicating the type of event to determine which PPCs are compatible with the event type. Another substep may include examining the relative activity levels of those PPCs that are configured to handle the event type. The least busy PPC may be selected, or the next PPC that has any room in its input queue may be selected in a round-robin fashion. As a further example, data may be maintained on recent PPC activity (e.g., in a core activity manager submodule) including assignment of local workspaces, and a PPC may be selected that has not yet overwritten its flowstate memory for the flow of the event, even though it is otherwise considered "done" with the flow. A director submodule, either in combination with or as part of a core activity manager (CAM) submodule, may perform these acts. Selection of a PPC (within the universe of compatible PPCs) is generally made for the flow of each incoming event specifically, without regard to an a priori class of flows to which the flow might belong (such as by virtue of characteristics of its flow key). As a result of such individual assignment techniques, the PPC selected to handle a particular event of a flow frequently differs from a PPC that handled previous events of the same flow (unless the particular flow is presently active in a PPC, as explained elsewhere).

Since the flowstate was initialized in the step 512, or was located in the steps 508-510, and the PPC was selected at the step 514, the flowstate may now be transferred to the PPC at a step 516. In some embodiments such transfer may be "virtual," merely providing an indication of where the flowstate exists in memory so that the PPC can access it. Next, processing can proceed to a step 518. This same step may be reached directly from the decision step 504, since if that decision was "yes" then a PPC is already processing an earlier event belonging to the same flow. Such an active PPC will (in many embodiments) already have the most valid flowstate for the flow, and in that case will generally be selected to process the present event. Therefore, at the step 518, the event itself may be forwarded to an input area or queue of the selected PPC. Along with the step 518, an event counter may be incremented at a step 520. The event counter is one way to determine when a PPC is actively processing another event of the flow of the present event, but other ways may be used, such as waiting for the PPC to indicate that it is done processing all present events of a particular flow. This is the end of the receive processing for the dispatcher.

Figure 6:
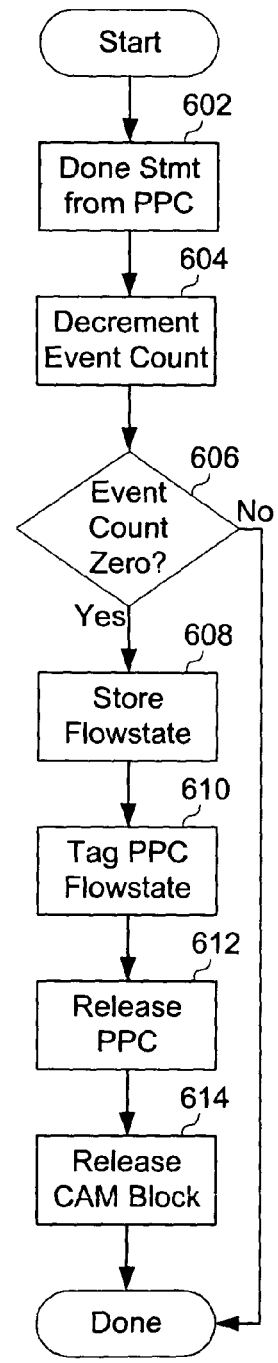
FIG. 6 is a flowchart illustrating certain acts that the dispatcher module (or its submodules) may perform in response to feedback from a protocol processing core.

FIG. 6 is a flowchart illustrating some steps that the dispatcher (or its submodules) may perform in response to feedback from the PPC. As in FIG. 5, the steps of FIG. 6 are largely a subset of steps taken by the overall SPPS, but they are described from the perspective of the dispatcher, and may contain more or different steps than are illustrated in FIG. 4 for the overall SPPS.

The illustrated response acts of FIG. 6 start at a step 602 during which the dispatcher receives a "done statement" or other indication that a PPC has completed processing an event of a particular flow. The dispatcher may then decrement the event counter for the flow (discussed with respect to the step 520 of FIG. 5). If, at a decision step 606, the event counter is found to have reached zero, or if the completion of a "burst" of events by a PPC is otherwise indicated, then the dispatcher may cause the flowstate, as updated by the PPC, to be stored in more permanent memory to free up the memory of the PPC. (Note that this step is not needed for embodiments in which the same memory is used by the PPC during processing as when no PPC is processing the memory, a circumstance that may occur, for example, when the flowstate is always maintained in the same global location, and is merely accessed by a PPC processing the flow, as needed). A flag or other indication may then be included in the CAM, or sent to the PPC, to indicate that the flowstate stored in the PPC is no longer valid. Then at a step 612, the PPC may be released from handling the particular flow it was processing. Since no active PPC is now processing an event of a particular flow, the CAM block in which the PPC activity was maintained can also be released at a step 614.

Note that "release" may amount to merely setting a flag showing that the PPC (or the CAM memory block) is available. Such flag may indicate availability, but a PPC may be treated for all intents and purposes as if it is still actively processing events of a flow after such indication, as long as no essential data has been overwritten. In that case, the decision step 606 would return a "no" until the data blocks are actually overwritten and thus destroyed. In any case, if the decision step 606 returns a "no," then processing is done, since the steps 608-614 are generally not needed in that event. Otherwise, processing is done after the CAM block is released at the step 614.

IX. Encapsulated Stateful Flow Processing

One manner in which a SPPS (stateful protocol processing system) such as described herein may process flows of layers other than transport layers is by extracting the encapsulated messages and recirculating the extracted messages for further processing. Such further processing may be performed in accordance with the appropriate protocol for the encapsulated message, which is typically different from the protocol (typically a TLP) used for the encapsulating messages.

After an encapsulated stateful message is retrieved, reformatted and provided to a SPPS as an input (a non-transport layer input), the SPPS can process the message in accordance with the appropriate protocol as long as one or more of the PPCs are configured with the steps required by the particular protocol (e.g., iSCSI). Thus, it is straightforward to simply use a SPPS for non-transport layer processing.

There are numerous ways in which a SPPS may be notified that encapsulated data requires recirculation. Notification may be implicit, for example, if all processed data requires recirculation. Alternatively, one or more portions of the header or payload of the encapsulating messages may contain information indicating a need for such recirculation. A SPPS may examine each payload for an indication to recirculate encapsulated information, or it may examine payloads only when an indication is provided in the header. Thus, the SPPS may receive instruction as to whether a payload is to be examined, whether it requires further processing, and by what protocol such further processing should be performed, by any combination of implicit and explicit information in the header and/or payload of the encapsulating message.

A "recirculation" protocol may first be invoked such that the payload (and/or portions of the header) of an encapsulating message is segmented and reassembled as a message for the encapsulated flow. Note that a single encapsulating message may contain all or part of a plurality of encapsulated messages, and that conversely a single encapsulated message may require a plurality of encapsulating messages to be conveyed (for example, when a large message is encapsulated in a plurality of small packets, such as ATM packets). The recirculation protocol defines appropriate reassembly of the encapsulated message, and also directs that it be returned to the input of the SPPS for further processing. Such a recirculation protocol may format the recirculated message in a particularly efficient format, such as by specifying the local flow ID proxy, the event type, and other useful information as is known. In this manner the SPPS recirculation protocol processor(s) would function similarly to a host operating in close conjunction with the SPPS. Such a host, having knowledge of an ideal format for messages to the SPPS, may speed processing by formatting messages in such ideal format.

It should also be noted that recirculation may be effected by a modified communication path, such that the reassembly or "output processors" 242 and/or 244 transfer the reassembled encapsulated message directly back to a message splitter 206 or 208, rather than passing it through interfaces such as the SPI-4 interfaces in 242, 244, 202 and 204 which may be unnecessary for recirculation. Indeed, the recirculated message may be entirely preformatted in the manner that would otherwise be effected by the message splitters 206 or 208. The selected PPC processing the encapsulating message (or a related processor) may perform such preformatting and direct the information to be delivered directly from the reassembly processors in 242/244 to the scratchpad memory 210 and the dispatcher 212, thus bypassing the message splitters entirely.

Once recirculation has been effected, further processing of the encapsulated information may proceed just as described hereinabove, that is, in substantially the same manner that a TLP message is processed. In the case of interest, the encapsulated information is stateful and belongs to a flow, so an event may be created that reflects the state-relevant portion of the message, a local proxy of the flow key will be determined, a state for the flow will be created or located, and a PPC (protocol processing core) compatible with the protocol will be assigned to process the event derived from the (previously encapsulated, now recirculated) message. These steps may be performed not only for recirculated messages, but for messages of any flow, whether transport layer or not, that is provided to an input of the SPPS.

Processing a non-transport layer message may, of course, require that information be sent to a further subsystem. For example, data within an encapsulated message may require delivery to a host. The assigned PPC may effect such sending by directing that the information be reassembled in a manner acceptable to the target host, and then directing that the reassembled message be transferred to the target host. In an alternative, sending the encapsulated message to a network connection may require that the outgoing message be reencapsulated in a TLP message (typically, but not necessarily, the same TLP, such as TCP, that was used for the original encapsulating message). Thus, further recirculation may be required at this point to reencapsulate such message. In theory, at least, messages may be "nested" in a series of any number of encapsulations that must be stripped off before the innermost stateful message can be processed. Similarly, processing such innermost stateful message may require sym-

X. Multi-Protocol/Multi-Format Processing

A. Overview

Figure 7:
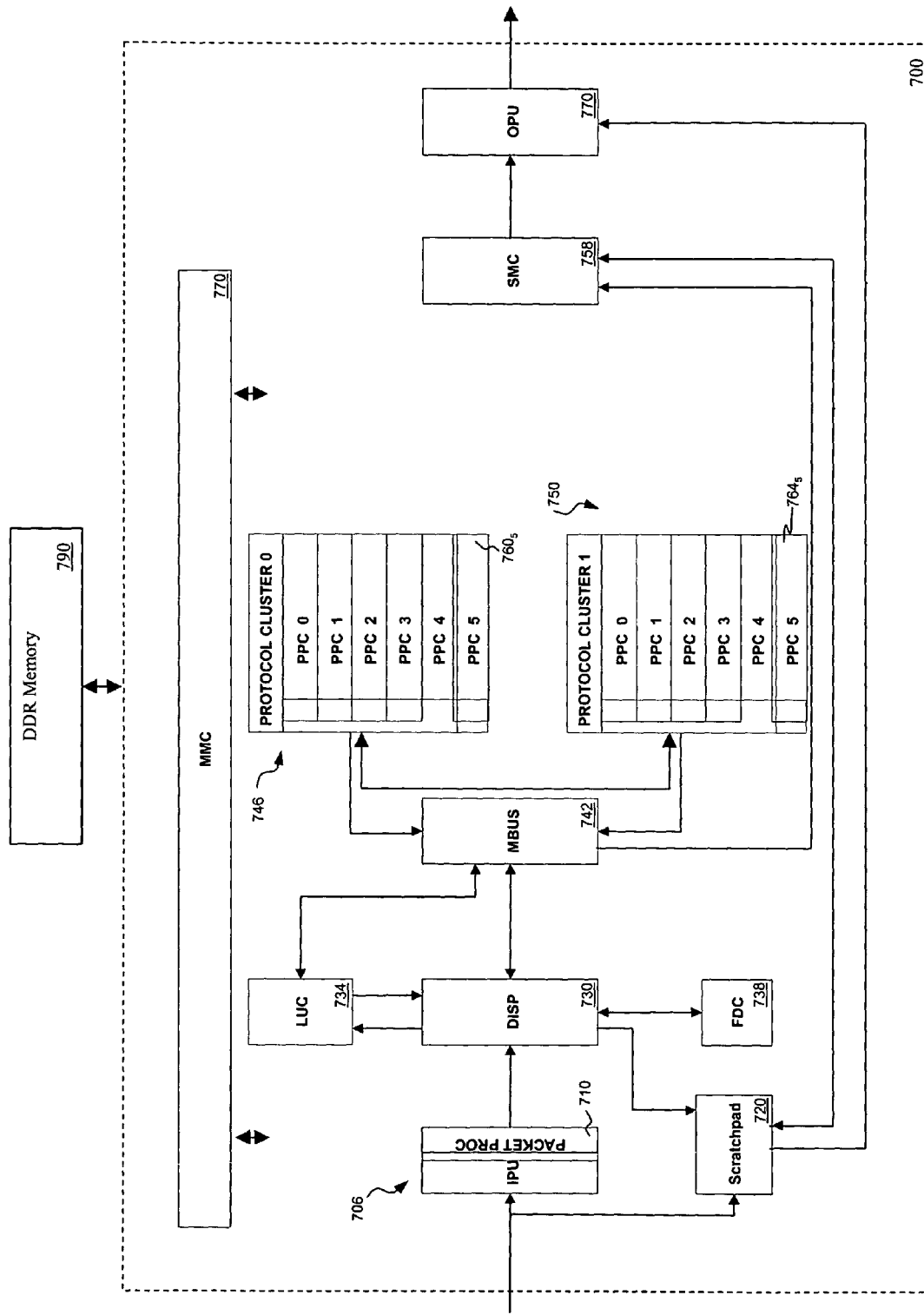
FIG. 7 is a block diagram of a particular implementation of a stateful protocol processing system (SPPS) within which multiple protocols and multiple associated formats are processed in accordance with the invention.

FIG. 7 is a block diagram of a particular implementation of a stateful protocol processing system (SPPS) 700 to which reference will be made in describing the manner in which the present invention facilitates contemporaneous processing based upon multiple protocols and multiple associated formats. Referring to FIG. 7, received packets are initially processed by an input processing unit (IPU) 706 and a packet processor (PP) 710 encapsulated therein. These elements are in communication with scratchpad memory 720 as well as with a dispatcher 730. As shown, the dispatcher 730 interacts with both a look-up controller submodule (LUC) 734 and a flow director cam 738 (FDC). A message bus 742 communicatively links the dispatcher with a first protocol cluster 746 and a second protocol cluster 750. In addition, the message bus 742 provides a link to a socket memory controller (SMC) 758, which is also in operative communication with an output processing unit 770.

It is a feature of the SPPS 700 that it may be implemented using hardware and software configurations allowing for concurrent handling of multiple protocols and associated multiple formats. As is described below, Fibre Channel, TCP/IP, API messages as well as proprietary/custom protocols may be concurrently processed by implementations of the inventive SPPS 700. Central to this multi-protocol processing is the PP 710, which is one of the initial processing element encountered by a message received from an external network or host. The PP 710 is configured to derive, from the incoming messages, the information that is most relevant to stateful processing of the messages, and to format and place such information in an "event" that is related to the same flow as the message from which it is derived. For example, according to many transport layer protocols, "state-relevant" data including flow identification, handshaking, length, packet order, and protocol identification, is disposed in known locations within a packet header. Each stateful protocol message will have information that is relevant to the state of the flow to which it belongs, and such state-relevant information will be positioned where it can be identified. Events derived from an incoming message by the PP 710 may be categorized as either (i) network packets of different network formats (e.g., Fibre Channel or TCP/IP), or (ii) various proprietary formats known to the SPPS.

Received messages are examined by the PP 710 in order to determine a "type" for the event derived from the message. Each different protocol that is processed by the SPPS 700 may thus have a particular "type," and this information may be included in the event to simplify decisions about subsequent processing. Since the "type" of the event may be useful to direct the subsequent processing of the event, messages having errors that should be handled differently may be identified as a subtype of a general error.

In the exemplary embodiment the PP 710 is configured to distinguish among a number of event types associated with each such protocol, which enables numerous formats of messages compliant with various protocols to be received and processed by the SPPS 700. For example, the PP 710 is capable of discriminating between a TCP packet, a UDP packet and an ICMP packet (each of which is included within a "TCP/IP network" class). In operation, the applicable PP functions to generate an event of a type corresponding to the received packet, performs certain stateless processing consistent with the applicable event type (e.g., verifies certain fields in a packet header have legal values) and extracts an event-type-specific "flow key".

The flow identification key (or simply "flow key") uniquely identifies the flow to which the message belongs in accordance with the TLP used by the flow. The flow key can be large (typically 116-bits for TCP) and as such it may not be in a format that is convenient for locating information maintained by the SPPS 700 that relates to the particular flow. A local flow ID proxy may be used instead for this purpose. A local flow ID proxy (or simply "local proxy ID," "local flow ID," or "proxy ID") generally includes enough information to uniquely identify the particular flow within the SPPS 700, and may be made more useful for locating information within the SPPS that relates to the particular flow. For example, a local flow ID proxy may be selected to serve as an index into a flowstate memory (not shown) to locate information about a particular flow (such as a flowstate) that is maintained within the SPPS 700. Not only may a local flow ID proxy be a more convenient representative of the flow for purposes of the SPPS 700, it will typically be smaller as well.

A local flow ID proxy may be determined within the dispatcher 730 or elsewhere, such as within the PP 710. As an example, the "Flow Key" for a TCP/IP event type may be formatted as follows: {IP Source Address(32 bits), IP Destination Address(32 b), IP Protocol Number(8 b), TCP Source Port Number(16 b), TCP Destination Port Number(16 b), Source ID number(12 b)}. Although in the above example a flow key of 116 bits is used, the precise number of bit utilized is not critical to the invention and flow keys for other event types will generally be formatted differently as a "virtual pointer" to this state information. In response to generation of an event, the inventive SPPS 700 is configured to examine the current state as reflected by the state information retrieved using the flow key.

A flow key comprises a unique identifier of a state object used in later "stateful" processing of an event; that is, the flow key allows a state object to take some prescribed action based upon the event type and current state, generate output events, update the state object, and wait for arrival of a new packet to precipitate generation of another event. In the exemplary embodiment extraction of the flow key from an event is accomplished by the PP 710, which sends the extracted flow key to the dispatcher 730.

In the exemplary embodiment, the state object corresponding to a given flow key is of relatively small size (e.g., 128 Bytes to 2 KB) and is stored within the flowstate memory for inactive flows, or in on-chip memory while it is being actively processed. Since use of flow keys on the order of 116 bits as actual physical memory pointers would require impractically large memory allocations (i.e., $(2^{116}-1)*2$ KB=17014118346046923173168730371588410680 bytes of memory, the SPPS implements a hash and hash-table lookup in order to reduce memory requirements. In a particular implementation of the SPPS only a single hash table is utilized, which requires that a unique flow key be provided for each event so as to avoid any ambiguity. However, in other embodiments a plurality of hash tables may be utilized, e.g., one for each "class" of events (described below), and thus maintaining uniqueness between event of different classes becomes unnecessary.

As used herein, the term "classes" refers to the sets of events derived from the messages received from corresponding sets of hosts or other integrated circuit processing elements (ICs) external to the SPPS 710; that is, a "class" of events refers to the set of events derived from the messages received from a specific external processing element. The concept of classes is relevant to the case when different external processing elements are configured to send the SPPS 710 messages compliant with substantially similar or identical formatting requirements. For example, it would not generally be possible to distinguish a message received from an IC configured to implement an Ethernet MAC from a message received from an IC supporting Fibre Channel MAC functionality. However, it would nonetheless be desirable to be capable of distinguishing between the messages received from this pair of ICs so as to enable concurrent connections to be established between the SPPS 710 and such pair of ICs. In accordance with the one aspect of the invention, such concurrent connections are established by requiring each such IC to send its messages on a different one of the logical channels specified by the SPI-4 standard, which enable messages associated with different sources and destinations to be multiplexed over a single SPI-4 physical interface. In this way a particular "class" of events is defined as those events derived from those received messages associated with a particular SPI-4 logical channel. In operation, the PP 710 determines the SPI-4 logical channel (and hence the applicable event "class") associated with a given event and executes a corresponding event-handling routine, thereby facilitating contemporaneous processing of multiple protocols/formats.

As shown in FIG. 7, an event derived by the IPU 706 is forwarded to the dispatcher 730, where it may be entered into a queue. With respect to multi-protocol/multi-format processing, a primary function of the dispatcher 730 is to identify which of the PPCs 760, 764 760, 764 within the protocol clusters 746, 750 are capable of processing the event. The dispatcher 730, in cooperation with the LUC 734, also coordinates lookup of the corresponding flow state state-lookup using the flow key associated with the event. The dispatcher 730 also cooperates closely with the FDC in tracking which flows are currently being processed by the SPPS 710. In the exemplary embodiment the dispatcher 710 uses the type number associated with the event to index a table (not shown) containing information as to which PPCs 760, 764 are capable of processing the applicable event type. It is a feature of the SPPS 710 that this table may be modified to reflect changes in which PPCs 760, 764 are configured to support various protocols, thereby facilitating contemporaneous processing of multiple protocols and associated formats. That is, different PPCs 760, 764 may be pre-configured to handle different protocols and event formats.

The LUC 734 also facilitates the contemporaneous processing of multiple protocols by cooperating with the dispatcher 730 to establish "split workspaces". Such split workspaces are established by partitioning a flow state, i.e., a "workspace", between a pair of protocols by sending the workspace to a corresponding pair of PPCs 760, 764. In this way such processors may work different portions of the same logical flow in accordance with different protocols. For example, consider a logical flow for which processing needs to be performed in accordance with both the TCP and HTTP protocols. The HTTP and TCP protocols are distinct, but processing of the HTTP protocols requires storage of certain information associated with the TCP flow state. Specifically, TCP and HTTP comprise layers in a multi-layer protocol stack, with TCP being one layer below HTTP within the stack. The dispatcher 730 assigns two PPCs 760, 764 to process the flow; namely, a "protocol core" and an "interface core". This functionality is complemented by the LUC 734, which manages moving the separate workspace portions between the flowstate memory and the on-chip data memory of the protocol and interface cores. Details of this cooperation between the dispatcher 730 and the LUC 734 in facilitating split workspaces is described further below.

The LUC 734 further contributes to multi-protocol/multi-format processing effected by the SPPS 710 by appropriately administrating process flow timers. In particular, upon expiration of a timer within a given flow, the LUC 734 sends a flow-specific timeout expiration event to the dispatcher 730. That is, the LUC 734 will send expiration events of different type upon expiration of different types of flows. In response, the dispatcher 730 selects a PPC 760, 764 capable of handling the expiration event.

Once a PPC 760, 764 has been provided with an event and a corresponding state (if the event is stateful), all information necessary for the core 760, 764 to effectively operate as a state machine is available. By appropriately assigning events associated with certain protocols to corresponding partitions within the event number space, a single PPC 760, 764 may concurrently process flows of multiple protocols/formats.

A PPC 760, 764 may also "chain" to a new flow in order to facilitate multi-protocol/multi-format processing. In this regard the PPC 760, 764 may extract a flow key from the available event/state information, and issue a new event to the dispatcher 730. In turn, the dispatcher 730 performs an additional state lookup using the FDC 738, LUC 734 and selects another PPC on the basis of the results of the lookup process. This contributes to enablement of multi-protocol/multi-format processing by permitting a single core 760, 764 handling a particular protocol to elect to invoke a different core 760, 764 for processing of a different protocol.

The socket memory controller (SMC) 758 also facilitates the contemporaneous processing of multiple protocols. In operation, SMC 758 administers one send buffer and one receive buffer per each flow being processed by the SPPS 700. In addition, the SMC 758 organizes physical memory into pools based on page sizes. In one exemplary implementation, the SMC 758 supervises implementation of four distinct page sizes, and different page sizes are selected by the SMC 758 based upon the buffering requirements of different protocols. This allows efficient management of protocols with varying buffering requirements. Advantageously, the SMC 758 enables the appropriate buffer sizes to be concurrently used for multiple different protocols. The SMC 758 is further configured to organize a list of pages so that each PPC 760, 764 can store and retrieve data based on a virtual buffer offset number.

B. Packet Processor

In the exemplary embodiment the PP 710 is realized as a very long instruction word (VLIW) processor, and is capable of executing numerous functions in parallel. Such functions include, for example, the selection of data, mask and constant fields, making various comparisons to create condition flags, conditional branching, and data movement. The PP reads and parses packets stored within a Header Buffer of the IPU 706, which contains the first 256 Bytes of a packet. In addition, the PP 710 writes various pieces of information in an Event Queue, which includes data from the packet header, flags resulting from tests made on the packet header, checksums, and the like.

The input to the PP 710 consists of a Header Buffer and a Header Buffer Side Info register. The output of the PP 710 consists of an Event Queue which is accessible as an addressable RAM. On a packet-by-packet basis, both the Header Buffer and Event Queue are FIFOs in the sense that the information for a packet can be popped (Header Buffer) or pushed (Event Queue), giving access to the information within the next packet. In the exemplary implementation, a substantial portion of the functionality of the PP 710 is defined by Microcode and may be programmed to perform numerous tasks.

The PP 710 receives unmodified packet data (Host or Network) from the Header Buffer of the IPU 706. The data is then processed as defined by the Microcode and produces, as a result, an Event Structure for the packet type that was processed. This Event Structure is then written into the Event Queue. This process is repeated for all received packets.

C. Input Processing Unit (IPU)

The IPU 706 is responsible for receiving, processing, and forwarding frames from the SPI-4 module. It presents processed information (extracted from frame headers) to the dispatcher 730 in the form of Input Events and forwards complete frames to the scratchpad 720. In exemplary implementation of the SPPS 700 the IPU 706 is instantiated twice, thereby allowing for combinations of network and host interfaces.

1. Architectural Overview and Operational Characteristics

Figure 8:
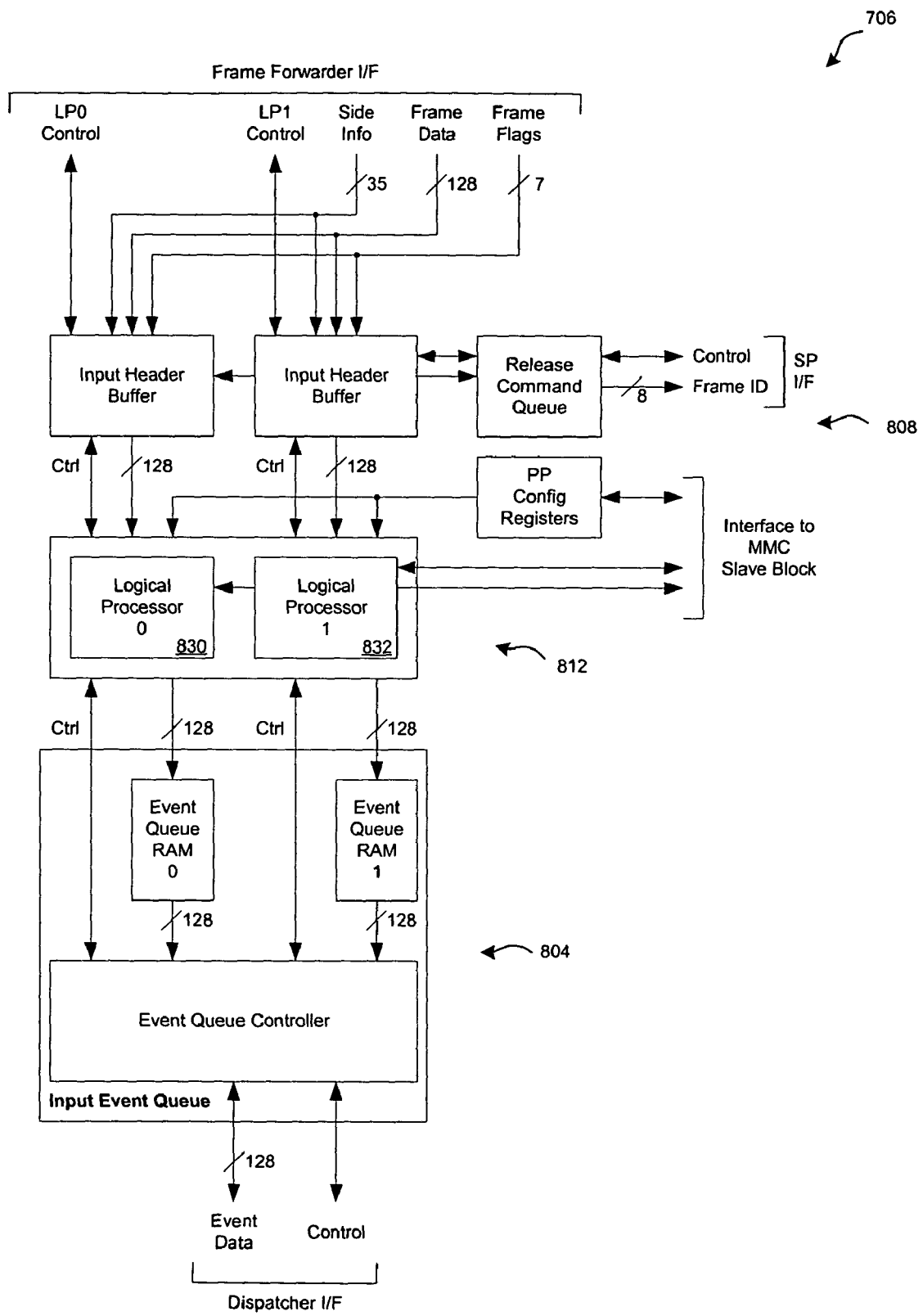
FIG. 8 shows a block diagram of an input processing unit (IPU) of the SPPS.

Referring to FIG. 8, there is shown a block diagram of the IPU 706 which illustratively represents its three primary functional components: Input Receive Module 804, CRC Engine/Frame Forwarder 808, and Input Processing Module 812. Set forth below is an exemplary set of features typically implemented by the IPU 706:

Number of SPI-4 Ports

In the exemplary embodiment, when full_frame mode is disabled the IPU 706 supports up to 64 SPI-4 ports. The IPU Reassembly Buffer 908 (FIG. 9) is configured with a separate receive queue for each SPI-4 port. When full_frame mode is enabled, the IPU 706 supports up to 256 SPI-4 ports. In this mode the IPU 706 uses a single receive queue to buffer all traffic, so frame reassembly is not possible and only complete frames/packets are allowed to cross the SPI-4 bus.

Minimum and Maximum Frame Sizes:

In the exemplary embodiment the minimum system frame size accommodated by the IPU 706 is 33 bytes and the maximum is 16000 bytes. In this embodiment all frames less than or equal to 16 bytes in size are discarded by the IPU 706 automatically, but the IPU 706 is configured correctly to discard frames from 17-32 bytes. All frames larger than the above maximum frame size are truncated by the IPU 706 and forwarded with an error flag. The IPU 706 also supports configurable minimum and maximum frame sizes within the 33-16000 byte limits.

Frame Processing Order:

Frames received from a single SPI-4 port are processed in the order received, and it is unnecessary to preserve frame order across ports.

Error Handling:

The IPU 706 ensures that frames forwarded to the scratchpad 720 and packet processor 710 are correctly framed with start and end flags. All frames forwarded with known errors are tagged with an error flag. Frames longer than 16000 bytes are truncated, flagged with an error flag, and the remainder discarded. Whenever possible, invalid data is framed as a valid frame, tagged with an error flag and forwarded rather than discarded. All error conditions result in setting of an interrupt status flag.

"Hung" SPI-4 Ports:

When the IPU Reassembly Buffer is in "cut-through" mode a timer will measure the time between SPI-4 bursts on the cut-through port. The cut-through timer will have a programmable range up to approximately 60 seconds and each port will have an independent timeout value.

When the cut-through timer expires, the IPU 706 will truncate the current frame and set an error flag to the scratchpad 720 so a PPC can drop the frame. Any further data on the "hung" SPI-4 port will be discarded up through the next frame end. After the next frame end any future traffic on the affected port will be processed normally. In the event the frame end for the truncated frame never arrives, then the first "good" frame after the timeout will be dropped. This results from configuring the IPU 706 to be required to encounter a frame end prior to exiting the discard state.

Warm Reconfiguration:

The IPU 706 is configured to be shut down "gracefully", reconfigured, and restarted without impacting the rest of the SPPS 700. In this regard graceful shutdown entails not sending any partial frames to the scratchpad 720 unless the error bit is set and preserving the state of the Event Sequence Number.

Frame release commands: The PPs 710 can only release frames less than or equal to 256 bytes in size, and only if the error flag for the frame is not set. The IPU 706 will ignore PP release commands for all other frames and will force the SP DATA bit in the event generated by the PP to '1' so that a protocol core can make the release decision.

CRC generation: The IPU 706 is able to calculate up to two CRCs per input frame. Two CRC polynomials (iSCSI and FCIP) are supported and are selectable on a per-frame basis. A CRC control header is the first quad word of frames that require CRC processing.

SPI-4 full-frame mode: Since the IPU Reassembly Buffer 908 may not always be sufficiently large to perform frame reassembly in the presence of large frames and/or many SPI-4 ports, the IPU 706 provides a "full-frame" mode in which the SPI-4 interface passes complete frames rather than interleaved bursts. Full-frame mode abides by the SPI-4 interface protocol but utilizes a non-standard SPI-4 configuration.

2. IPU Functional Units a. Input Receive Module

Figure 9:
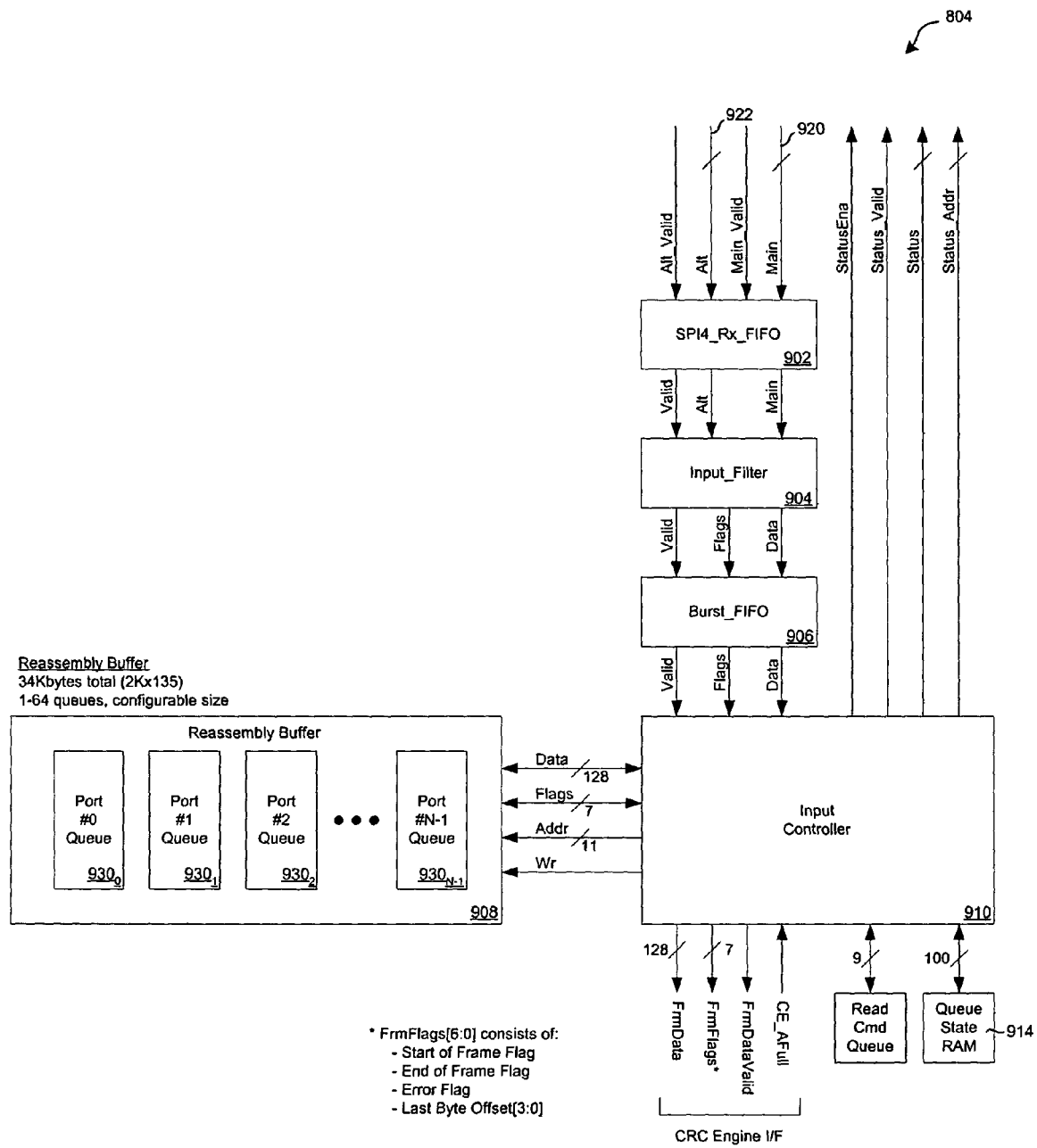
FIG. 9 is a block diagram of an input receive module (IRM) of the SPPS.

Turning now to FIG. 9, a block diagram is provided of the Input Receive Module (IRM) 804. As shown, the IRM includes a SPI-4 Rx FIFO 902, Input Filter 904, Burst FIFO 906, Input Controller 910, Reassembly Buffer 908 and Queue State RAM 914

SPI-4 Rx FIFO

The SPI-4 Module has two data output ports: Main 920 and Alt 922. In the exemplary embodiment the Main data port 920 is 64 bits wide and the Alt data port 922 is 32 bits wide. Each port has its own associated flags and data valid signal. The SPI-4 Module will generally not include input buffering, and under some conditions the Main data port 920 does not pass all traffic. Under these circumstances the Alt port 922 provides an overflow path. The SPI-4 Rx FIFO 902 (64×124) buffers Main 920 and Alt 922 data and flags, then merges them into a single 64-bit bus with flags to the Input Filter 904.

Input Filter

The Input Filter 904 is configured to perform three main functions, and writes its output the Burst FIFO 906:

Formats data from the SPI-4 Rx FIFO 902 into a 128-bit data bus with flags.

Discards frames less than or equal to 16 bytes.

Detects illegal SPI-4 burst sizes.

Burst FIFO

The Burst FIFO 906 is a 64×144 FIFO immediately upstream of the Input Controller 910. In the exemplary embodiment the Burst FIFO receives data from the Input Filter 904 no faster than one quad-word every other cycle, but receives data continuously. The Input Controller 910, however, only accepts data from the Burst FIFO 906 approximately half the time during the Reassembly Buffer "write window", but during the write window needs data every cycle to optimize Reassembly Buffer throughput. The Burst FIFO 906 thus provides rate buffering between the output of the Input Filter 904 and the input of the Input Controller 910.

Input Controller

The Input Controller 910 reassembles frames from SPI-4 bursts, manages the Input Reassembly Buffer 908, generates SPI-4 receive FIFO status back to the SPI-4 Module for output to the SPI-4 transmitter, and forwards frames to the CRC Engine. Management of the Reassembly Buffer 908. In the exemplary embodiment this requires the Input Controller 910 to track and store the state of up to 64 queues. These queue state records are stored in the Queue State RAM 914.

Reassembly Buffer

The Reassembly Buffer 908 is a 34 Kbyte (2048×135 bits) block of single-port SRAM that can be flexibly partitioned into up to 64 independent queues 930. The data path through the RAM is 128 bits wide with an additional 7 bits for flags. The Input Controller 910 manages the Reassembly Buffer 908.

Queue State RAM

The Queue State RAM 914 (64×100) holds configuration and state information for 64 queues and is used by the Input Controller 910 to manage the Reassembly Buffer 908 and track queue state.

CT Timeout RAM

A CT Timeout RAM (64×8) (not shown) holds the cut-through timeout configuration values for 64 ports. The Input Controller 910 uses the timeout values to determine when to declare that an input port is "hung".

CRC Enable RAM

The CRC Enable RAM (8×32) (not shown) holds the CRC Enable configuration bits for 256 ports. When high, the CRC Enable bit indicates that a port can carry CRC traffic. The Input Controller 910 presents the CRC Enable bit to the CRC Engine with each input frame.

b. CRC Engine

The CRC Engine performs CRC processing on incoming frames in accordance with a predefined API. In the exemplary embodiment this API defines a CRC header which must be present as the first quad-word of all frames that require CRC processing, or the SPI-4 port must be configured to perform a CRC on all packets. The CRC Engine also detects CRC payload length errors (end of frame arrives before end of CRC payload), and missing frame end flags. In both cases the CRC Engine sets the frame error flag and asserts an interrupt.

c. Frame Forwarder

The Frame Forwarder is configured to perform the following functions:

Forward data from the CRC Engine to the scratchpad 720 (complete frames) and Input Processing Module (frame headers).

Detect missing frame start flags and re-frames data as necessary to ensure that only structurally valid frames are forwarded. Sets frame error flag and asserts an interrupt when an error is detected.

Forwards headers to the Logical Processors 830, 832 in the Input Processing Module (IPM) 812 in a fixed round-robin order.

Presents side information to the Logical Processor 830, 832 with each frame header.

Meters data to the scratchpad 720 at the maximum allowed scratchpad rate (1 qword every 3 cycles).

Monitors backpressure arising due to the scratchpad 720 and IPM 812.

Waits for the scratchpad 720 to issue a frame ID for each frame before forwarding the next frame.

The Frame Forwarder contains a Port Information Table (a 256×15 RAM) to hold the VLAN_ID and PP_CODE_OFFSET configuration values for 256 ports. These values are part of the side information presented to the IPM 812 at the start of each frame.

D. Dispatcher

1. Overview

Figure 10:
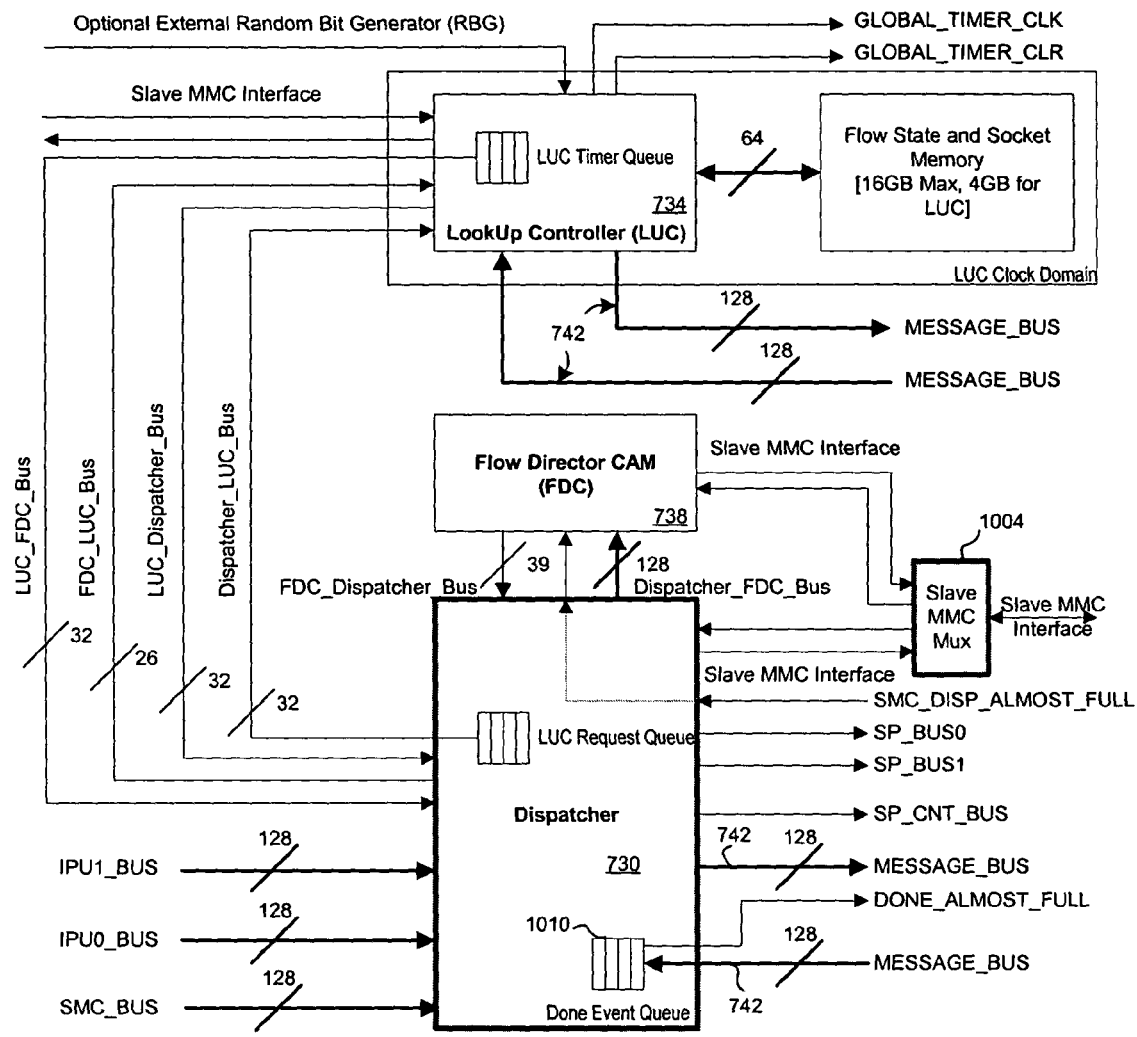
FIG. 10 provides a block diagram illustrating the operational environment of the dispatcher module.

FIG. 10 provides a block diagram illustrating the operational environment of the dispatcher 730. In operation, the dispatcher 730 processes events from one of two IPUs 706, the SMC 758, the PPCs 760, 764 and the LUC 734. All packet events, host events and timer events go through the dispatcher 730. After processing by the dispatcher 730, events are then moved to a PPC 760, 764 using the message bus 742. When the PPC 760, 764 has finished processing the event, it issues a done event to the dispatcher 730 using the message bus 742.

Events that are received from an IPU interface have been formatted by a Packet Processor 710. In the exemplary embodiment multiple Packet Processors 710 parse the same IPU stream, so the IPU employs special techniques to ensure that order is preserved. Note that the dispatcher 730 will not generally be configured to perform this re-ordering.

Referring to FIG. 10, it is observed that both the dispatcher 730 and the FDC 738 share the same ManageMent and Control (MMC) interface 770. The dispatcher 730 includes a small functional component, the Slave MMC Mux 1004, for distributing this bus to both the primary functional components of the dispatcher 730 and to the FDC 738. As a consequence, all of the registers of the FDC 738 will generally be mapped into the dispatcher 730.

The dispatcher 730 includes one queue 1010 from the message bus 742 that is used for Done Events. This queue 1010 has the capability to assert backpressure to the message bus 742, which indicates that a new event should not be sent (processing of the existing event is allowed to be completed). In the exemplary implementation the dispatcher 730 is not configured to be capable of "dropping" events. Rather, the dispatcher 730 appropriately marks any event that is to be dropped and forwards it to the applicable PPC 760, 764.

2. Dispatcher Input Events

The dispatcher 730 is configured to process four major event types: packet events, timer events, host events and done events. Each of these major event types can also be decomposed into multiple sub-events. For example, the major event TCP may include the minor event type host read. Other examples of a packet event include UDP, ICMP, ARP, TCP with minor event type WWW, and TCP with minor event type FTP.

3. Processing of Events

The events processed by the dispatcher 730 may be divided into the following two groups: (1) those that are stateful (i.e., require invocation of the LUC 734 to retrieve state information), and (2) those that are stateless (i.e., do not require the LUC 734 to retrieve state information). Stateless events can be subdivided again, into unicast, repeated unicast and drop. In fact, events that need to be dropped may be considered simply as unicast stateless events with a special flag set. Based on the Event Type, the dispatcher 730 determines the forwarding mode of an event. In the exemplary embodiment the dispatcher 730 is disposed to select one of the following four forwarding modes:

1. Stateful Event Processing
2. Unicast Stateless Event Processing
3. Unicast Stateless Event Processing with Drop
4. Repeated Unicast Stateless Event Processing
   a. Stateful Event Processing Some, but not all, event types will require interaction with the LUC 734 so that the state of a flow can be retrieved. An example of such an event type would be a TCP Packet Event, which requires that the LUC 734 find the applicable TCP flows state and pass this onto the assigned PPC 760, 764. The FDC 738 is used to ensure that the same PPC 760, 764 is used for other events in that flow.

In order to preserve flexibility the dispatcher 730 may be programmed, via registers, such that each event type has its own set of LUC commands. For example, two LUC commands could be specified for each event type. In this case the particular LUC command utilized would depend upon the value of a special create flag in the event header. A typical TCP event configuration would be to use the lookup with flow key and create and lookup with flow key and no create LUC commands. However, in certain scenarios it would not be desired to allow the LUC 734 to create flows automatically, so both commands would be lookup with flow key and no create.

(1) Stateful-Event-Type Based Forwarding

The FDC selects which PPCs 760, 764 can process an event based upon the Event Type. This allows different PPCs 760, 764 to be nominated for processing different types of events—perhaps that is to help distribute the load, or perhaps it enables different software images to be loaded onto different PPCs 760, 764.

Note that once an entry has been allocated in the FDC 738 for a stateful event, any events that are received with that flow key will be forwarded to the specified PPCs 760, 764, regardless of the event type. That means that once an FDC entry has been allocated, the Event Mask is ignored. In order for this functionality to be implemented, the dispatcher 730 and FDC 738 should operate in accordance with the following rule:

1. Let F be a flow key.
2. Let {T} be the set of Event Types that can be assigned to that flow key.
3. Let {M} be the set of Event Masks that are programmed into the FDC for each member of {T}.
4. It must be the case that all members of {M} are identical.

If the above were not true then the following could occur:

1. Dispatcher 730 receives an input event for flow key F, Event Type $T_1$, and the FDC 738 allocates it to a PPC $P_1$.
2. Dispatcher 730 receives an input event for flow key F, Event Type $T_2$. It just so happens that $P_1$ is not included in the Event Mask of $T_2$. However, since the entry was found in the FDC 738 the dispatcher 730 will still forward it to $P_1$.

b. Stateless Event Processing

Stateless event processing occurs when an event type does not require interaction with the LUC 734. An example of such an event type would be an ARP Packet Event. In this particular embodiment there is no state associated with each ARP frame, so the event is simply passed on directly to the applicable PPC 760, 764. As described below, this stateless event can either be unicast to a single core 760, 764 or sent to multiple cores 760, 764.

(1) Unicast Stateless Event Processing

For unicast stateless event processing, it is desired to allocate a PPC 760, 764 from a set of capable PPCs 760, 764. This set of capable cores 760, 764 is based upon the value of the Event Type. One of those cores 760, 764 is selected, and the stateless event is forwarded to it. This is useful for sending events to a single core 760, 764, e.g. perhaps ICMP events.

(2) Unicast Stateless Event Processing with Drop

As mentioned above, the dispatcher 730 is not configured to drop events. Accordingly the dispatcher 730 may be configured to forward an event to a PPC 760, 764 merely to enable the event to be dropped thereby. This is effected by marking the event in such a way that the PPC 760, 764 knows it must be dropped.

(3) Repeated Unicast Stateless Event Processing

Note that for stateless event processing it may be desired to pass the same event onto multiple PPCs 760, 764. For example, this could be desired in the case in which each PPC 760, 764 had its own ARP routing table. In this case ARP Packet Events could be multicast. In the case when such an event comprises an ARP reply, each PPC 760, 764 may desire to see the response. Other types of packet events may also require multicasting to a subset of the PPCs 760, 764.

To allow maximum flexibility, if an event type is marked as requiring repeated unicast stateless event processing, then the dispatcher 730 contains a bitmap of PPCs 760, 764 that should receive this event. This bitmap allows us to send the event to programmable groups of PPCs 760, 764.

The method that is used for multicasting events is repeated unicast, i.e. if the dispatcher 730 determines that the event must be sent to N PPCs 760, 764 then the dispatcher 730 will perform N unicast operations, sending the event to each PPC 760, 764 in turn. A faster method would be to multicast the event in hardware, but this would require extra support from the dispatcher 730 and PPCs 760, 764.

One issue which arises with repeated unicast is what action should be taken when it is necessary to send an event to one or more PPCs 760, 764, but none of those PPCs 760, 764 have space in their event queues. The input event may not be discarded simply because there is no space associated with any PPC 760, 764. Instead, the input event remains at the head of its queue, and repeated unicast operation is attempted to be completed at a later date. Records are maintained with respect to which PPCs 760, 764 have been sent the repeated unicast and which still need to receive the unicast. These records are maintained on a per input queue basis, since it is possible that the event at the head of each input queue can be performing a repeated unicast.

2. Timer Event Processing

A Timer Control Unit, TCU, within the LUC 734 is responsible for keeping per flow timers. If such a timer expires then a timer event is issued to the dispatcher 730. These events are complicated by the fact that a packet or host event must never be serviced before a timer event. This is because the packet or host event could otherwise cause the timer event to be cancelled, but once the LUC 734 issues the timer event there is no easy way for it to be invalidated by the applicable PPC 760, 764. As a consequence, the dispatcher 730 may process a non-timer event only to find that the FDC 738 signals that it is in the TIMER state. This indicates that the LUC 734 has expired a timer for this flow, and that the event is in transit from the LUC 734 to the timer queue on the dispatcher 730. In this case the dispatcher 730 must stop processing the current event, and change to processing the timer event in the timer queue.

3. Protocol Core and Interface Core Forwarding

With respect to a given flow, the dispatcher 730 supports the function of forwarding events to the PPC 760, 764 serving as the protocol core for such flow and to the PPC 760, 764 serving as the interface core for such flow. Most of the implementation of split protocol/interface core handling is generally hidden by the FDC 738. The dispatcher 730 simply forwards the event to the PPC 760, 764 that the FDC 738 indicates. To allow for the correct de-allocation of the protocol and interfaces cores the FDC 738 records the Event Mode field of the FDC response in the event itself. Table 1 illustrates the values of the Event Mode in the FDC response.

TABLE I

| Event Mode Value | Description |
| --- | --- |
| 00 | Event Index does not describe a protocol core or interface core. |
| 01 | Event Index is for a protocol core. |
| 10 | Event Index is for an interface core. |
| 11 | Invalid. |

4. Event Type based Forwarding

Each PPC 760, 764 may be capable of processing a certain protocol and not others, e.g. TCP may be on cores 0 through 15, but ICMP is only on cores 14 and 15. To solve this problem the FDC 738 uses the Event Type as an index into an array of bitmaps where each bitmap represents which PPCs 760, 764 are capable of processing this event. Note that it is a Packet Processor 710 in the IPU 706 that assigns the 6-bit Event Type.

The dispatcher 730 also keeps information on a per Event Type basis. For example, the forwarding mode described above (stateful, unicast stateles, unicast stateless with drop, repeated unicast) is determined on a per Event Type basis. This requires the Event Parameter registers block, where each Event Parameter register contains information with a given Event Type.

a. Event Type Sub-Structure

The Event Type also has sub-structure that allows the dispatcher 730 to track 32 registers instead of 64. This sub-structure is such that if the most significant bit (bit 5) of the Event Type is set, then by definition a stateless unicast event is being processed and the lower 5-bits of the event type are used as the core ID of where to forward this stateless event (this is called a core directed event). If such a stateless unicast event is being processed then no field in the Event Parameter register is required. If the most significant bit (bit 5) of the Event Type is not set, then the lower 5-bits are used as an index into the Event Parameter registers block. Depending upon the forwarding mode found in the Event Parameters block, the event is then processed appropriately.

E. Protocol Cluster

Referring to FIG. 7, the Protocol Clusters 746, 750 receive, process and transmit messages and events for the SPPS 700 in cooperation with the LUC 734, dispatcher 730, scratchpad 720 and the SMC 758 via the message bus 742. The Clusters 746, 750 further communicate with the scratchpad 720 and the SMC 758 through a Data Bus (not shown).

Figure 11:
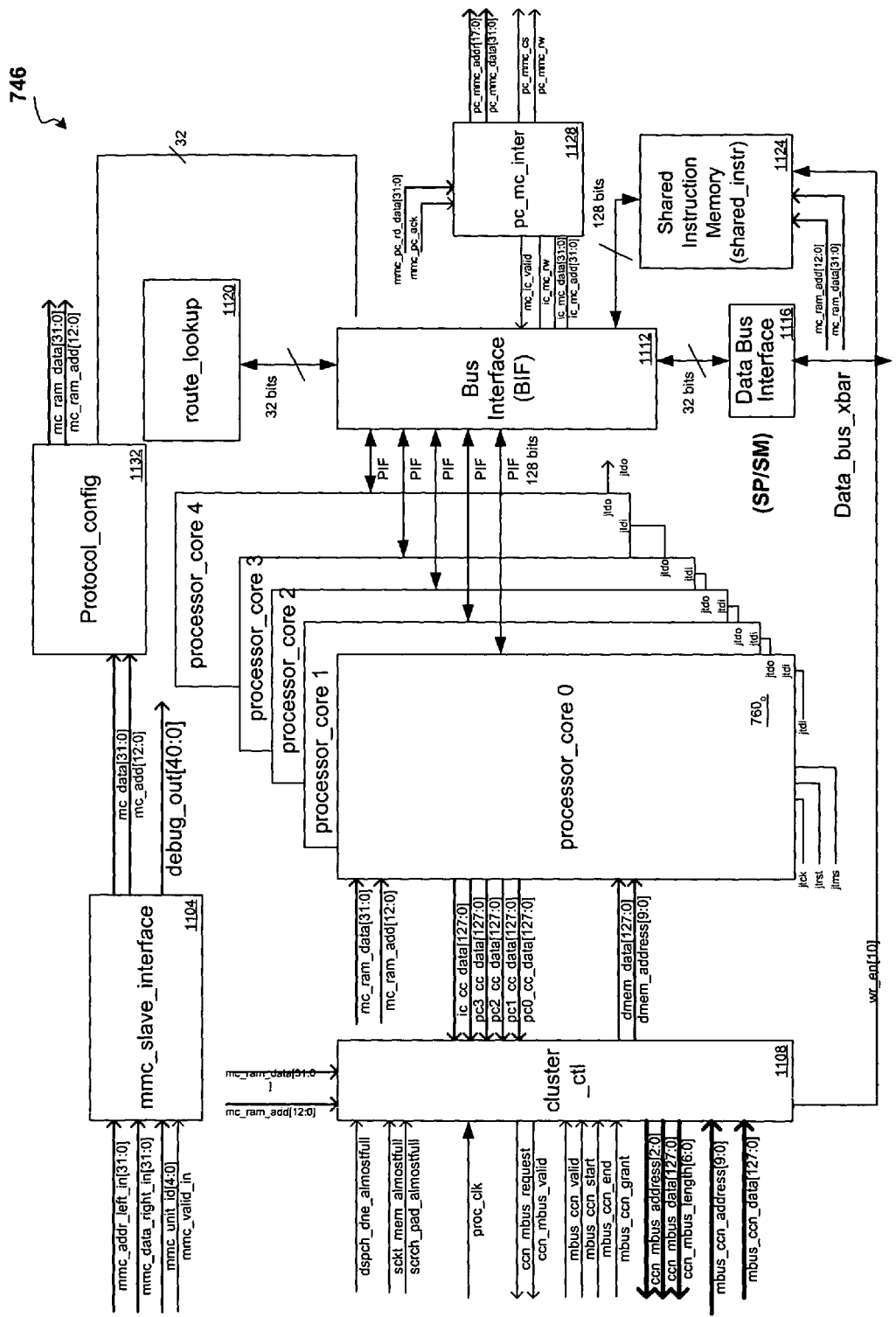
FIG. 11 illustratively represents a management and control interface of the SPPS.

A global management controller is used to initialize the memories and registers of the Clusters 746, 750 at power up and monitor or change configuration during normal operations. This is done through the mmc_slave interface 1104 of the MMC 770 (FIG. 11). In addition, the interface core can be used to control the global management controller with respect to writing and reading memory associated with other components of the SPPS 700.

1. Protocol Cluster Architecture

Turning now to FIG. 11, the Protocol Cluster 746 consists of a Cluster Controller 1108, a set of five PPCs 760, Bus Interface 1112, Data Bus Interface 1116, Route Lookup 1120, Shared Instruction 1124, processor management controller interface (pc_mc_inter) 1128, management controller slave interface (mmc_slave_interface) 1104 and Protocol config 1132. Each of the five PPCs 760 can be configured as a protocol core or an interface core. One of the PPCs 760 is capable of controlling the Management controller to gain access to all of the memories and various registers of the SPPS 700. The Protocol Cluster 750 may be implemented substantially identically as the Protocol Cluster 746.

a. Protocol Cores

Figure 12:
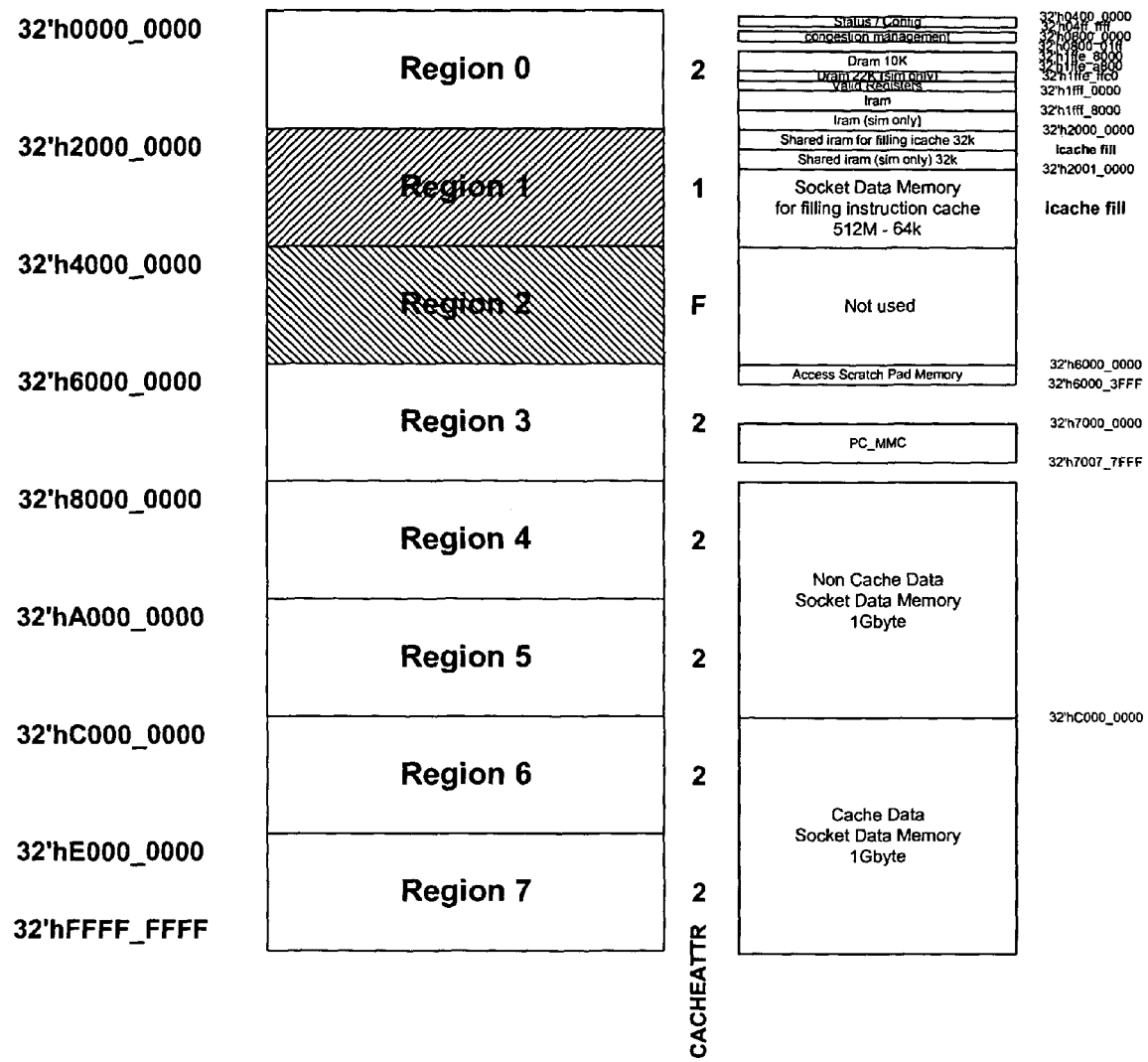
FIG. 12 depicts a memory map representative of the organization of an exemplary protocol core within the SPPS.

The protocol cores may be realized using a Tensilica Xtensa processor, data memory, and instruction cache and tag memory (see, e.g., the exemplary memory map of FIG. 12). The processors process events from the dispatcher 730 and messages from the LUC 734. The cores fast path (DCIF) uses the cluster controller 1108 to communicate with the message bus 742. The not so fast path (PIF) of the cores uses the Bus Interface 1112 and Data Bus Interface 1116 to access the scratchpad 720 and Socket Memory.

b. Interface Cores

The interface cores are configured substantially identically as the protocol cores, and either may fill its cache from socket memory.

c. Cluster Controller

Figure 13:
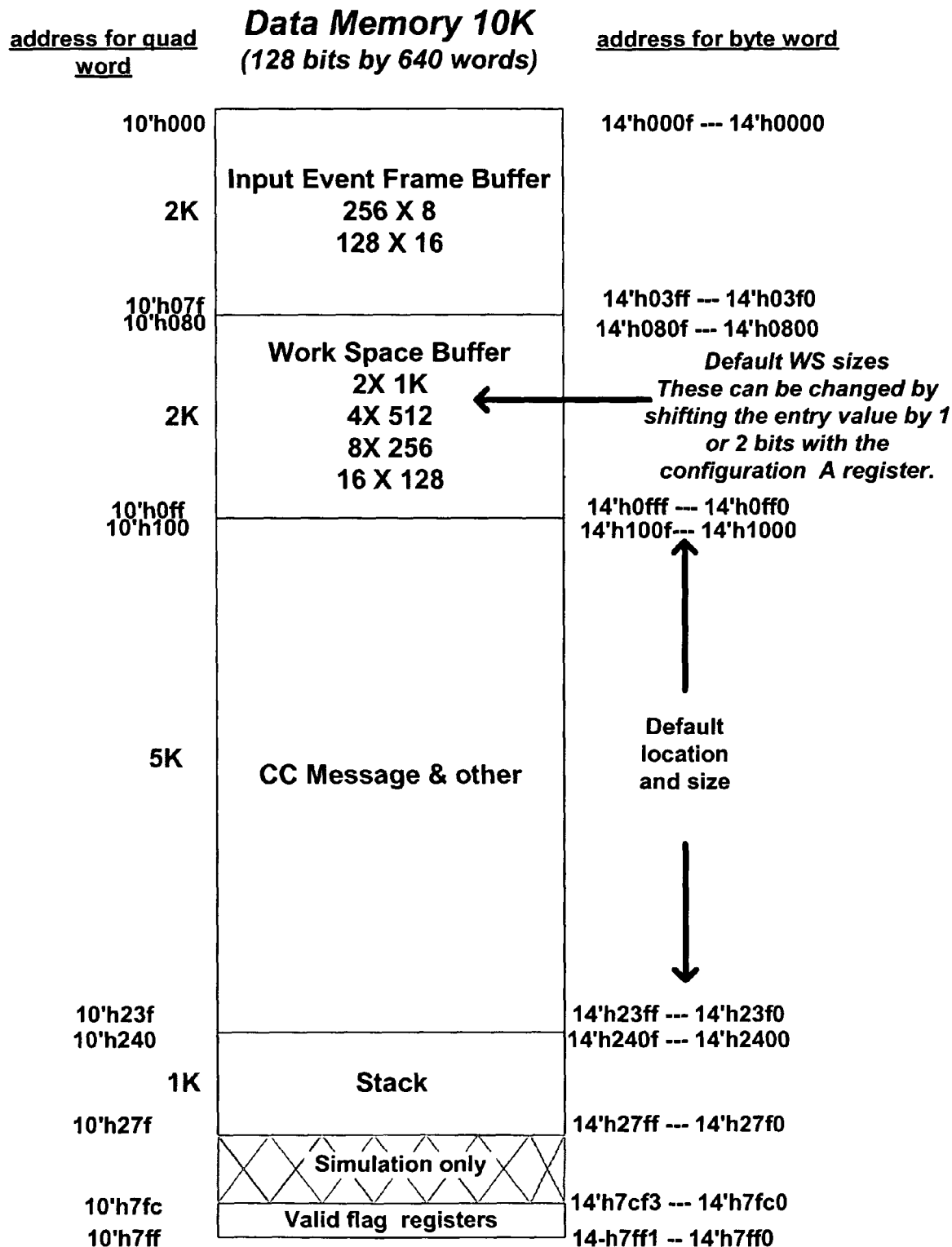
FIG. 13 illustratively represents a memory map for a local dual port memory unit.

The Cluster Controller 1108 consists of cluster_a_cntrl module, cluster_b_cntrl module, pc_dma and a 2 Kbyte FIFO, and is used for bridging the applicable five core processors 760 with the message bus 742 as well as for DMA transfers. A dual port Data Ram is configured between the Cluster Controller 1108 and the processors. FIG. 13 illustratively represents a memory map for the local dual port memory.

d. Bus Interface

Figure 14:
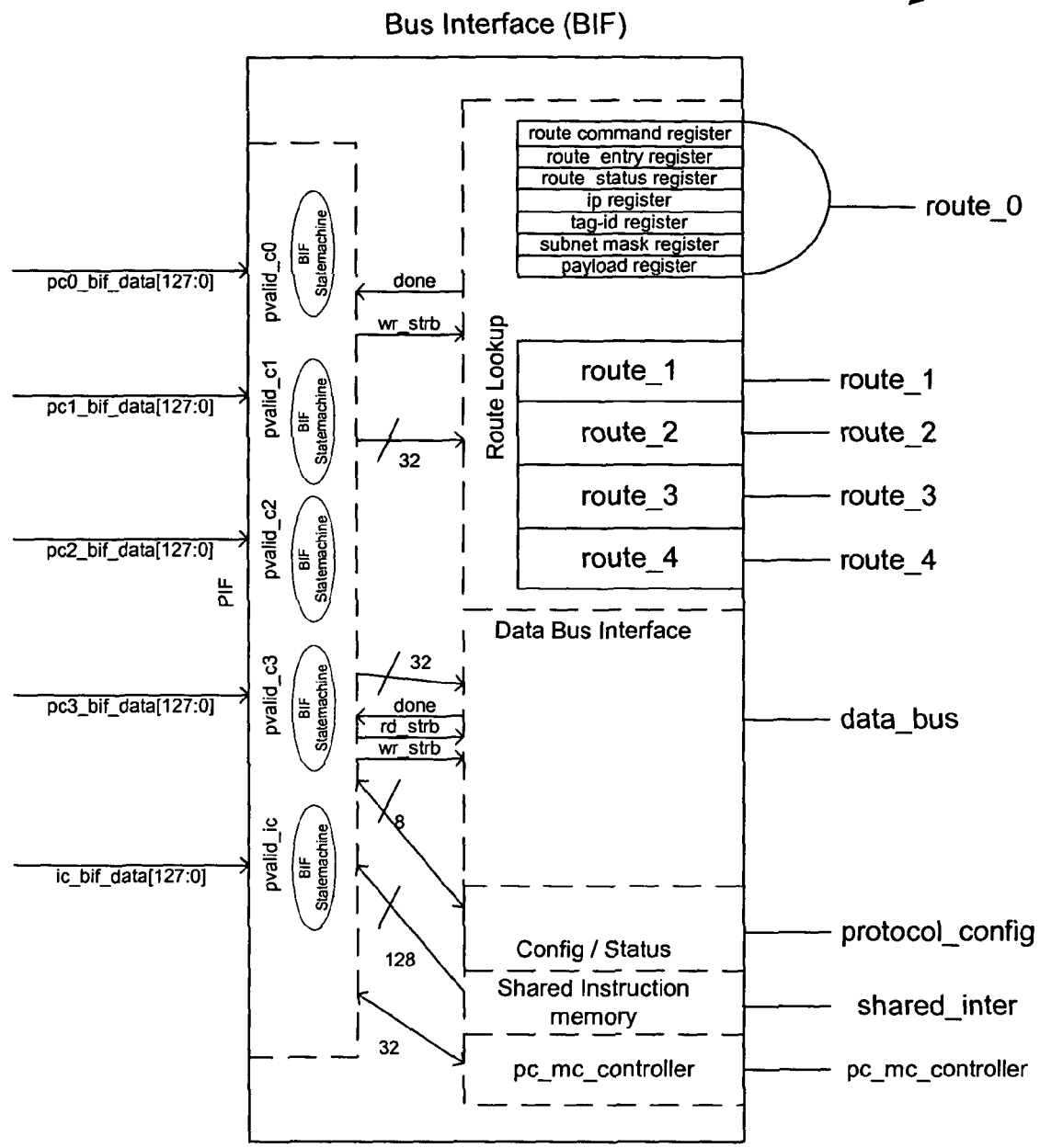
FIG. 14 depicts a bus interface unit disposed within the SPPS.

Referring to FIG. 14, the Bus Interface 1112 is used for bridging the cores processor interface (PIF) to Data Bus Interface 1116, Route Lookup 1120, Shared Instruction Memory 1124 and Status/Configuration Register. State machines monitor the cores for requests and process each one. The Route Lookup Engine and protocol config module 1132 are capable of handling the requests concurrently. The Data Bus Interface 1116 and Shared Instruction Memory 1124 process the requests serially.

e. Route Lookup Engine

Each Protocol Cluster 746, 750 contains a Route Lookup Engine. The Bus Interface 1112 concurrently bridges the applicable five core processors 760, 764 with the Route Lookup Engine.

f. Shared Instruction Memory

The Shared Instruction Memory 1124 is a 32 Kbyte single port ram used for storing instructions and data for the PPCs. The Bus Interface 1112 is used to bridge the Shared Instruction Memory 1124 to the PPCs 760.

g. Data Bus Interface

The Data Bus Interface 1116 serves to bridge the Bus Interface 1112 with the Data Bus. This allows access to the scratchpad 720 and the socket memory from the PPCs 760.

h. Protocol Cluster Registers

There are six types of Registers within each Protocol Cluster 746, 750. The PPCs 760, 764 have access to these through the Bus Interface 1112 and the Management Controller has access through the MMC slave interface 1104.

i. Management Controller Slave Interface (MMC Slave Interface)

The MMC slave interface 1104 provides access to the memories and registers of the Protocol Clusters 746, 750. This is used for powering up the PPCs 760, 764 of the Protocol Clusters 746, 750, initializing registers and RAMs, issuing commands, and monitoring status and statistics information.

j. Processor Management Controller Interface

The Processor to Management Controller interface is used to bridge one processor 760, 764 of a Protocol Cluster 746, 750 to the Management Controller. This processor 760, 764 is then defined as the master of the Management controller. Only one of the two Protocol Clusters 746, 750 will be enabled to control the Management Controller. The PPC 760, 764 that is defined as the master is the first processor to be booted. It can be used to configure the other registers within the SPPS 700 and boot the other PPCs 760, 764.

2. Protocol Cluster Interfaces

Each Protocol Cluster 756, 750 has six types of interfaces.

a. Fast DCIF Interface

The PPCs and Message Bus communicate through this interface. It is used to bridge the applicable Cluster Controller 1108 to the Lookup Controller 734, dispatcher 730, scratchpad 720 and the Socket Memory Controller 758.

b. Processor Interface (PIF)

Each PPC uses this interface to access the Data Bus, Route Lookup Engine, Shared Instruction memory, Configuration/ Status and PCMC interface. Only the Data Bus and PCMC have access out of the Protocol Cluster.

c. Data Bus Interface

The Data Bus Interface 1116 is used to bridge the Cluster Controller 1108 to the scratchpad 720 and the socket memory. The PPCs are considered the masters and the peripherals on the Data Bus are considered the slaves.

d. MMC Slave Interface

The Management Controller uses this interface to access the Protocol Cluster memories and various registers.

e. MMC Master Interface

The interface core uses this interface to access memories and various registers within the SPPS 700. It also uses this interface to access external serial flash or external processor.

f. A jtag Debug Interface

An external jtag bus uses this interface for access to the on-chip debugger of the protocol processors.

F. Lookup Controller (LUC)

1. Overview

During the operation of protocols such as TCP, it is often necessary to retrieve the state of a particular connection. For TCP this state is keyed by the {LP Destination Address, IP Source Address, TCP Destination Port, TCP Source Port, Source ID Number} tuple. The amount, and content, of this state varies widely between protocols. For example, a flow state for TCP would be 512 bytes long and would contain information such as:

Connection state (Established, Closing, Closed etc.)
Window sizes.
Timer information.
Route information.
Pointers to data buffers for receive and transmit.

Similarly, once the TCP protocol has been processed there may be some form of application processing required. This application processing also requires state information. The amount of application state required obviously depends on the application being supported.

One purpose of the LUC 734 is to store this protocol and application state information in a format that allows for quick lookups and updates. The LUC 734 calls this information flow state, and it accesses it via a flow key. For TCP this flow key consists of the {IP Destination Address, IP Source Address, TCP Destination Port, TCP Source Port, IP Protocol, Source ID Number} tuple, but for other protocols other fields will be used. The Source ID Number is included in the flow key for when we wish to distinguish flows received on different interfaces. For traditional TCP termination this Source ID Number is set to zero by the Packet Processor. It is mainly used for transparent TCP termination.

Another task of the LUC 734 is to maintain timers on a per flow basis. Protocols and applications often require such timers for e.g. frame re-transmission, delaying packets etc. With large numbers of flows maintaining these timers can be a large overhead for a general purpose CPU, therefore requiring that the LUC 734 take control of this task.

Referring again to FIG. 10, the configuration of the LUC 734 relative to the other functional units within the SPPS 700 is illustrated. The LUC 734 interfaces to the FDC 738 using the LUC_FDC_Bus and FDC_LUC_Bus via the dispatcher 730. The LUC 734 uses the FDC 738 as an atomic unit to co-ordinate its behavior with the dispatcher 730. The LUC 734 also interfaces to the dispatcher 730 via the dispatcher 730_LUC_Bus for LUC commands from the dispatcher 730 to the LUC 734, and via the LUC_Dispatcher_Bus for timer events from the LUC 734 to the dispatcher 730. The LUC 734 also has an interface to an external random number generator: it uses this to pass random number seed information to the protocol cores 760, 764. The LUC 734 has an interface to the MMC bus 770 for management and control. Finally, the LUC 734 has an interface to external 266 MHz DDR memory 790 that it uses to store flow state. In an exemplary implementation this memory is 16 GB in size and is accessed via a 128-bit bus.

2. Hash Lookups

Figure 15:
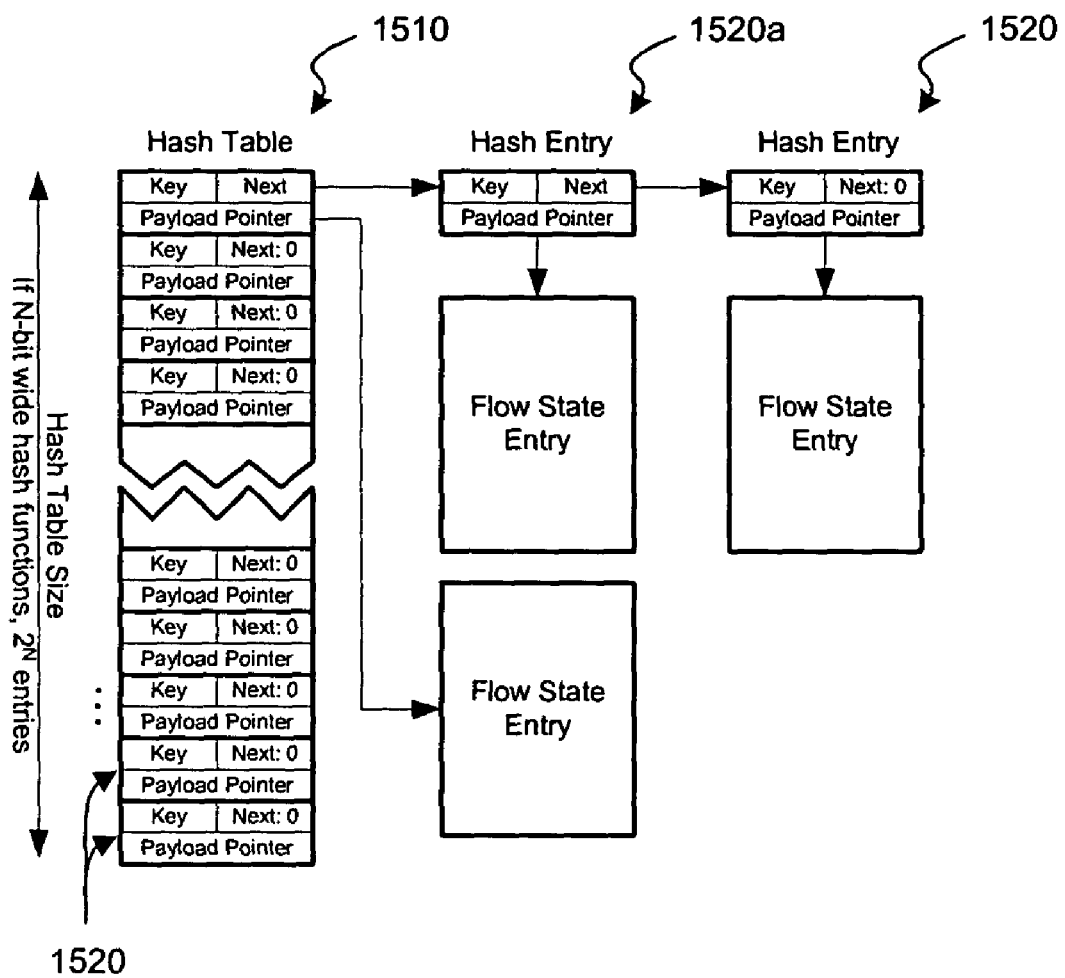
FIG. 15 provides a high-level illustrative representation of the hash lookups performed by the lookup controller.

Given the large number of flows that it may be necessary for the LUC 734 to maintain (e.g., up to 4 million), and the size of the flow key (116-bits), a reasonable implementation for the lookup mechanism would be hashing. FIG. 15 illustrates, at a high level, the hash lookups that the LUC 734 performs. The first step of a lookup is to take the 116-bit flow key, and hash it down to an N-bit wide value using a hash function. Using this N-bit hash value, we index into a hash table and find a hash entry. We then compare the key in the hash entry and the flow key: if they are the same then we have found a match, otherwise we must continue down the linked list of hash entries that have the same hash value. If a match with the flow key is found then a pointer in the hash entry points to the flow state data.

a. Hash Table

Referring to FIG. 15, the hash table 1510 is the table that is indexed by the hash value. It consists of an array of hash entries 1520. Note that this is in contrast to certain hashing implementations where the hash table simply contains pointers to a list of hash entries. The advantage of storing the first hash entry 1520a in the hash table 1510 is that it saves a level of indirection. However, this is at the expense of a much larger hash table and slightly complicated management. In order to minimize memory bandwidth requirements, the hash table 1510 may be implemented to contain hash entries rather than pointers.

Given that the hash table 1510 contains hash entries 1520, each hash entry 1520 must have a valid bit (this is because a hash list may be empty, in which case the entry in the hash table is not valid).

(1) Hash Table Size

The goal of a hashing algorithm is to reduce the search time for a key. For this reason it is desired that the lists that come from the hash table 1510 be as small as possible. This is achieved with well-defined hashing functions and a wide hash value. In an exemplary implementation the hash table 1510 is four times as large as the number of entries 1520 being stored. Since the number of entries in the LUC 734 is flexible, the size of the hash table 1510 should also be flexible.

(2) Hash Table Overflow

When a key is inserted into the hash table 1510, the valid bit of the first hash table entry 1520a is first examined. If this is valid then a collision has occurred, and it is necessary to link the new key into a list of hash table entries. One method of obtaining new hash table entries is to re-use an entry in the hash table 1510, although this method may be cumbersome to maintain. Another approach is to have a pool of available hash table entries that are used when a collision occurs. This is the approach used by an exemplary implementation of the LUC 734, with the pool of available hash table entries being termed the "overflow hash table entries".

g. Hash Function

Each hashing algorithm is based upon a given hash function. The applicable hash function reduces an M-bit value it to an N-bit value. This N-bit value is then used to index the applicable hash table.

There has been a considerable amount of research into the properties of various hash functions. Some of the hash functions that have been proposed during the course of this research are relatively expensive to compute and yet provide only small advantages over much simpler functions. In an exemplary implementation of the LUC 734, a simple XOR-based hash function that folds the M-bit key into an N-bit value is utilized. This approach is reasonable so long as $2^N$ is large compared to the number of flows being supported. A good configuration to aim for is to ensure that $2^N$ is four times larger than the maximum number of keys (flows) to be supported.

As noted earlier, the hash table size should be allowed vary; specifically, for large numbers of flows (L7 switch) a large hash table is necessary, but for small numbers of flows (IP Storage) a small table is sufficient. The hash function must therefore also be configurable in terms of the value of N (the number of bits in the hash). The minimum number size of N is 17, allowing for 128K hash entries. In the exemplary embodiment the maximum size of N is 24, allowing for 16M hash entries. In the exemplary implementation the LUC 734 may be configured to support any value of N between 17 and 24, although other ranges could be employed in alternate embodiments.

Figure 16:
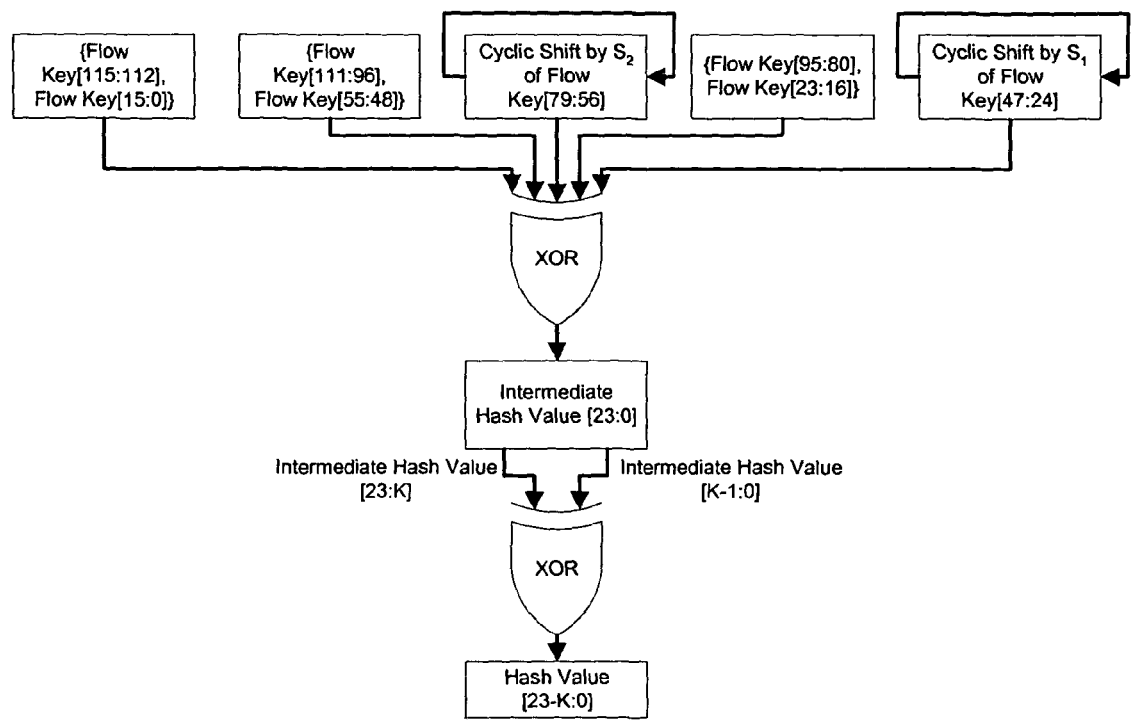
FIG. 16 shows an exemplary manner in which the hash function executed by the lookup controller is computed.

Referring to FIG. 16, the hash function executed by the LUC 734 is computed as follows. First the flow key is chunked into four 24-bit values and one 20-bit value. The 20-bit value is {Flow Key[115:112], Flow Key[15:0]}, and the 24-bit values are {Flow Key[111:96], Flow Key[55:48]}, Flow Key[79:56], {Flow Key[95:80], Flow Key[23:16]} and Flow Key[47:24]. Next Flow Key[79:56] is cyclically shifted by an amount $S_1$, where $S_1$ comes from a configuration register and has maximum value 16. Similarly, Flow Key[47:24] is cyclically shift by an amount $S_2$. These chunks are then folded into a single 24-bit value using the XOR operator. This 24-bit intermediate hash value may then be reduced into the real hash value by folding over the lower K-bits using the XOR operator, where a configuration register determines K.

(1) TCP Hashing

In the context of TCP, the flow key consists of the following 6-tuple: {Source ID Number, IP Protocol, TCP Source Port, TCP Destination Port, IP Source Address and IP Destination Address}. Although the hash function generator of FIG. 16 is designed generate a uniformly distributed hash value on the basis of this 6-tuple, a number of degenerate cases need to be considered:

1. Given that numerous proxies exist, the IP Source Address information could come from a small pool of IP addresses.
2. It could also be the case that all flows are going to the same service, i.e. the IP Destination Address and Destination Port could be the same.
3. Only one protocol may be terminating, so the Encoded Protocol field could be constant.
4. In most configurations, the Source ID Number field will be fixed to a specific value, e.g. zero. Only transparent proxies will use different values in this field.

Note that traffic travels in both directions, so a source value in one direction is a destination value in another. Although it would seem that for a TCP Termination there would only be traffic in one direction (since this an end point), a common application of TCP Termination is as a proxy. In such an application both source and destination address information will be relevant.

In one direction the TCP Source Port and some number of bits of the IP Source address comprise the information experiencing the most variation in the 116-bit flow key. In the other direction the TCP Destination Port and some number of bits of the IP Destination address are the most variable information. For this reason it should be ensured that either the {TCP Source Port, Selective IP Source Address Bits} or {TCP Destination Port, Selective IP Destination Address Bits} are spread across the N-bit hash value, and that they are not folded. The manner in which the LUC hash function can ensure these values are well distributed in the hash value is discussed below.

Figure 17:
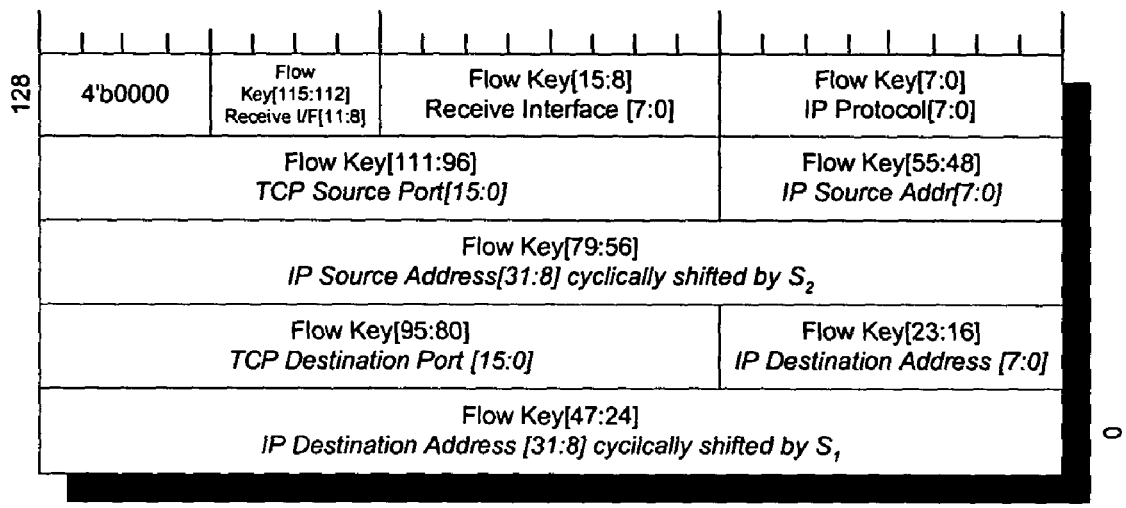
FIG. 17 illustrates the layout of certain 24-bit chunks which are mutually XOR'ed during execution of the process depicted in FIG. 16.

Turning now to FIG. 17, there is illustrated the layout of the 24-bit chunks that are XOR'ed together during execution of the process depicted in FIG. 16. Since the hash value is of configurable width, some number of least significant bits will be folded back into the new least significant bits. The number of bits folded can vary from none up to seven.

Referring to FIG. 17, it is clear that the TCP Source Port and TCP Destination Port fields are always spread across the hash value, even in the case when the lower seven bits are folded. Allowance should also be made for some small number of bits varying in the IP source and destination addresses. In some cases these bits will be in the lower 8-bits of the IP source/destination address, in which case FIG. 17 illustrates the manner in which this abuts the TCP Source/Destination Port. However, it could be possible that the IP Source/Destination Address is varying the greatest in some other area rather than the lower 8-bits. This is the reason for the cyclic shifts performed during the process illustrated by FIG. 16; namely, such shifts enable positioning of the most variable bits of the IP Source/Destination Address just to the right of the TCP Source/Destination Port.

h. Hash Maintenance (1) Hash Searching

In the exemplary embodiment the LUC 734 obtains hash keys in the following manner during operation of the SPPS 700:

1. The hash of the key is obtained as described above with reference to FIG. 16.
2. Using the hash value, the hash entry in the hash table is fetched. If the hash entry is not marked as valid, then the search is terminated: the flow key is not present.
3. If the hash entry is marked as valid then the EIF flag is examined. If a search is being performed for a flow key, and the EIF flag is 0, then there is no match and the process continues with step 5 below. Similarly, if a search is being performed for a listen key and the EIF flag is 1, then there is no match and processing continues with step 5 below.

4. The flow key in this hash entry is compared against the flow/listen key being searched. If a match is found then the process stops, otherwise the process continues.
5. The Valid Next Pointer flag of the hash entry is examined. If it is not set then the search is terminated: the flow/listen key is not present.
6. The next hash entry, as indicated by the Next Pointer is fetched. The flow key of that entry is compared against the search flow/listen key again allow for the EIF flag. If a match is found then the process stops, otherwise the process continues at step 5.

3. Timers a. Overview of Protocol Timers

A number of timers are associated with each flow entry in the LUC 734. These timers are used to correctly execute the protocol, e.g. re-transmission timeouts etc. The LUC 734 performs this task in order to reduce the processing burden of the other elements within the SPPS 700.

When the LUC 734 has determined that a timer has expired, it creates a timer entry in the FDC 738 and passes a "timer expired" event to the dispatcher 730. Eventually the dispatcher 730 will service this timer expiration, and will request a flow lookup. A PPC pair is then notified of the timer expiration and they use the flow's state to determine the correct action and next state. In the exemplary implementation the LUC 734 does not automatically send the flow state to the PPCs 760, 764; instead, it waits until the FDC 738 indicates that it can do so. The reason is that timer events have a critical section with normal packet or interface events, as explained below.

During the processing of a packet event the applicable protocol core may decide to reset a timer. To do this it will set a reset bit for that timer, and when the LUC 734 is told to write this state back to flow memory it will correctly adjust its timers. Note however that there is a time gap between when a protocol core decides to cancel a timer, and when the LUC 734 actually cancels the timer. Given this fact, consider a case where a protocol core is processing a packet event and it decides to cancel the re-transmission timer. However, just at that instant in time the LUC 734 expires the re-transmissions timer, and issues a timer expiration event to the same protocol core. However, this would not be correct since the timer should have been cancelled. The protocol core will now receive a re-transmission timeout, which violates the TCP protocol. Two methods may be employed by the LUC 734 to prevent this situation from arising during the critical timing period referenced above:

1. The LUC 734 is not allowed to issue timer events for flows that are checked out. A flow is checked out from the time the LUC 734 receives a lookup request for that flow, to the time the LUC 734 receives an update/teardown for that flow. However, due to queues between the LUC 734 and the dispatcher 730, this requirement does not cover 100% of the critical timing period, so another rule is provided and described in the following paragraph.
2. The LUC 734 must issue a create timer command to the FDC 738 before a timer expired message can be sent to the dispatcher 730. If the FDC 738 has an entry for the flow then the create timer command will be denied, and the LUC 734 must back off and try again later.

b. Specific Example—TCP Protocol Timers

When implementing TCP, the LUC 734 maintains seven timers for each connection. These seven timers are (see, e.g., TCP/IP Illustrated Volume 2, The Implementation, Gary R. Wright and W. Richard Stevens (ISBN 0-201-63354-X):

1. Connection Establishment Timer: Starts when a SYN is sent. If no response is received within 75 seconds then the connection is aborted.
2. Retransmission Timer: Used to re-send data that does not get acknowledged by the remote end. This timeout varies during the lifetime of a connection dependent upon the round trip time (RTT), but TCP limits its range from 1 to 64 seconds.
3. Delayed ACK Timer: When TCP receives data and wants to send an ACK, it sets the Delayed ACK Timer. This might allow it to acknowledge multiple receives frames. This timer has a 200 ms resolution.
4. Persist Timer: This timer is set when the remote machine advertises a window of zero. This allows the local TCP to probe the window just incase window advertisements get lost. As with the retransmission timer, this timer varies during the lifetime of a connection dependent upon the RTT, but TCP limits its range from 5 to 60 seconds.
5. Keepalive Timer: This timer allows us to check that a connection is still active. Every two hours a special segment is sent to the remote machine. If it responds correctly then nothing is done and the keepalive timer is restarted, otherwise the connection is reset.
6. FIN_WAIT_2 Timer: When an application closes a connection we enter the FIN_WAIT_1 state and send a FIN. When that FIN is acknowledged we enter the FIN_WAIT_2 state: we are effectively waiting for the remote machine to send us a FIN. It could be possible that this FIN gets dropped, or the remote machine does not send it, so we use the FIN_WAIT_2 timer. It is set to 10 minutes. After this 10 minute timer has expired it checks the connection every 75 seconds, and will close it if the connection is idle.
7. 2MSL Timer: This is called the 2MSL timer since the period is twice the maximum segment lifetime. When an application closes a connection it enters the FIN_WAIT_1 state and sends a FIN. When that FIN is acknowledged and the remote machine also sends a FIN we enter the TIME_WAIT state. This timer is set when we enter the TIME_WAIT state, and has a period of 1 minute.

In a traditional BSD TCP/IP stack all these timers are ticked every 500 ms, except for the delayed ACK timer that has a resolution of 200 ms. It should also be noted that the delayed ACK timer is a single shot timer: setting the delayed ACK timer means we would like to be timed out in the next 200 ms tick.

Two pairs of these timers are also mutually exclusive, i.e. only one timer can exist at a time. The first pair is the connection establishment timer and the keep alive timer: the connection establishment timer is only active while the connection is being established, and the keepalive timer is only active after the connection has been established. Similarly, the FIN_WAIT_2 timer and 2MSL timer are mutually exclusive: each timer is tied to a specific state, and we can only be in one state at a time. If we count the delayed ACK timer as a special case one-shot timer, then the remaining six timers can therefore be implemented using four real timers.

In addition to protocol timers, certain application-specific timers are also supported by the LUC 734 for use by the interface cores or the host CPU.

c. Timer Table

Table II (below) illustrates the various timers that the LUC 734 supports for TCP when the LUC 734 is configured for a fast timer resolution of 200 ms, as well as the range and resolution of these timers on a BSD machine. Note that the LUC 734 can be configured for faster timer resolutions. The trade off is increased timer resolution versus increased memory accesses to track these timers. In the BSD software the timers are typically limited to the size of the 16 or 32-bit word, but in the LUC 734 a more conservative approach is taken with respect to the use of memory. The range of timers administered by the LUC 734 can be expanded by keeping a separate timer expired count in the workspace (i.e., multiple LUC timer expirations are simply counted).

for that flow. However, when a flow is checked out the timers for that flow must still be decremented rather simply issuing timer expiration events.

Since the timer table is kept in DDR memory 790, and since each flow only uses 64-bits worth of timers, it will be the case that timers from multiple flows will be present in a single 64 or 32-byte value used to access the DDR memory 790. This introduces read/modify/write problems. For example, consider the case when a flow has been checked out and is now

TABLE II

| ACP Timer | | BSD | | | LUC Timer Control Unit | | |
|---|---|---|---|---|---|---|---|
| Number | Name | Min. | Max. | Resolution | Min. | Max. | Resolution |
| Protocol Timer 1 | Delayed ACK | Default is 200 ms. Can be configured. | | 200 ms | 200 ms | 1 s | 200 ms |
| Protocol Timer 2 | Retransmission Timer | 1 s | 64 s | 500 ms | 200 ms | 101.8 s | 200 ms |
| Protocol Time 3 | Connection Establishment Timer | Default is 75 s. Can be configured. | | 500 ms | 2 s | 2.2 hours | 2 s |
| | Keepalive Timer | Default is 2 hours. Can be configured. | | | | | |
| Protocol Timer 4 | FIN_WAIT_2 Timer | Default is 10 m + 75 s. Can be configured. | | 500 ms | 2 s | 16.9 m | 2 s |
| | 2MSL Timer | Default is 1 m. Can be configured. | | | | | |
| Protocol Timer 5 | Persist Timer | 5 s | 60 s | 500 ms | 200 ms | 101.8 s | 200 ms |
| Application Timer 1 | Fast Application Timer | N/A | N/A | N/A | 200 ms | 50.6 s | 200 ms |
| Application Timer 2 | Medium Application Timer | N/A | N/A | N/A | 2 s | 122 s | 2 s |
| Application Timer 3 | Long Application Timer | N/A | N/A | N/A | 2 s | 8.4 m | 2 s |

Referring to FIG. 18, there is provided an exemplary entry within a timer table maintained by the LUC 734. The exemplary entry of FIG. 18 is 32-bytes in length, allowing it to record the timers for four flows. If the LUC 734 can support $N_{FLOWS}$ flows, then the timer table must record the timers associated with each of the $N_{FLOWS}$ flows. The timers associated with a given flow may be determined simply by taking Local Proxy ID[21:2] and using it as an index into the timer table to obtain the 32-byte timer entry. Then Local Proxy ID[1:0] is utilized in order to pick which set of timers to use.

Table III defines the set of values which may be registered by the timers described above. Note that there exist two values for an expired timer: all ones and all ones minus one. A check should be made for both of these values.

TABLE III

| Timer Value | Description |
|---|---|
| 0 | The timer is disabled and will not be ticked. |
| All ones | The timer has expired, and a CRTIMER command was successfully issued to the FDC 738. |
| All ones minus 1 | The timer has expired, but the CRTIMER FDC command was either not successful or has not yet been issued. |
| Other values | These indicate the actual amount of time left for this timer. For example, if a 200 ms timer has value 2 then it will expire in the next 200 to 400 ms. | d. Timer Cache

As described above, the LUC 734 maintains a number of timers per flow. One of the requirements of the LUC 734 is that when a flow is checked out, no timer events can be issued being checked back in, i.e. the LUC 734 has received an update command. The new timers for this flow must now be merged in with the existing timers in the 64 or 32-byte word. That read/modify/write operation on DDR memory 790 is expensive, and should be avoided. It also introduces other problems where two internal LUC 734 engines may be modifying timers for different flows but the flows are in the same 64 or 32-byte word. To solve these problems the LUC 734 uses a timer cache.

In a particular implementation of a LUC 734, the timer cache comprises 32-bytes worth of timers, i.e. four flows worth of timers. When a flow is checked out the word from DDR memory 790 containing the timers for that flow is brought into the timer cache. While that flow is checked out the timers are updated in the timer cache rather than the DDR memory 790. The timer cache is a CAM that is looked up using a shifted value of the Local Proxy ID. Note also that when a timer tick occurs the LUC 734 must first check the contents of the timer cache before retrieving an entry in the timer table.

Table IV and Table V below illustrate the format of entries in the timer caches of the LUCs 734 present within two different implementations of the SPPS 700.

TABLE IV

| Field | Size | Description |
|---|---|---|
| Valid Bit | 1-bit | Indicates if the entry in the timer cache is valid. |
| Lock Bit | 1-bit | Indicates if this entry is currently being worked on and is locked. |

TABLE IV-continued

| Field | Size | Description |
|---|---|---|
| Timer Cache Key | 19-bits | This is the key for the timer cache. It is Local Proxy ID[21:3]. Since each timer cache entry contains eight flows worth of timers, we shift the socket ID right by 3 to form the tag. |
| Checkout Bitmap | 8-bits | Each bit indicates whether the timers for this flow are checked out or not. When this bitmap reaches zero the cache line can be written back to DDR memory 790 and emptied. |
| Timers for Local Proxy ID[2:0] | 8 × 64-bits | Timers for each flow. A flows worth of timers is 64-bits. |

TABLE V

| Field | Size | Description |
|---|---|---|
| Valid Bit | 1-bit | Indicates if the entry in the timer cache is valid. |
| Lock Bit | 1-bit | Indicates if this entry is currently being worked on and is locked. |
| Timer Cache Key | 20-bits | This is the key for the timer cache. It is Local Proxy ID[21:2]. Since each timer cache entry contains four flows worth of timers, we shift the socket ID right by 2 to form the tag. |
| Checkout Bitmap | 4-bits | Each bit indicates whether the timers for this flow are checked out or not. When this bitmap reaches zero the cache line can be written back to DDR memory 790 and emptied. |
| Timers for Local Proxy ID[1:0] | 4 × 64-bits | Timers for each flow. A flows worth of timers is 64-bits. |

The timer cache provides three simple commands:
1. Lock Unconditional: Given a Local Proxy ID, this looks up and locks a line in the cache. If a timer cache entry is found, but the lock bit is set, then this command is not acknowledged. If a timer cache entry does not exist then one is created and locked. The response of this command indicates if a timer cache entry had to be created or not.
2. Unlock: This clears the lock bit.
3. Unlock and Remove: This clears the valid bit.

Once a timer cache entry line has been locked the checkout bitmap and timers can be modified.

Using these commands the internal engines of the LUC 734 manage the timer cache. For example, when performing a command such as LFK (Lookup with Flow Key), the LUC engine will use a Lock Unconditional command on the Local Proxy ID. It will then update the checkout bitmap to indicate that this flow is now checked out. Finally an unlock command leaves the entry in the timer cache entry but clears the lock bit. Any future operations on the timers of this flow will be performed upon the timer values in the timer cache.

The reason for the lock bit is to ensure that multiple units are not working on a cache line at the same time. For example, it is desired to ensure that the timer control unit does not collide with any other LUC engines while it is updating the timers of an entry in the timer cache.

4. Split Workspaces a. Split Protocol Core and Interface Core Processing

The SPPS 700 is designed such that two PPCs 760, 764 can be assigned to process a flow: a protocol core and an interface core. The protocol core might take care of transmission protocol (e.g. TCP) related functions, while the interface core would perform more application-oriented tasks. Both of these PPCs 760, 764 will require the LUC 734 to store state regarding a flow.

The LUC 734 manages this task by splitting a workspace into two parts: one part is for the protocol core, and one part for the interface core. This split is configurable, and could even be such that one core gets all of the flow state and the other gets none. The split also allows a region of the flow state to be marked as shared, i.e. it is sent to both the protocol core and the interface core.

When the LUC 734 is given a request to perform a lookup it is informed of the protocol core ID, the protocol workspace ID, the interface core ID and the interface workspace ID. Once the LUC 734 has found the flow state, it then sends the appropriate amount to each {Core ID, Workspace ID} pair. After the PPCs 760, 764 have finished processing, they will write back their respective workspaces to the LUC 734.

The PPCs 760, 764 then negotiate with the dispatcher 730 to indicate that they have finished processing the event. When the dispatcher 730 has determined that both cores have finished processing, it sends an update command to the LUC 734. The LUC 734 then re-assembles this back into a single workspace and updates the flow.

(2) Exclusive Flow State Splitting

As described above, it is possible to split a flow state across two workspaces. In this section the manner in which this splitting is performed is described in greater detail. For present purposes it is assumed that no sharing of the workspace is being performed, although workspace sharing is discussed elsewhere herein.

Figure 19:
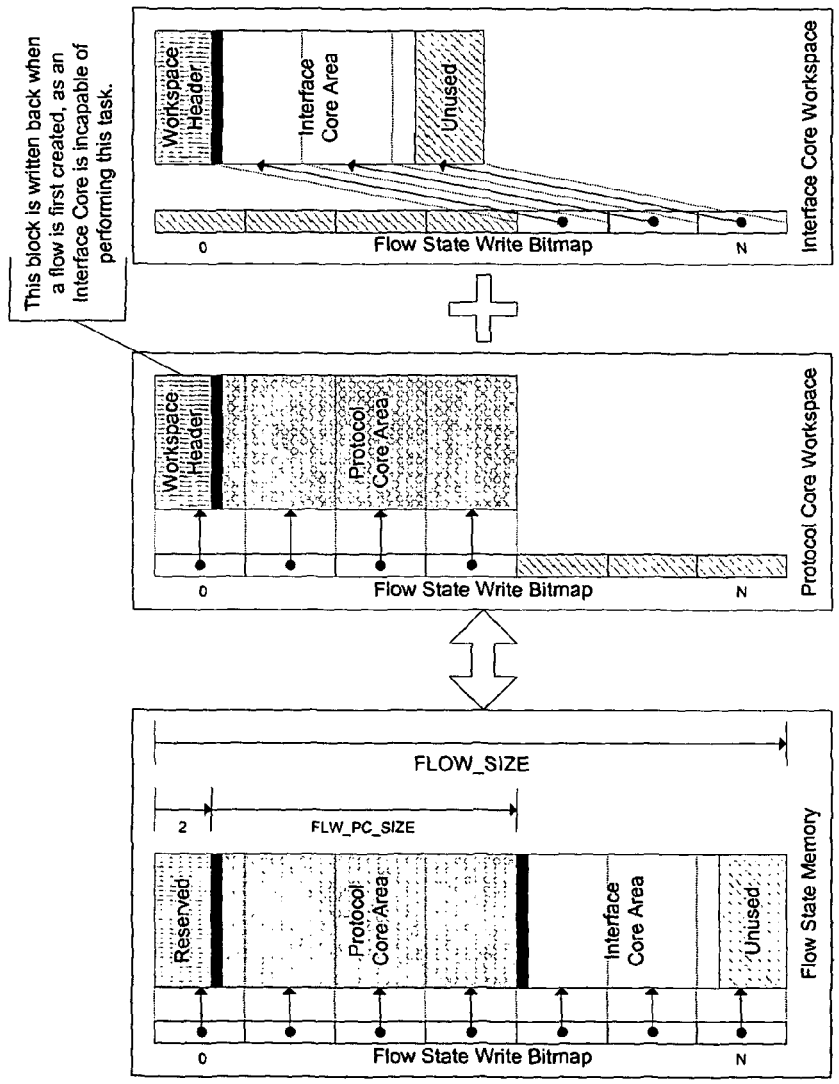
FIG. 19 illustrates the splitting of a flow state, and depicts three principal areas in which state information is maintained.

FIG. 19 illustrates the splitting of a flow state, and depicts three principal areas in which state information is maintained:
1. The DDR memory 790
2. The workspace of a protocol core
3. The workspace of an interface core (a) Flow State Memory Parameters With reference to FIG. 19 and the flow state memory, the flow state is split into the following regions in the following order:
1. A reserved area where the LUC 734 will write the first two 128-bit words of the workspace header. It corresponds to the first two 128-bit words of the location in DDR memory 790 where the flow is held.
2. An area for the Flow State Write Bitmap. This is illustrated in FIG. 19 as a black area, and is 32 bits in size.
3. The Protocol Core Area, an area for the exclusive use of a protocol core.
4. Another black area that will be used for the Flow State Write Bitmap of the interface core workspace header.
5. The Interface Core Area, an area for the exclusive use of an interface core.

When exclusive flow state splitting is used, in an exemplary implementation the protocol core must write back the very first block when a flow is created since this first block contains the Flow Key. The LUC 734 does not write this Flow Key, but instead relies on its writing by the protocol core. The interface core cannot perform this task since the interface core workspace header is not written back to the flow state.

(b) Protocol Core Workspace Parameters

When the LUC 734 sends a split flow state to a protocol core, it configures the workspaces as shown in the Protocol Core Workspace block of FIG. 19. This is a direct copy of the first (2+FLW_PC_SIZE) 128-bit words from the DDR memory 790 into the workspace. Note however that the LUC 734 overwrites the first two 128-bit words with the Workspace Header.

(c) Interface Core Workspace Parameters

When the LUC 734 sends a split flow state to an interface core, it configures the workspaces as shown in the Interface Core Workspace block of FIG. 19. To create this workspace the LUC 734 performs two operations:
1. It places the same workspace header that it did for the protocol core at the front of the workspace. This will occupy the first two 128-bit words. Note that the Workspace Header does not include the 32-bit Flow State Write Bitmap, since in the exemplary embodiment the LUC 734 does not set this field.
2. The LUC 734 then copies the Interface Core Area from the DDR memory 790 and places it just after the workspace header, i.e. it starts writing the Interface Core Area in the second 128-bit word of the interface core workspace. The first 32-bits of this area are unusable by the interface core since it contains the Flow State Write Bitmap.

(3) Flow State Splitting with Sharing

The above section described the manner in which a flow state may be exclusively split across a protocol core and an interface core. In this section an approach is described which enable an area of flow state to be shared by both cores.

Figure 20:
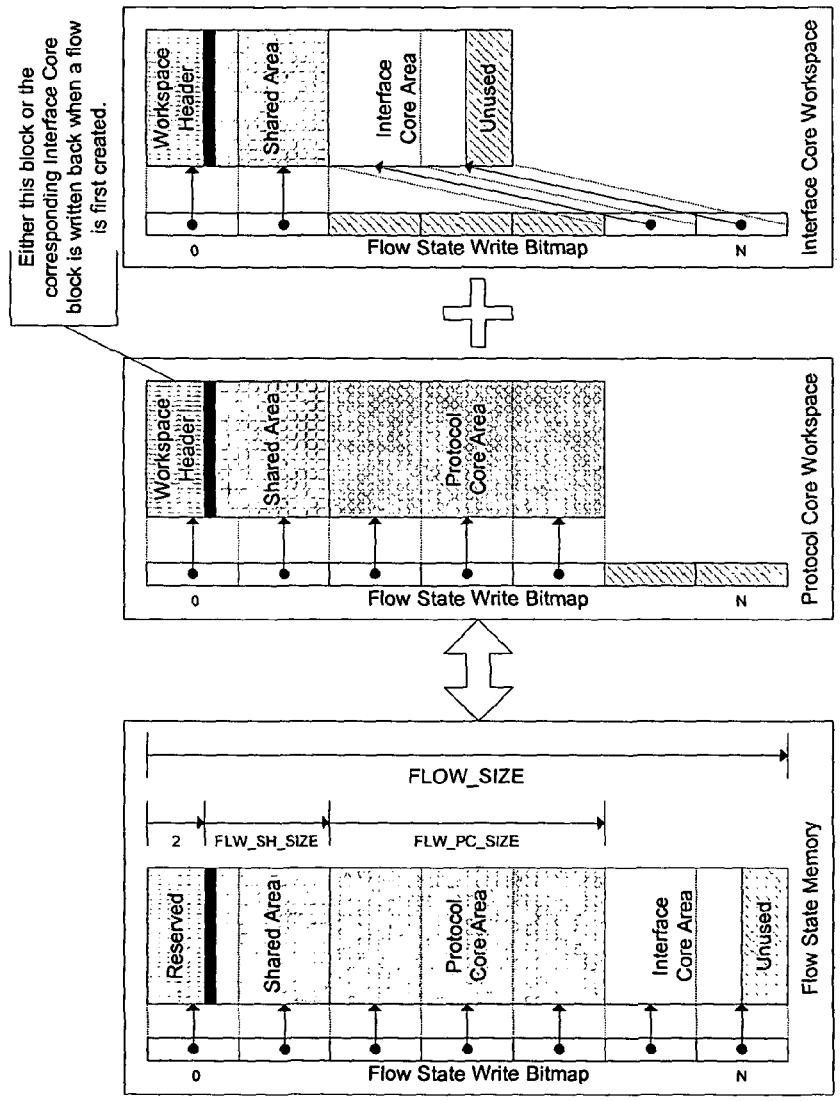
FIG. 20 illustrates an exemplary approach to flow state splitting with sharing.

FIG. 20 illustrates an exemplary approach to flow state splitting with sharing. As shown, FIG. 20 includes substantially the same elements as FIG. 19, but further includes a shared area as well. When flow state splitting with sharing is used, either the protocol core or the interface core must write back the first block when a flow is created. In the case of shared flow state splitting then this first block will be in the Shared Area. In that case either the protocol core or the interface core must write back the first chunk of the Shared Area, even if that area has not changed.

(a) Flow State Memory Parameters

It is observed that the Shared Area is the first portion of the flow state in the DDR memory 790. Note that since the Shared Area is the first area, it incorporates the 32-bits reserved for the Flow State Write Bitmap. The rest of the flow state in DDR memory 790 is exactly the same as in the case of exclusive splitting.

(b) Interface Core Workspace Parameters

When the LUC 734 sends a split flow state that contains sharing to an interface core, it configures the workspaces as follows:
1. The LUC 734 places the same workspace header that it did for the protocol core at the front of the workspace. This will occupy the first two 128-bit words. Note that the Workspace Header does not include the 32-bit Flow State Write Bitmap, since the LUC 734 does not set this field.
2. The LUC 734 copies the Shared Area from the DDR memory 790 and places it just after the workspace header, i.e. it starts writing the Interface Core Area in the second 128-bit word of the interface core workspace. The first 32-bits of this area are unusable by the interface core since it contains the Flow State Write Bitmap.
3. The LUC 734 then copies the Interface Core Area from the DDR memory 790 and places it just after the Shared Area.

(4) Shared Area Considerations

A number of considerations are required to be addressed in connection with facilitating usage of shared areas:
1. If the Shared Area is modified, then the other PPC will not see that modification until all outstanding events have been processed. The reason is that the workspace is not written back to the DDR memory 790 until all the outstanding events have been processed. Only when it is written back to DDR memory 790 will it have the opportunity to be "re-split".
2. The LUC 734 itself is not configured to control which processors are permitted to write in the Shared Area. If two PPCs 760, 764 write to the same Shared Area, then the flow state in the DDR memory 790 will contain the data from the interface core.

One way of successfully addressing the above considerations is to configure a Shared Area listen entry which matches the corresponding Shared Area of a flow entry. Therefore, when a flow entry is created both the interface core and protocol core are able to be informed of the same shared values.

(5) Workspace Write Back Rules

The following rules are applicable when a core issues a done event in response to an input event within a workspace:
1. The workspace must be written back before the done event is sent to the dispatcher 730.
2. For done events that are to update the workspace, either the protocol core or the interface core must write back at least the workspace header. If this is not the first update for this flow then the writeback bitmap can be set to all zeros. Note that it is acceptable for both the protocol core and the interface core to write back a workspace
3. For done events that are to tear down a flow, it is not required that the protocol core or interface core write back a workspace (or workspace header). If a workspace is written back then it is ignored.
4. For flows that are created, the protocol core must write back at least the first 64-bytes of a workspace, and the corresponding bit must be set in the writeback bitmap. In is invalid for the interface core to only write back the workspace, i.e. the protocol core must perform this operation (interface core may also optionally write back).

(6) Memory Protection

Given that two independent PPCs 760, 764 can potentially modify an area of the flow state, some level of memory protection will ideally be performed. Such memory protection may be effected by the LUC 734 by using simple masks. Before a Flow State Write Bitmap is examined, one of four masks is first applied:

One mask is used by a protocol core to apply to a Flow State Write Bitmap for a flow state.

Another mask is used by a protocol core to apply to a Flow State Write Bitmap for a listen state.

Yet another mask is used by an interface core to apply to a Flow State Write Bitmap for a flow state.

A final mask is used by an interface core to apply to a Flow State Write Bitmap for a listen state.

By correctly setting these global masks, a Protocol or interface core can prevent its region, or a Shared Area, from being overwritten. Similar masks are also present for updating the timer values in a workspace header.

G. Socket Memory Controller (SMC)

1. Overview

The Socket Memory Controller 758 provides access to up to 16 GB of 266 MHz DDR SDRAM, which is shared with the LUC 734. The portion of this 16 GB of memory used by the SMC 758 is termed the Socket Data Memory (SDM). In the exemplary embodiment the SMC 758 performs four main tasks:
1. Provide access to the SDM and Scratchpad via the Data Bus. This enables interface cores to execute instructions from the SDM, and interface cores and protocol cores to access data from the SDM or scratchpad. Access is available from the Data Bus for single words or multi-word bursts. The multi-word bursts are used for DMA operations involving the protocol clusters 746, 750.

2. Data storage for reliable protocols. In the case of TCP, the data being stored is the byte stream. In a traditional CPU-based protocol stack this data is provided to the user via the Socket Library, hence the descriptive terms Socket Memory Controller and Socket Data Memory.

3. Perform DMA operations between Scratchpad and SDM. These operations allow the cores to use the SDM as data storage for packets, e.g. during IP re-assembly. This is distinct from the DMA operations between the scratchpad/SDM and the Processors Cores, which occurs over the Data Bus.

4. Pass-through Output or Dispatcher Events. In the exemplary embodiment only the SMC 758 is configured to pass output events to an OPU 770. If a protocol or interface core wishes to send an output event, then it must do so via the SMC 758. Since this output event may frequently be buffer-related, the output event will typically be combined with a standard SMC command. However, the SMC 758 must also provide a pass-through capability in the case where it functions to simply pass the request from the SMC 758 onto the OPU 770. The SMC 758 also provides the only path through which the PPCs 760, 764 may send events back to the dispatcher 730.

Figure 21:
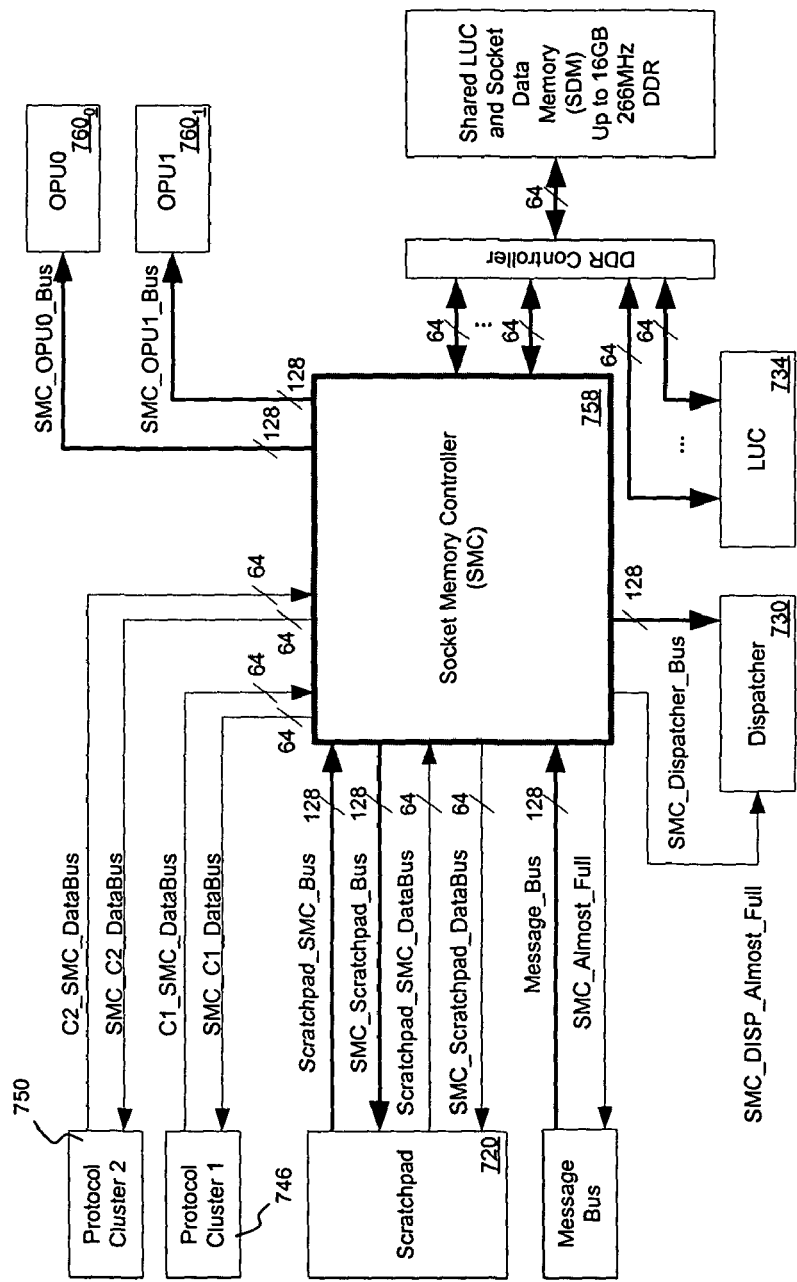
FIG. 21 illustrates the manner in which a socket memory controller is interconnected within the SPPS.

FIG. 21 illustrates the manner in which the SMC 758 is interconnected within the SPPS 700. For example, FIG. 21 depicts the connection between the SMC 758 and each protocol cluster via a dedicated bi-directional Data Bus. The SMC 758 is also linked over a relatively wide path to each OPU 770 in order to ensure that events can be transmitted to the host CPU and packets to the network. In addition, the SMC 758 is connected to a path over which events may be sent back to the dispatcher 730, thereby allowing the SMC 758 to communicate information back to the protocol and interface cores, thus allowing the chaining of events. In order for the SMC 758 to receive commands from the protocol and interface cores, the SMC 758 is connected to the Message Bus. Finally, the SMC 758 uses two wide buses to/from the scratchpad 720 so that data can be written/read.

2. Socket Buffers

One of the key functions of the SMC 758 is to manage the receive and transmit re-assembly buffers of a stateful protocol connection. One such example is the receive and transmit buffers of a TCP connection. Note that a conventional BSD TCP/IP software stack maintains three buffers:

1. A TCP re-assembly queue for data that has arrived out of order.
2. A socket receive buffer for data that has arrived in order and is awaiting a read by the application.
3. A socket send buffer for data that has been written by the application but has not yet been acknowledged by the peer.

These three memory buffers are collapsed into a receive and send buffer in the SMC 758, i.e. the TCP re-assembly queue and the receive buffer are combined.

In the following sections the techniques used by the SMC 758 to manage these re-assembly buffers are described. These techniques are designed to be relatively simple to implement, and yet provide some form of dynamic memory management.

a. Overview of Socket Buffers

For each socket a receive buffer and a transmit buffer are established, each of which is indexed by a 32-bit sequence number. Each buffer records a start sequence number, which is the sequence number of the first byte in the buffer. As data is consumed in the buffer the start sequence number is changed, thereby allowing higher-valued sequence numbers to be stored. Effectively, the SMC 758 projects a small window onto this 32-bit sequence number range, and over a period of time this window moves to the right while remaining of fixed size.

The PPCs 760, 764 are configured to determine the maximum size of these buffers. For example, in the case of TCP the maximum receive buffer size is determined at the time of connection and is advertised as a window in TCP segments. Similarly, the PPCs 760, 764 must determine the amount of data to be transmitted which is buffered prior to informing the applicable application that no additional transmission capacity is available.

A number of cases may arise in which the PPCs 760, 764 will not use the maximum available amount of transmission buffer space. This may be because the applicable application only performs a small number of writes, or because there exist long periods of time during which the application does not write any data. Similarly, there will be many cases when data is received in order from the network, and the application is immediately ready to consume it. In this case the maximum amount of receive buffer space will not be used. Given these facts, a static allocation scheme for the SMC 758 were to be employed, then a substantial portion of the SDM would be unused, i.e. actually allocating SDM to fit the maximum possible receive and transmit buffers is not very efficient. Accordingly, in the exemplary implementation the SMC 758 utilizes a dynamic buffering arrangement instead of this static scheme.

b. Dynamic Allocation

One implementation of such a dynamic buffering arrangement may comprise, for example a coarse-grained dynamic allocation scheme in which knowledge about the maximum size of the buffer is utilized. In this approach the known maximum buffer size is split it into sixteen pages, where the page size is a power of two. For example, a 16 KB maximum buffer can be described as sixteen pages of size 1 KB. For each socket, two tables of sixteen pointers each are maintained. Each of these tables points to the sixteen pages for this connection. It of course may be appreciated then there exists no need for it to be allocated, and as pages are needed they can be dynamically taken from a list of free pages.

It is assumed that the majority of buffers may be organized into four primary categories. All pages with the same type have the same maximum size, but the different types can have different maximum sizes. This allows the SMC 758 to manage four different page sizes.

Figure 22:
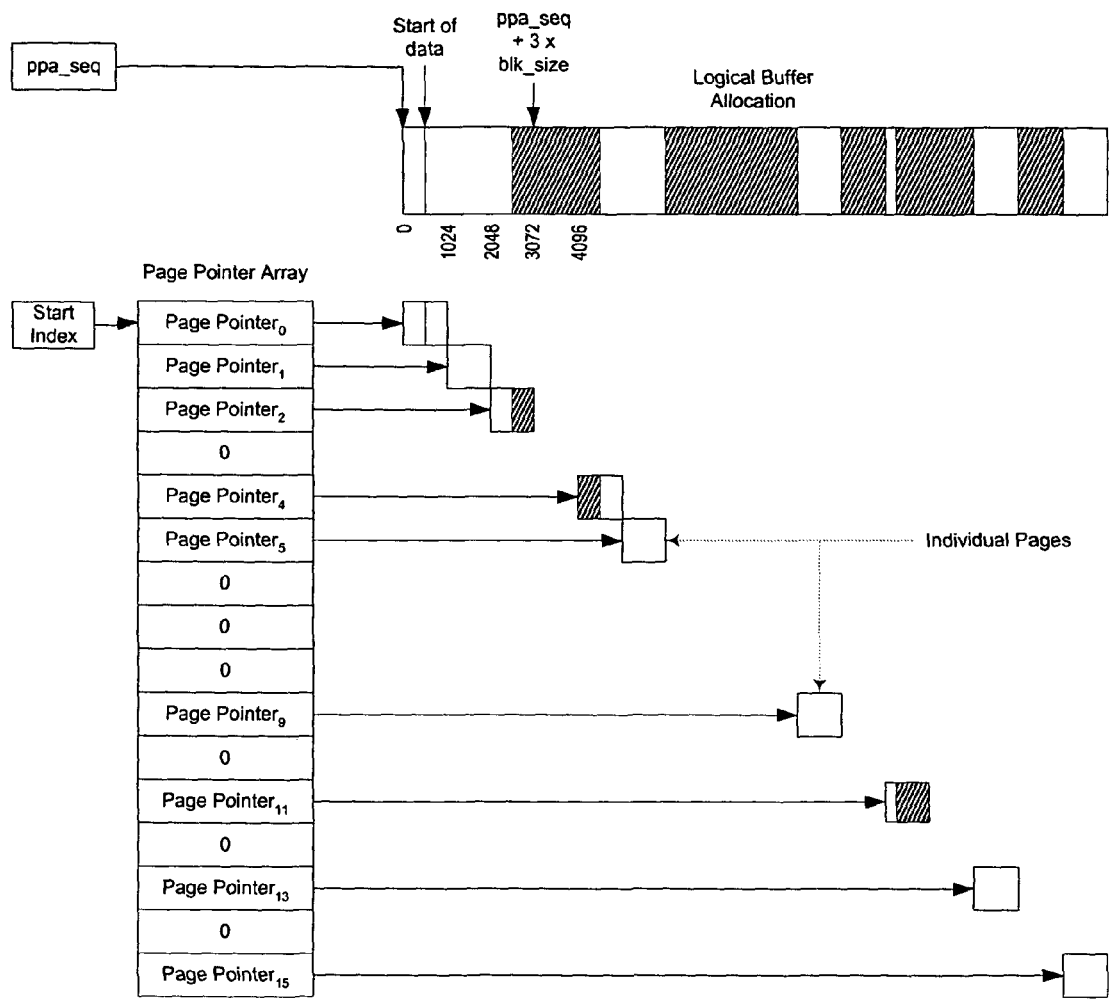
FIG. 22 illustrates a socket buffer allocation scheme for a receive buffer containing holes.

FIG. 22 illustrates the socket buffer allocation scheme for a receive buffer containing holes and how it is allocated using a set of sixteen pointers. Each byte in the buffer has a sequence number, with the sequence number of the first byte in this buffer being ppa_seq. Since this may not entirely coincide with the perception of the PPCs 760, 764 with respect to the start of data in the buffer, there may be a certain amount of wastage at the front end of the buffer. This unused portion is illustrated by the white areas depicted in FIG. 22.

Again referring to FIG. 22, each grey area represents data that has been previously received. In addition, the cross-hatched area represents holes in the byte stream. Notice that for pages that are completely consumed by a hole, no pages are actually allocated (see, e.g., Page Pointer$_3$). It is also observed that the pages need not be completely filled with data, although the whole page is still allocated.

One consequence of this scheme is that an entire page is allocated during each allocation operation, regardless of the extent of the page is actually used. For example, if a 64 MB receive buffer is required then the page size must be 4 MB. If a single segment arrives for a page then a whole 4 MB is still allocated. Such a situation could occur in TCP when keepalive segments are being sent from peer TCP applications, or when small amounts of data are being received on a connection with large page sizes. The assumption being made is that if such large pages are being used then it is likely that large amounts of data are being sent/received. For small keep-alive segments the data can be quickly read and the (large) page returned to the free list.

FIG. 22 also illustrates the use of the Start Index value to index into the Page Pointer Array. The Start Index is the index of the page pointer whose first byte has sequence number ppa_seq. In the case of FIG. 22, the value of Start Index is zero. However, as the data is consumed by the application, preparations are made to free up a page. When this occurs the value of the Start Index is incremented, as exemplified by FIG. 23. Specifically, FIG. 23 corresponds to the situation of FIG. 22 subsequent of the first two pages. It is observed that in FIG. 23 the value of the Start Index has changed to "2".

c. Buffer Sequence Numbers

As mentioned previously, a socket buffer effectively provides a small window onto a much larger byte stream. In the exemplary implementation this byte stream is indexed by a 32-bit sequence number, which is also recorded in the first byte in the socket buffer upon being provided by a PPC 760, 764. It is then determined where writing should occur in the socket buffer based upon the difference between the sequence number supplied in an SMC Request and the sequence number of the first byte of the socket buffer. For example, for TCP this 32-bit sequence number is the TCP sequence number.

In the case of TCP, the SMC 758 need only be configured to perform addition and subtraction operations for sequence numbers. However, for completeness explanations of comparisons between sequence numbers is also included.

Since a socket buffer need not start at sequence number zero, and since large amounts of data can be transferred over a socket, the case when the 32-bit sequence number "wraps" must also be considered. This case is addressed by making all sequence number arithmetic modulo $2^{32}$. For example, if the starting sequence number of a socket buffer is $(2^{32}-500)$, and a write request is received for sequence number 1500, then the offset into the socket buffer is $((1500-(2^{32}-500))) \text{modulo } 2^{32})=2000$. This is intuitively correct, 500 bytes remain at the end of the sequence number range, and it is desired to write 1500 bytes to the right of such point. Modulo $2^{32}$ arithmetic is easily accomplished in hardware by using a 32-bit arithmetic unit.

Figure 24:
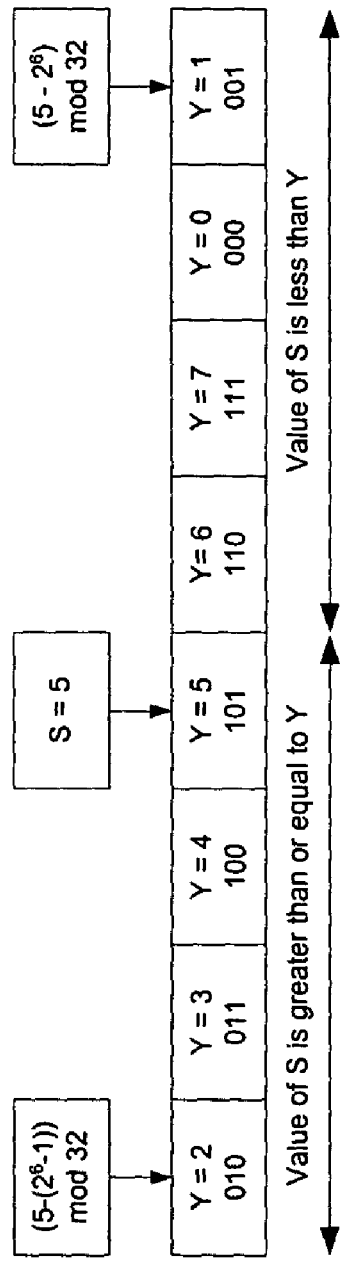
FIGS. 24 and 25 each illustrate a TCP sequence range useful in describing sequence number tracking effected by the socket memory controller during performance of write operations.
Figure 25:
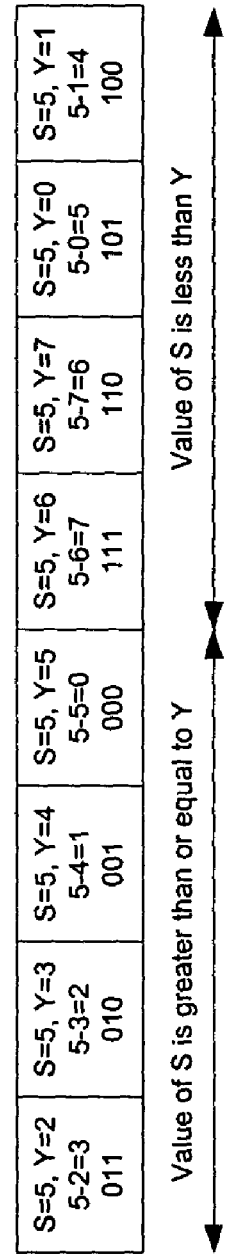

For tracking sequence number holes, it is necessary to implement "less than or equal to" and "greater than or equal to arithmetic comparisons". An order is imposed on sequence numbers by splitting the sequence space into two halves. For a sequence number S, there are $(2^{31}-1)$ values to the left of it which are considered "less than", and $2^{31}$ values to the right of it which are considered "greater than", i.e. sequence numbers in the range $((S-(2^{31}-1))\text{modulo } 2^{32})$ to $((S-1)\text{modulo } 2^{32})$ are less than S, and sequence numbers in the range $((S+1) \text{modulo } 2^{32})$ to $((S+2^{31}) \text{modulo } 2^{32})$ are greater than S. For 32-bit values this is very hard to visualize, so FIG. 25 shows a simplified example for the case of the sequence numbers being only 7-bit and S=5. In FIG. 24, for each sequence number there is also included its 3-bit binary value.

To determine if a sequence number S is less than a sequence number Y, the value of $((S-Y) \text{modulo } 2^{32})$ is examined. FIG. 25 illustrates the same TCP sequence range as FIG. 24, but in this case the value of Y has been subtracted from the value of S. It is observed that when the sequence number S is less than the sequence number Y, the most significant bit (MSB) of $((S-Y) \text{modulo } 2^{32})$ is one. When sequence number S is greater than or equal to Y, the MSB is zero.

A pair of sequence numbers may be compared as follows. S is less than Y if $((S-Y) \text{modulo } 2^{32})$ has the MSB set. S is greater than or equal to Y if $((S-Y) \text{modulo } 2^{32})$ has the MSB clear. Table VI defines the five basic operations that can be performed on TCP sequence numbers, along with their logical values. The mnemonics of Table VI will be utilized hereinafter when manipulating sequence numbers.

TABLE VI

| Mnemonic | Description |
| --- | --- |
| SEQ_SUB(S,Y) | 32-bit sequence number subtraction: (S − Y) modulo $2^{32}$ |
| SEQ_LT(S,Y) | Comparison, S less than Y: SEQ_SUB(S,Y)[31] = 1 |
| SEQ_GEQ(S,Y) | Comparison, S greater than or equal to Y: SEQ_SUB(S,Y)[31] = 0 |
| SEQ_LEQ(S,Y) | Comparison, S less than or equl to Y: SEQ_SUB(S,Y)[31] = 1 OR SEQ_SUB(S,Y) = 32'h0 |
| SEQ_GT(S,Y) | Comparison, S greater than Y: SEQ_SUB(S,Y)[31] = 0 AND SEQ_SUB(S,Y) != 32'h0 | d. Socket Information Structure

Figure 26:
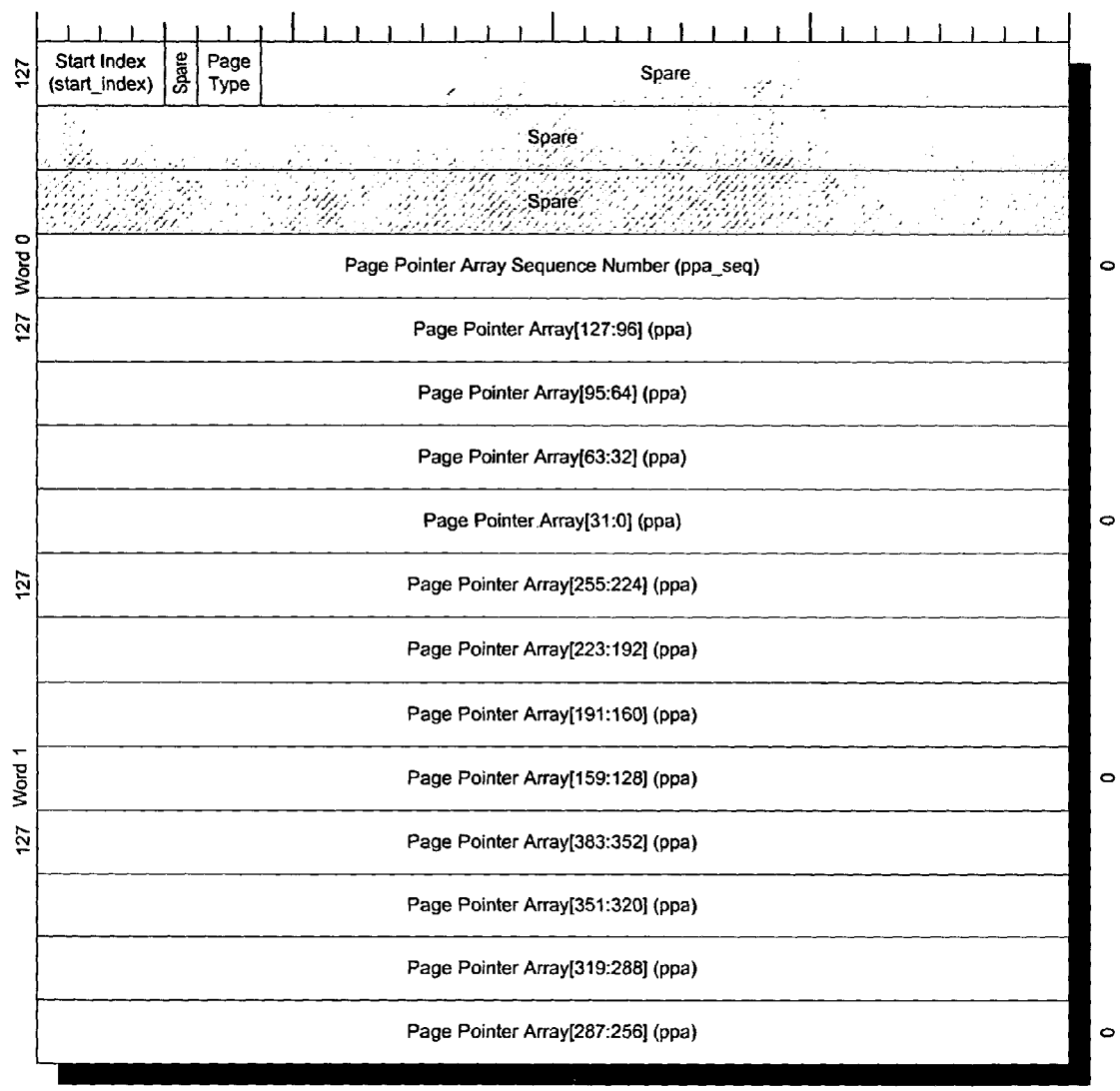
FIG. 26 illustrates a data structure maintained by the socket memory controller for a single re-assembly buffer.

In order to implement dynamic buffering schemes, the SMC 758 must maintain a certain amount of state per re-assembly buffer. FIG. 26 illustrates the data structure maintained by the SMC 758 for a single re-assembly buffer, which may be referred to herein as the Socket Information Structure. Two such structures are kept per stateful protocol connection, these being termed the Receive Socket Information (RSI) and Send Socket Information (SSI).

Any operations that are required on a socket will require either the RSI or the SSI. All operations except for a socket close require either the RSI or the SSI, but not both. However, the socket close operation does require both structures. At the start of the processing of an SMC request the SMC 758 will read either the RSI or the SSI or both. Note that when the SIS structure is written to DDR memory 790, the first word (32-byte) to be written is the word that contains ppa_seq. Table VII includes additional descriptive detail relating to the fields identified in FIG. 26.

TABLE VII

| Field | Mnemonic | Description |
| --- | --- | --- |
| Page Pointer Array | ppa | This is the array of sixteen page pointers as defined in section b. Each pointer is 24-bits wide, and contains an address of a page in SDM. Since the minimum page size is 1 KB, 24-bits is enough to address 16 GB of minimum SDM with the minimum page size. The value of ppa[0] is in bits 23-0, with ppa[15] in bits 383-360. |
| Start Index | start_index | As defined in section b, the Start Index is the index of the page pointer whose first byte has sequence number Page Pointer Array Sequence Number (ppa_seq) |
| Page Type | pg_type | This is the type of page to be used for this buffer. The SMC supports up to four different types of pages. The page type is used to index into certain page parameters registers. |
| Page Pointer Array Sequence Number | ppa_seq | The sequence number of the first byte of ppa[start_index]. | e. Buffer Management Algorithms

In the following sections algorithms are described which are executed by the SMC 758 when reading and writing the socket buffers using a DDR burst size of 32-bytes. Reference will be made to the variables set forth in Tables VII and VIII throughout this discussion.

TABLE VIII

| Variable | Location | Size | Description |
| --- | --- | --- | --- |
| buffer_offset | Maintained by SMC | 32-bits | This is the offset, in bytes, from the start of the socket buffer to some other location in the socket buffer. The buffer_offset spans multiple socket pages. When used as an offset into the buffer, the maximum value of this field is 16 times the maximum page size, i.e. 16 × 32 MB. However, we also use this field to determine when overflow has occurred, in which case the maximum value is the maximum value when two 32-bit unsigned integers are subtracted |
| len | SMC Command | 14-bits | The length, in bytes, of the data to be read/written. The maximum value of this field is 16000 bytes exactly (not 16384 bytes). |
| pg_addr | Maintained by SMC | 29-bits | This is a pointer to a 32-byte word in the SDM. The maximum value of this field is 16 GB/32-bytes 512 M |
| pg_index | Maintained by SMC | 4-bits | This is an index into the Page Pointer Array (ppa). The maximum value of this field is 15. |
| pg_mask | Computed by SMC via the value of pg_type | 25-bits | This is a mask that allows you to find the remainder when a value is divided by the page size. For example, if the page size is 1 KB then the page mask would be 10h'3ff. Its value is ((1 << (10 + PG_SHIFTM10)) − 1) |
| pg_num | Maintained by SMC | 23-bits | This is a temporary variable used to calculate pg_index. This is only useful for the flow chart, and not the actual SMC implementation. For normal use, the maximum value of this field is 15. We also use this field to determine when underflow has occurred, in which case it must be able to hold the maximum buffer_offset value plus the maximum length, divided by the minimum page size, i.e. $(2^{32} - 1) + (2^{14} - 1)/1024$. |
| pg_end | Maintained by SMC | 23-bits | This is a temporary variable used to determine on what page a transfer will end. This in turn is used to determine if the transfer will overflow. We use this field to determine when overflow has occurred, in which case it must be the maximum buffer_offset value plus the maximum length, divided by the minimum page size, i.e. $(2^{32} - 1) + (2^{14} - 1)/1024$. |
| pg_offset | Maintained by SMC | 26-bits | This is the offset, in bytes, from the start of a socket page. The maximum value of this field is the maximum page size minus one. However, we also increment this field beyond the maximum page size, so it must be able to hold the maximum page size plus 32. |
| pg_shift | SMC Registers via the value of pg_type | 5-bits | This is the shift that allows you to divide a value by the page size. It is determined from certain SMC registers using pg_shift = (PG_SHIFTM10 + 10). Defining the page size by a shift ensures that the page size is always a power of two. The maximum value of this field is 25. |
| pg_size | Computed by SMC via the value of pg_type | 26-bits | This is the page size in bytes. Its value is (1 << (10 + PG_SHIFTM10)) The maximum value of this field is the maximum page size. |
| pg_type | SMC Command | 2-bits | This is the type (0-3) of page that the SMC command is operating upon. Using this page type the SMC can obtain the page size (pg_size), and page mask (pg_mask) associated with that type of page. |
| seq_num | SMC Command | 32-bits | The sequence number of the read/write operation. |

(1) Write Buffer Subroutine

The Write Buffer Subroutine is used when data is to be written to the socket buffer from a location in the scratchpad 720. Note that this subroutine only concerns itself with the movement of data into the socket buffer. It is not concerned with accessing the appropriate socket information table or parsing the SMC command that caused this write buffer operation.

For the purpose of this subroutine it is assumed that a sequence number (seq_num) and length (len) have been supplied. It is also assumed that the socket information structure is available. The task is to write len bytes of data from a location in the scratchpad 720 into the socket data memory.

(a) Write Buffer Start

Figure 27:
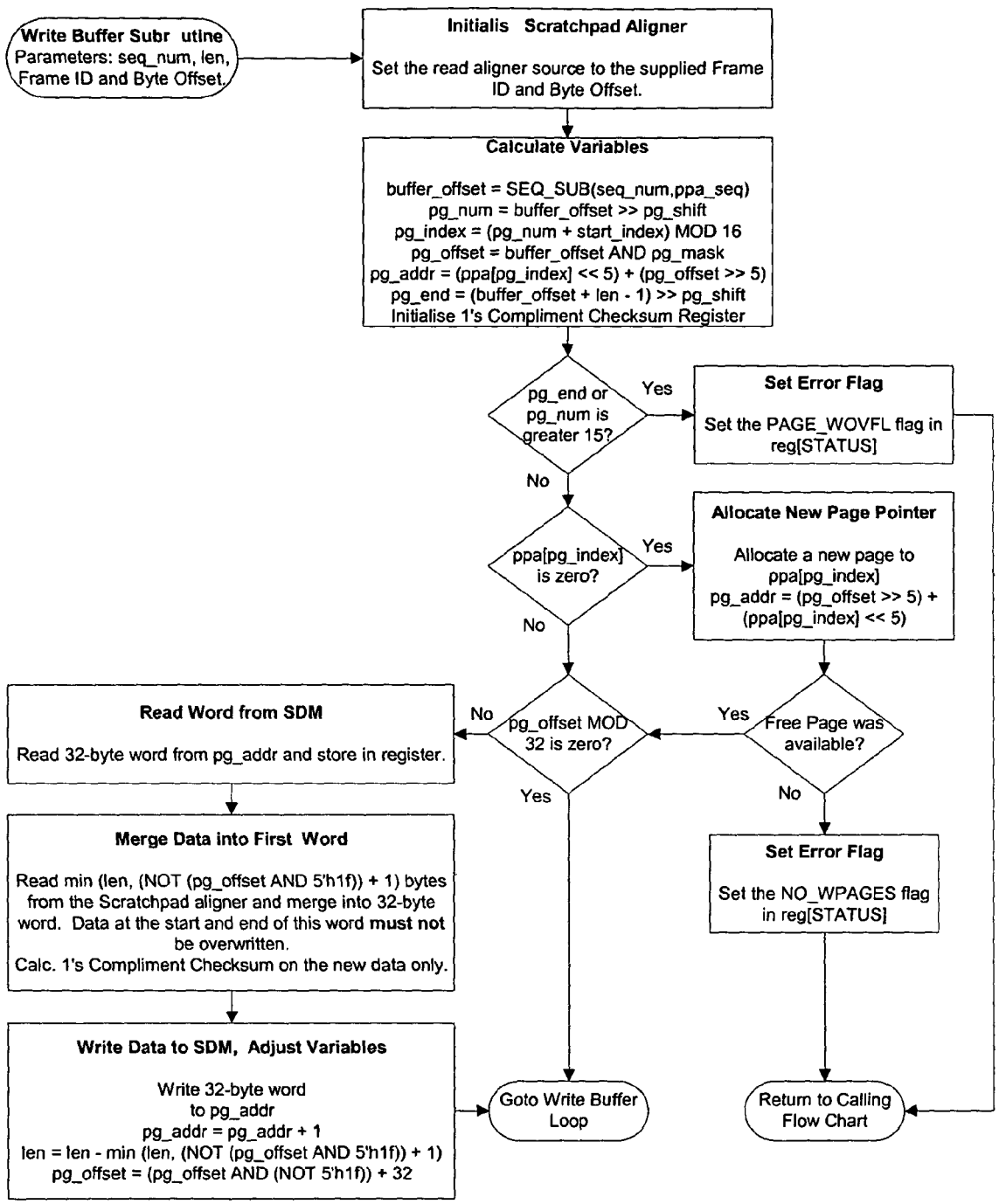
FIG. 27 is a flow chart illustrating a write buffer start subroutine.

Referring now to FIG. 27, a flowchart is provided of a write buffer start subroutine. As an initial step in the subroutine, the scratchpad aligner is loaded with the Frame ID and byte offset of the location from which it is desired to read data. The Frame ID and byte offset are both supplied by the calling flow chart, as is the byte length.

Next a buffer offset corresponding to a location where it is desired to start writing data is computed. This is simply the sequence number of the very first byte in the socket buffer (ppa_seq from the socket information structure) subtracted from the supplied sequence number (seq_num) using 32-bit sequence number operations (see section c). This value is inserted into the variable (buffer_offset) primarily in order to simplify the expression of the equations set forth in FIG. 27, but need not be incorporated within a physical realization.

Given that the buffer offset will now be known, the page number that contains seq_num, relative to the first page may now be computed. This computation is performed by dividing the buffer offset by the page size. In order to ease implementation, all page sizes are a power of two and thus the required division is a simple shift.

A page number (pg_num) has now been determined, but this value is relative to the page that contains the first byte of the socket buffer. To obtain an index into the page pointer array the start_index from the socket information structure must first be added. The value obtained must then be wrapped to allow for the fact that the page pointer array will generally be implemented in a circular fashion. This index (pg_index) may now be used as an index into the page pointer array in order to obtain a 24-bit page pointer (ppa[pg_index]). Note that this pointer points to a page which is aligned on a 1 KB boundary. This may be transformed into a 32-byte address by shifting it left by five. The page offset (pg_offset), which is a byte address, is then transformed into a 32-byte address by shifting it right five. These two values are added to form an address in DDR memory 790 of the first 32-byte word where data is to be written. Finally, the page on which the transfer will end, pg_end, is calculated. The calculation of pg_end is performed by adding the transfer length minus one, len−1, to the offset from the start of the buffer, buffer_offset, and dividing by the page size.

The calculation of start page number (pg_num) and end page number (pg_end) may now be verified. Specifically, it is determined whether either of these values are greater than 15, which would correspond to a write operation outside of the region within which the socket buffer is permitted to store data. In such event an error flag is set, processing returns to the procedure which called or otherwise invoked the subroutine of FIG. 27.

Assuming that the above page number verification is successful, the process of writing data may begin. However, it will first be desired to check whether the page to which data will be written has been allocated, i.e. that ppa[pg_index] is non-zero. If it is zero then an attempt is made to allocate a page, setting an error flag and returning if this cannot be done. If it is necessary to allocate a page, and one is successfully allocated, then the page address (pg_addr) variable must first be re-computed.

Allowance must also be made for the case where location of the sequence number to be written (seq_num) is not on a 32-byte boundary. If it is not on a 32-byte boundary, then it is necessary to perform a read-modify-write on the 32-byte word in order to merge in the first portion of the data. Whether it is necessary to perform this read-modify-write operation may be easily checked by determining if the buffer offset, which is in bytes, is divisible by 32. If it is divisible by 32, then processing simply continues with the main write buffer loop. From this it may be determined that a read may be issued to the scratchpad 720 without actually consuming all of the supplied word. This is a primary motivation for inclusion of the aligner on the scratchpad interface.

If the page offset is not divisible by 32, then the 32-byte word pointed to by the page address (pg_addr) is read and merged in the portion of the data which is not desired to write. Next, the word is written back out to the SDM. The amount of data that needs to be written to the SDM is min (len, (31−(number of bytes at the start of the 32-byte word)+1))=min (len, (31−(pg_offset AND 5'h1f)+1))=min(len, (32−(pg_offset AND 5'h1f)+1)). Note that the minimum must be taken to allow for the case when we are not writing the complete 32-byte word. Now, (32−(pg_offset AND 5'h1f)) is equivalent to NOT (pg_offset AND 5'h1f)+1. Therefore we read min (len, (NOT (pg_offset AND 5'h1f))+1) bytes of data is read from the scratchpad aligner and merged into the 32-byte SDM.

After the word is written out to the SDM, the page address (pg_addr) is incremented by one so that it points to the next 32-byte word. The length is then adjusted by subtracting the amount of data that was written. Finally, the page offset (pg_offset) is adjusted so that it is the next higher multiple of 32.

Figure 23:
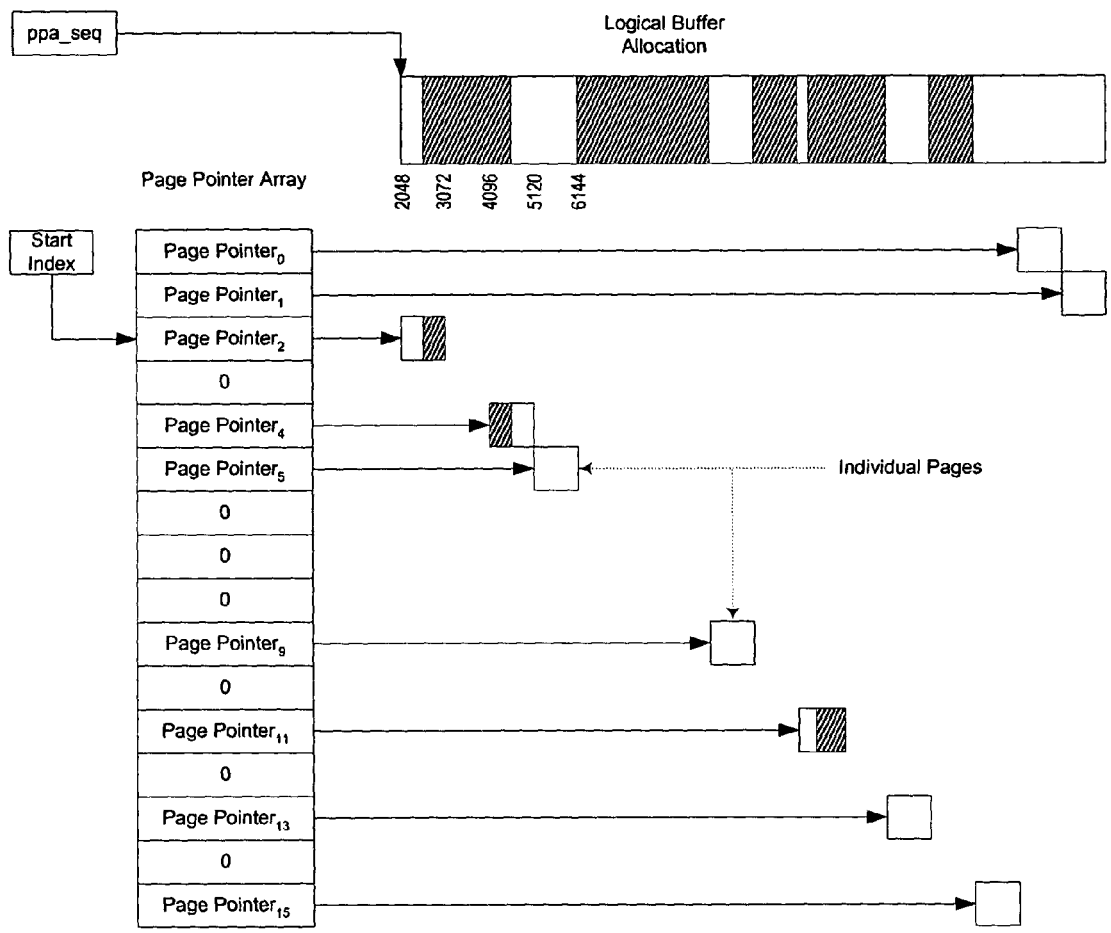
FIG. 23 represents the effect of incrementing the value of a start index within the context of the buffer allocation scheme of FIG. 23.

An example of execution of the write buffer start subroutine will now be described. For purposes of this example, it is assumed that the page size is 1 KB and hence that pg_mask=10'h3ff and pg_shift=10. It is also assumed that it is desired to write 512 bytes at sequence number 5190 and that the socket information structure as show in FIG. 23 is applicable, i.e. ppa_seq=2048.

As a first step, the following computations are performed:
buffer_offset=SEQ_SUB(5190, 2048)=(5190−2048) modulo $2^{32}$=3142
pg_num=3142>>10=3
pg_index=(0+3)MOD 16=3
pg_offset=3142 AND 10'h3ff=70
pg_addr=(70>>5)+(ppa[3]<<5)=2+(ppa[3]<<5)
pg_end=(3142+512−1)>>10=3653>>10=3

Since the page offset (pg_offset) is not a multiple of 32, certain data is merged into the first word. During this merging process the above variables are adjusted as follows:
pg_addr=1+2+(ppa[3]<<5)=3+(ppa[3]<<5)
len=512−min(512,(NOT(70 AND 5'h1f))+1)=512−min (512,(NOT 5'h6)+1)=512−(25+1)=486
pg_offset=70 AND (NOT 5'h1f)+32=64+32=96

Processing may then continue by execution of a write buffer loop, which is described immediately below.

(b) Write Buffer Loop

Figure 28:
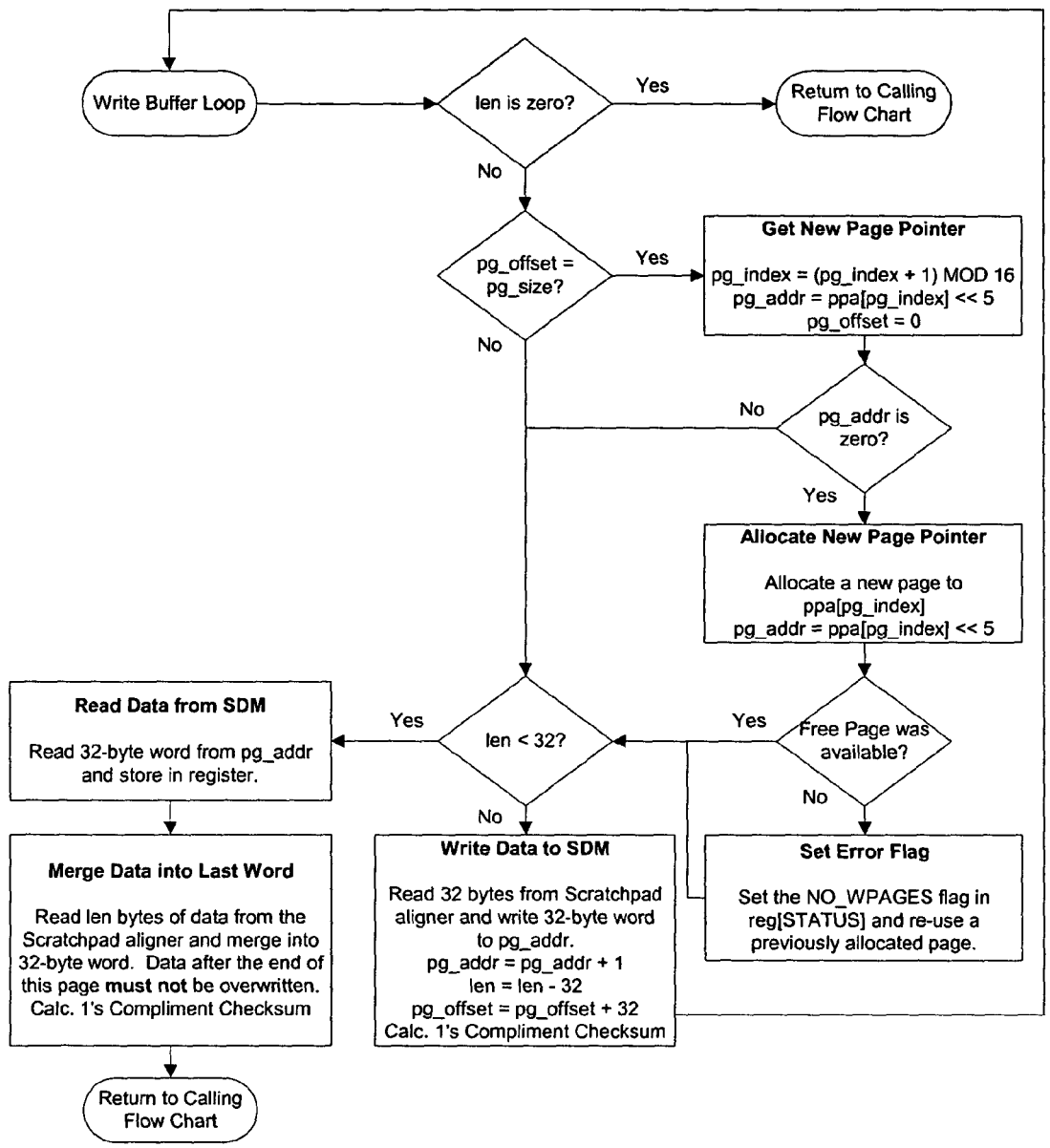
FIG. 28 is a flowchart depicting a write buffer loop subroutine.

Turning now to FIG. 28, a flowchart is provided which illustrates a general set of steps comprising a write buffer loop subroutine. As a first step, the write buffer loop is checked in order to determine whether the length remaining to be written is zero. If this is true then the write operation has been completed.

If the length is not zero, then it must be checked to determine whether movement into another socket page has occurred. This is true when the page offset is equal to the page size.

For purposes of example, assume that crossing into the next socket page has not yet occurred. In such event a check is made to determine whether the length is less than 32. This is the parallel of the case in the above section, where if the length is less than 32 then data is merged into the final word. If the length is not less than 32, than a complete 32-byte word is simply written to the SDM. After completing the write, the 32-byte pointer (pg_addr) is incremented by one, and length decremented by 32. In addition, the page offset (pg_offset) is incremented by 32 and then processing continue back to the start of the flowchart of FIG. 28. If the length is less than 32, then the 32-byte word is read and merge with any remaining data. The result is written back out to the SDM and processing is completed, since no additional data remains to be processed.

Attention is again directed to the step of checking whether movement into another socket page has occurred. If this is true then the page offset (pg_offset) will be equal to the page size (pg_size). Note that this can never be true on the first iteration of the Write Buffer Loop, i.e. two pages will never be accidentally allocated for the same page pointer array index. If the page offset does equal the page size, then the next page pointer must be incremented in order to allow for the "wrapping" which occurs at the end of the page pointer array. The page address (pg_addr) is then reset to the start of the new socket page, first shifting the page pointer (ppa[pg_index])

left by five as we convert from a 1 KB aligned pointer into a 32-byte pointer. The page offset (pg_offset) is then reset to zero to indicate that a new page has been started. It is then checked to determine if the new page address is zero. If this is not the case, then the page has already been allocated by a previous operation and writing of the data is continued. If the page address is zero then that page has not yet been allocated and a new page pointer is allocated to the page pointer array (ppa[pg_index]) and assigned to the page address (pg_addr). Finally, a check must be performed to determine whether a page has been successfully allocated. If not, then an error bit is set and the and the previously allocated page is re-used. Pages should always be available during a socket write due to the SMC credits scheme (explained below). However, if this does in fact occur then the SMC 758 will re-use a previously allocated page for that socket (a previously allocated page must exist, otherwise the write buffer loop subroutine would not be being executed). In this case the data for that socket may be corrupted, but other sockets will not be affected and it is the responsibility of the applicable protocol core to determine that an error has occurred. Note that if pages are re-used the SIS is not updated with duplicate page pointer arrays. Instead the pointers for the pages that could not be allocated are left at zero.

(2) Read Buffer Subroutine

The Read Buffer Subroutine is used when data is to be read from the socket data memory into the scratchpad 720. Note that this subroutine only concerns itself with the movement of data into the scratchpad 720. It is not concerned with accessing the appropriate socket information table or parsing the SMC command that caused this read buffer operation.

The scratchpad 720 will issue a Frame ID to the SMC after the data has been written. This Frame ID must be communicated to the OPU 770 or dispatcher 730. The SMC 758 does this by writing the Frame ID back into the SMC Request, as is further described below. It should be remembered that the scratchpad Aligner must provide a Frame ID at the end of a write to the scratchpad 720. This Frame ID is therefore a return parameter of the Read Buffer Subroutine.

For the purpose of this subroutine it is assumed that a sequence number (seq_num) and length (len) have been supplied. It is also assumed that the socket information structure is available. The task is to write len bytes of data from socket data memory into the scratchpad.

(a) Read Buffer Start

Figure 29:
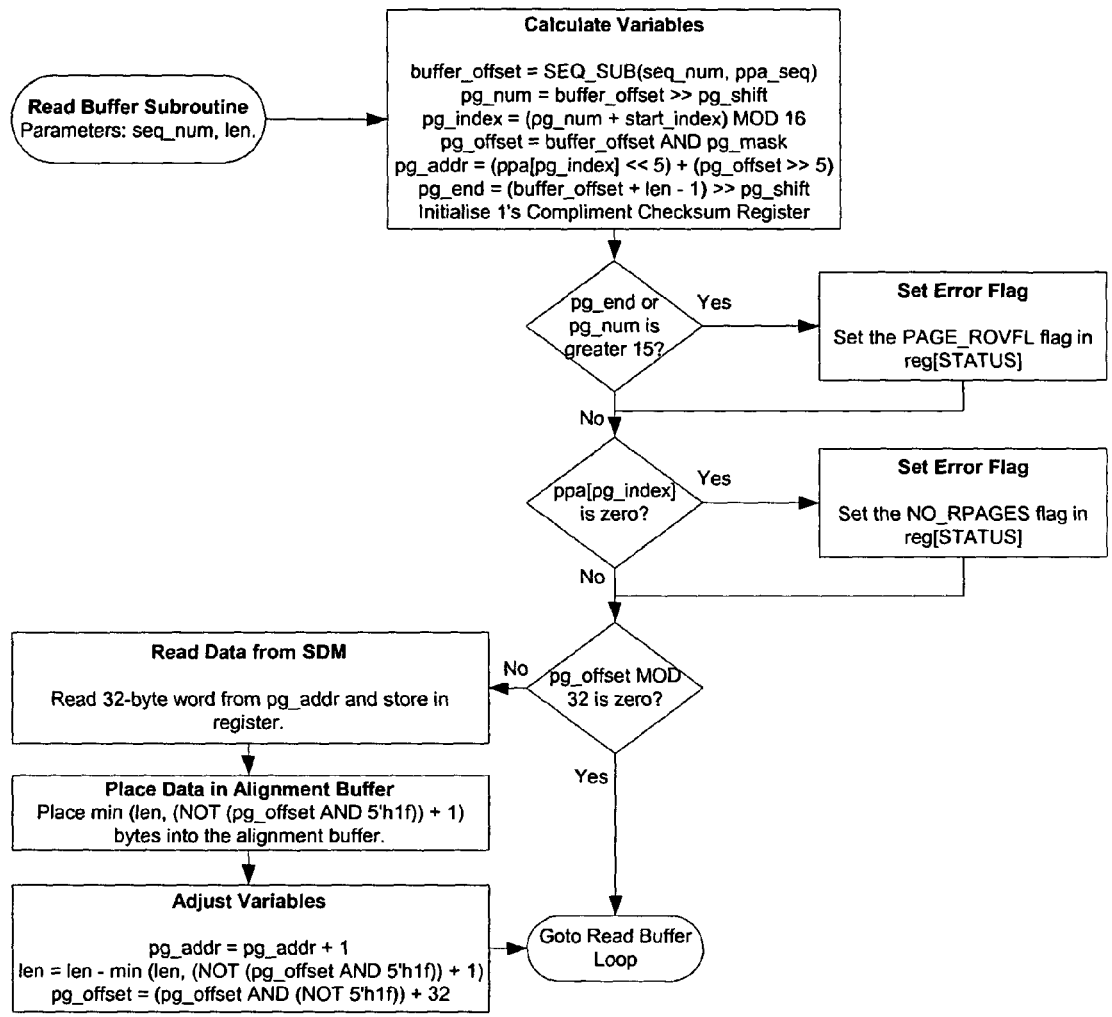
FIG. 29 is a flowchart showing an exemplary set of acts comprising a read buffer start subroutine.

Referring now to FIG. 29, a flowchart is provided of the sequence of steps comprising a read buffer start subroutine. As an initial step, the various buffer variables are computed in similar fashion as in the first step of the write buffer start subroutine described with reference to FIG. 27.

The start page number (pg_num) and end page number (pg_end) are examined in order to determine if either extends beyond the boundary of the socket buffer. If so, then an error bit is set and processing continues. In this case data will be read from the page at the address "zero" in DDR memory 790. While this is a valid address of the DDR memory 790, it is not the data that the SMC requestor intended. Alternatively, the read buffer subroutine could be exited immediately upon detection of such an error, but then a value may not be available for use for the Frame ID in the SMC response. The chosen method eases implementation of the SMC 758, while still allowing an external device to determine that an error has occurred.

The page pointer array entry (ppa[pg_index]) is then checked in order to ensure that it has been allocated, i.e. check that it is not zero. If it is zero, then another error condition has arisen. For the same reasons as above, a bit is set to indicate that this error has occurred and processing continues (i.e., effectively reading invalid data).

Following completion of the above checks, it is determined whether the page offset (pg_offset) from which read is requested is on a 32-byte boundary. If so, then processing proceeds directly to a "read" loop in which data is read out of socket data memory and into the scratchpad 720. If pg_offset is not on a 32-byte boundary, then the specified 32-byte word is read and the bytes of interest are extracted. These bytes are then written to the alignment buffer (i.e., to the scratchpad 720). Finally, the variables are adjusted in the same manner as described above with reference to FIG. 27.

(b) Read Buffer Loop

Figure 30:
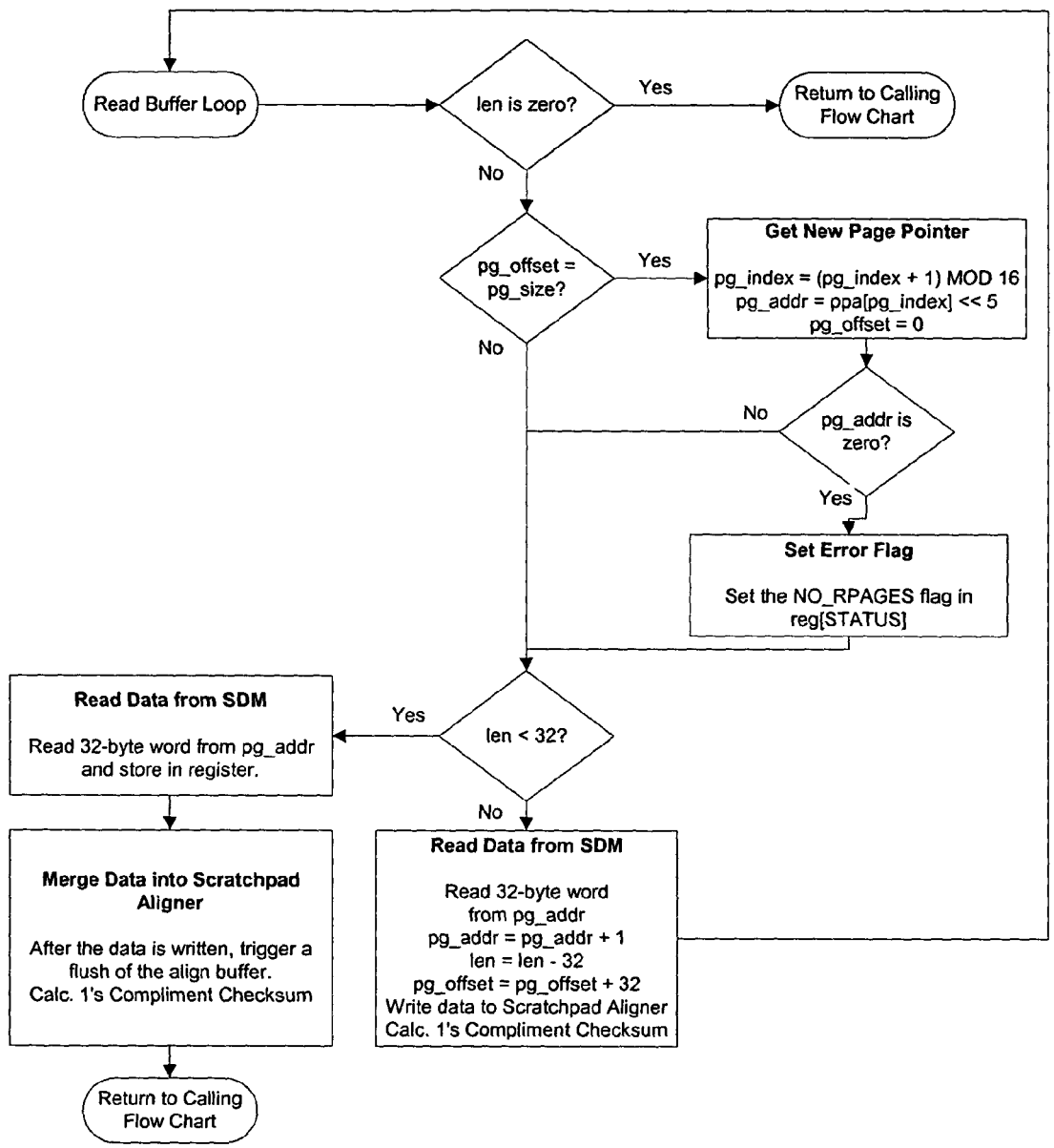
FIG. 30 is a flowchart of a read buffer loop subroutine.

Turning now to FIG. 30, a flowchart is provided of a read buffer loop subroutine. As is apparent from inspection of FIGS. 28 and 30, the read buffer loop subroutine of FIG. 30 bears substantial similarity is very similar to the write buffer loop subroutine described with reference to FIG. 28. A primary difference between the subroutines is that new page pointers are not allocated in the read buffer loop since new data is not being written. In addition, the error condition arising when the page pointer array entry is found to be zero (i.e. reading from an un-allocated page) is handled differently by this subroutine. Upon the occurrence of this condition, an error flag is set but reading of the data from the page having an address of zero is continued for the reasons discussed previously.

A number of embodiments of the present invention have been described. Nevertheless, it will be understood that various modifications may be made without departing from the scope of the invention. For example, the methods of the present invention can be executed in software or hardware, or a combination of hardware and software embodiments. As another example, it should be understood that the functions described as being part of one module may in general be performed equivalently in another module. As yet another example, steps or acts shown or described in a particular sequence may generally be performed in a different order. Moreover, the numerical values for the operational and implementation parameters set forth herein (e.g., bus widths, DDR burst size, number of PPCs, amount of memory) are merely exemplary, and other embodiments and implementations may differ without departing from the scope of the invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method of processing data in a stateful protocol processing system configured to process multiple flows of messages, said method comprising:
   receiving a first plurality of messages of a first of said flows over a first logical channel, said first of said flows comporting with a first stateful protocol;
   establishing a first communication buffer associated with said first of said flows, said first communication buffer being of a first buffer size based upon information within said first plurality of messages;

deriving events of at least a first type and a second type from said first plurality of messages;

assigning a first protocol processing core to process said events of said first type in accordance with said first stateful protocol, said first protocol processing core being selected from among a plurality of protocol processing cores identified in a memory structure as being compatible with said events of said first type;

assigning a second protocol processing core to process said events of said second type in accordance with said first stateful protocol;

receiving a second plurality of messages of a second of said flows over a second logical channel, said second of said flows comporting with a second stateful protocol;

establishing a second communication buffer associated with said second of said flows, said second communication buffer being of a second buffer size based upon information with said second plurality of messages;

deriving events of at least a third type and a fourth type from said second plurality of messages;

defining a first class of events corresponding to at least said events of said first type and said events of said second type;

executing a first event-handling routine applicable to said first class of events;

defining a second class of events corresponding to at least said events of said third type and said events of said fourth type;

executing a second event-handling routine applicable to said second class of events.

2. The method of claim 1 further including:
retrieving a first flow state characterizing said first of said flows;
partitioning said first flow state into a first workspace portion and a second workspace portion; and
assigning said first workspace portion to said first protocol processing core and said second workspace portion to said second protocol processing core.

3. The method of claim 2 further including:
retrieving a second flow state characterizing said second of said flows;
partitioning said second flow state into a third workspace portion and a fourth workspace portion; and
assigning said third workspace portion to said third protocol processing core and said fourth workspace portion to said fourth protocol processing core.

4. The method of claim 1 further including:
setting a first flow timer associated with said first of said flows;
generating a first timeout expiration event upon expiration of said first flow timer; and
forwarding said first timeout expiration event to a first selected protocol processing core.

5. The method of claim 4 further including:
setting a second flow timer associated with said second of said flows;
generating a second timeout expiration event upon expiration of said second flow timer; and
forwarding said second timeout expiration event to a second selected protocol processing core.

6. The method of claim 1 further including:
generating an additional event based upon a current state of said first of said flows;
retrieving a current flow state on the basis of said additional event; and
assigning a third protocol processing core, different from said first protocol processing core and second protocol processing core, to continue processing said events of said first type and said second type.

7. The method of claim 1 wherein said first communication buffer is comprised of a predetermined number of pages of equal size wherein one of said pages is allocated in connection with each of a plurality of allocation operations performed during communication of data associated with said first of said flows.

8. A stateful protocol processing apparatus configured to process multiple flows of messages, said apparatus comprising:
an input processing unit disposed to receive a first plurality of messages of a first of said flows, said input processing unit deriving events of at least a first type and receive a second type from said first plurality of messages and a second plurality of messages of a second flow, said second of said flows comporting with a second stateful protocol;
a first protocol processing core, said first protocol processing core being included among a plurality of protocol processing cores identified in a memory structure as being compatible with said events of said first type;
a second protocol processing core;
a dispatcher operative to assign said first protocol processing core to process said events of said first type in accordance with a first stateful protocol and to assign said second protocol processing core to process said events of said second type in accordance with said first stateful protocol;
a first communication buffer associated with said first of said flows, said first communication buffer being of a first buffer size based upon information within said first plurality of messages;
a second communication buffer associated with said second of said flows, said second communication buffer being of a second buffer size based upon information within said second plurality of messages;
wherein the first plurality of messages is received over a first logical channel and the second plurality of messages is received over a second logical channel and wherein a second class of events corresponding to at least a set of events of a third type and an event of a fourth type is derived; and
an event-handler module configured to execute a first event-handling routine applicable to said first class of events and execute a second event-handling routine applicable to said second class of events.

9. The apparatus of claim 8 wherein said input processing unit further:
receives a second plurality of messages of a second of said flows, said second of said flows comporting with a second stateful protocol; and
derives events of at least a third type and a fourth type from said second plurality of messages.

10. The apparatus of claim 9 wherein said dispatcher further:
assigns a third protocol processing core to process said events of said third type in accordance with said second stateful protocol; and
assigns a fourth protocol processing core to process said events of said fourth type in accordance with said second stateful protocol.

11. The apparatus of claim 9 further including a socket memory controller configured to establish a first communication buffer associated with said first of said flows, said first communication buffer being of a first buffer size based upon information within said first plurality of messages.

12. The apparatus of claim 11 wherein said socket memory controller is further configured to establish a second communication buffer associated with said second of said flows, said second communication buffer being of a second buffer size based upon information with said second plurality of messages.

13. The apparatus of claim 8 wherein said dispatcher is further operative to generate a first local flow identification proxy based upon a first flow identification key extracted from said first plurality of messages.

14. The apparatus of claim 13 further including a lookup controller disposed to cooperate with said dispatcher in retrieving a first flow state characterizing said first of said flows using said first local flow identification proxy.

15. The apparatus of claim 14 further including:
  a first on-chip memory associated with said first protocol processing core; and
  a second on-chip memory associated with said second protocol processing core;
  wherein said dispatcher assigns a first workspace portion of said first flow state to said first protocol processing core and a second workspace portion of said first flow state to said second protocol processing core, and wherein said lookup controller manages transfer of said first workspace portion to said first on-chip memory and said transfer of said second workspace portion to said second on-chip memory.

16. The apparatus of claim 8 further including a lookup controller configured to administer a first flow timer associated with said first of said flows, said lookup controller sending a first timeout expiration event to a first selected protocol processing core upon expiration of said first flow timer.

17. The apparatus of claim 8 wherein said first protocol processing core generates an additional event based upon a current state of said first of said flows, said apparatus further including a lookup controller disposed to cooperate with said dispatcher in retrieving a current flow state on the basis of said additional event.

18. The apparatus of claim 17 wherein said dispatcher assigns a third protocol processing core, different from said first protocol processing core and second protocol processing core, to continue processing said events of said first type and said second type.

* * * * *